US012119554B2

(12) United States Patent
Hollenbeck et al.

(10) Patent No.: US 12,119,554 B2
(45) Date of Patent: Oct. 15, 2024

(54) PLANAR MONOLITHIC COMBINER AND MULTIPLEXER FOR ANTENNA ARRAYS

(71) Applicant: Optisys, Inc., West Jordan, UT (US)

(72) Inventors: Michael Hollenbeck, West Jordan, UT (US); Robert Smith, West Jordan, UT (US)

(73) Assignee: Optisys, Inc., West Jordan, UT (US)

( * ) Notice: Subject to any disclaimer, the term of this patent is extended or adjusted under 35 U.S.C. 154(b) by 145 days.

(21) Appl. No.: 17/663,647

(22) Filed: May 16, 2022

(65) Prior Publication Data

US 2022/0368000 A1 Nov. 17, 2022

Related U.S. Application Data

(60) Provisional application No. 63/188,721, filed on May 14, 2021.

(51) Int. Cl.
*H01Q 21/06* (2006.01)
*H01P 1/213* (2006.01)
(Continued)

(52) U.S. Cl.
CPC ......... *H01Q 21/064* (2013.01); *H01P 1/2131* (2013.01); *H01P 3/06* (2013.01);
(Continued)

(58) Field of Classification Search
CPC .... H01Q 15/24; H01Q 21/0037; H01Q 21/06; H01P 3/06; H01P 5/12–16
See application file for complete search history.

(56) References Cited

U.S. PATENT DOCUMENTS 6,018,315 A 1/2000 Ince et al.
6,198,730 B1 3/2001 Hogberg et al.
(Continued)

FOREIGN PATENT DOCUMENTS

FR 3087954 A1 10/2018
WO 2017203568 A1 11/2017
(Continued)

OTHER PUBLICATIONS

Motomi Abe, et al., "Ka-Band Branch Line Coupler Applied Hexagonal Waveguide Suitable for Additive Manufacturing," IEICE Trans. Electron., vol. E101-C, No. 10, Oct. 2018, pp. 805-814, The Institute of Electronics, Information and Communication Engineers.
(Continued)

*Primary Examiner* — Hasan Islam
(74) *Attorney, Agent, or Firm* — TechLaw Ventures, PLLC; Terrence J. Edwards

(57) ABSTRACT

Antenna arrays comprising planar combiner networks. An apparatus includes a first antenna component comprising a first waveguide combiner and a first radiating element. The apparatus includes a second antenna component comprising a second waveguide combiner and a second radiating element. The second radiating element supports a polarization that is orthogonal to a polarization of the first radiating element, and the first antenna component is located next to the second antenna component within an antenna array. The first antenna component and the second antenna component are disposed within a lattice spacing of the antenna array.

21 Claims, 42 Drawing Sheets

(51) Int. Cl.

| | |
|---|---|
| ***H01P 3/06*** | (2006.01) |
| ***H01P 5/16*** | (2006.01) |
| ***H01Q 5/371*** | (2015.01) |
| ***H01Q 15/24*** | (2006.01) |
| ***H01Q 21/00*** | (2006.01) |

(52) U.S. Cl.

CPC ............... *H01P 5/16* (2013.01); *H01Q 5/371* (2015.01); *H01Q 15/242* (2013.01); *H01Q 21/0037* (2013.01); *H01Q 21/061* (2013.01)

(56) References Cited

U.S. PATENT DOCUMENTS

| | | | |
|---|---|---|---|
| 6,317,094 B1 * | 11/2001 | Wu .................... | H01Q 21/0087 343/770 |
| 6,839,029 B2 | 1/2005 | Mendolia et al. | |
| 9,253,925 B1 | 2/2016 | Smith | |
| 9,960,495 B1 | 5/2018 | Hollenbeck et al. | |
| 10,170,833 B1 | 1/2019 | Hollenbeck et al. | |
| 10,468,773 B2 | 11/2019 | Hollenbeck et al. | |
| 10,481,253 B1 | 11/2019 | Hollenbeck et al. | |
| 10,680,341 B1 | 6/2020 | Anderson et al. | |
| 11,128,034 B2 | 9/2021 | Hollenbeck et al. | |
| 11,211,680 B2 | 12/2021 | Hollenbeck et al. | |
| 11,233,304 B2 | 1/2022 | Hollenbeck et al. | |
| 2010/0033391 A1 | 2/2010 | McLean | |
| 2014/0285291 A1 | 9/2014 | Payne et al. | |
| 2015/0119045 A1 | 4/2015 | Montgomery et al. | |
| 2015/0180111 A1 * | 6/2015 | Runyon ................ | H01P 11/001 333/137 |
| 2015/0270616 A1 | 9/2015 | Jafarlou et al. | |
| 2016/0141754 A1 * | 5/2016 | Leyh .................. | H01Q 21/0075 342/372 |
| 2019/0190160 A1 | 6/2019 | Hollenbeck et al. | |
| 2019/0190161 A1 * | 6/2019 | Hollenbeck .............. | H01Q 1/02 |
| 2020/0127358 A1 | 4/2020 | de Rijk et al. | |
| 2020/0161738 A1 | 5/2020 | de Rijk et al. | |
| 2020/0194860 A1 | 6/2020 | Hollenbeck et al. | |
| 2022/0123477 A1 | 4/2022 | Hollenbeck et al. | |
| 2022/0140477 A1 | 5/2022 | Hollenbeck et al. | |

FOREIGN PATENT DOCUMENTS

| | | |
|---|---|---|
| WO | 2022087027 A1 | 4/2022 |
| WO | 2022094325 A1 | 5/2022 |

OTHER PUBLICATIONS

Motomi Abe, et al., “A 3-D Metal-Direct-Printed, Low-Cost, and Light Hexagonal Waveguide Ka-Band Branch Line Coupler,” Proceedings of the 47th European Microwave Conference, Oct. 2017, pp. 188-191, EuMA, Nuremberg Germany.

Zhang Kai, et al., “A Novel Design of Circularly Polarized Waveguide Antenna,” 2014 3rd Asia-Pacific Conference on Antennas and Propagation, 2014, pp. 130-133, IEEE, Harbin, China.

James P. Becker, et al., “Toward a Novel Planar Circuit Compatible Silicon Micromachined Waveguide,” Electrical Engineering and Computer Science, The University of Michigan, 1999, pp. 221-224, IEEE, Ann Arbor, Michigan.

* cited by examiner

PLANAR MONOLITHIC COMBINER AND MULTIPLEXER FOR ANTENNA ARRAYS

CROSS-REFERENCE TO RELATED APPLICATIONS

This application claims the benefit of U.S. Provisional Patent Application No. 63/188,721, filed May 14, 2021, entitled "PLANAR MONOLITHIC COMBINER AND DIPLEXER FOR ANTENNA ARRAYS," which is incorporated herein by reference in its entirety, including but not limited to those portions that specifically appear hereinafter, the incorporation by reference being made with the following exception: In the event that any portion of the above-referenced provisional application is inconsistent with this application, this application supersedes the above-referenced provisional application.

TECHNICAL FIELD

The disclosure relates to systems, methods, and devices related to antennas and specifically relates to combiners, diplexers, and other elements of an antenna array.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength of a desired signal frequency. At a particular wavelength (which is inversely proportional to the frequency by the speed of light $\lambda=c/f$) for a particular length of wire, the wire will resonate in response to being exposed to the transmitted signal in a predictable manner that makes it possible to "read" or reconstruct a received signal. For simple devices, like radio and television, a wire antenna serves well enough.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high-performance applications exist for antennas that are less known outside the industry, such as electronic warfare and ISR (information, surveillance, and reconnaissance) to name a couple.

High performance antennas are required when high data rate, long range, or high signal to noise ratios are required for a particular application. To improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources: material properties (losses in dielectrics, conductivity in metals), total path length a signal must travel in the passive structure (total loss is loss per length multiplied by the total length), multi-piece fabrication, antenna geometry, and others. These are all related to specific design and fabrication choices that an antenna designer must make when balancing size, weight, power, and cost performance metrics (SWaP-C). Gain of an antenna structure is a function of the area of the antenna and the frequency of operation. To create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Every physical component is designed with the limitations of the fabrication method used to create the component. Antennas and RF components are particularly sensitive to fabrication method, as most of the critical features are inside the part, and very small changes in the geometry can lead to significant changes in antenna performance. Due to the limitations of traditional fabrication processes, hollow metal waveguide antennas and RF components have been designed so that they can be assembled as multi-piece assemblies, with a variety of flanges, interfaces, and seams. All these joints where the structure is assembled together in a multi-piece fashion increase the size, weight, and part count of a final assembly while at the same time reducing performance through increased losses, path length, and reflections. This overall trend of increased size, weight, and part count with increased complexity of the structure have kept hollow metal waveguide antennas and RF components in the realm of applications where size, weight, and cost are less important than overall performance.

One example of a component for waveguides is a transition between a coaxial waveguide input/output and a hollow waveguide. A "transition" is the region of the waveguide that converts the impedance or mode in one region of waveguide to the impedance or mode of another region of waveguide. In other words, an antenna, for example, transmitting an electromagnetic signal may provide the electromagnetic signal through a hollow waveguide into a transition where the electromagnetic signal is propagated in a hollow waveguide mode and converted into a coaxial waveguide mode propagating in a coaxial waveguide that is connected to the antenna. Likewise, an antenna receiving an electromagnetic signal may receive the electromagnetic signal from an antenna element connected to a coaxial waveguide which transitions to a hollow waveguide. Transitions serve to transition an electromagnetic signal from a coaxial waveguide to a hollow waveguide or vice versa.

Accordingly, conventional hollow waveguides have been manufactured using conventional subtractive manufacturing techniques which limit specific implementations for waveguides to the standard rectangular, square, and circular cross-sectional geometries that have the limitations described above. Additive manufacturing techniques provide opportunities, such as integrating waveguide structures with other RF components such that a plurality of RF components may be formed in a smaller physical device with improved overall performance. However, the process of fabricating a traditional rectangular, square, or circular waveguide structure in additive manufacturing typically leads to suboptimal performance and increased total cost in integrated waveguide structures. Novel cross-sections for waveguide structures that take advantage of the strengths of additive manufacturing will allow for improved performance of antennas and RF components while reducing total cost for a complex assembly.

In view of the foregoing, described herein are systems, methods, and devices for improved antenna arrays.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood about the following description and accompanying drawings where.

DETAILED DESCRIPTION

Figure 1:
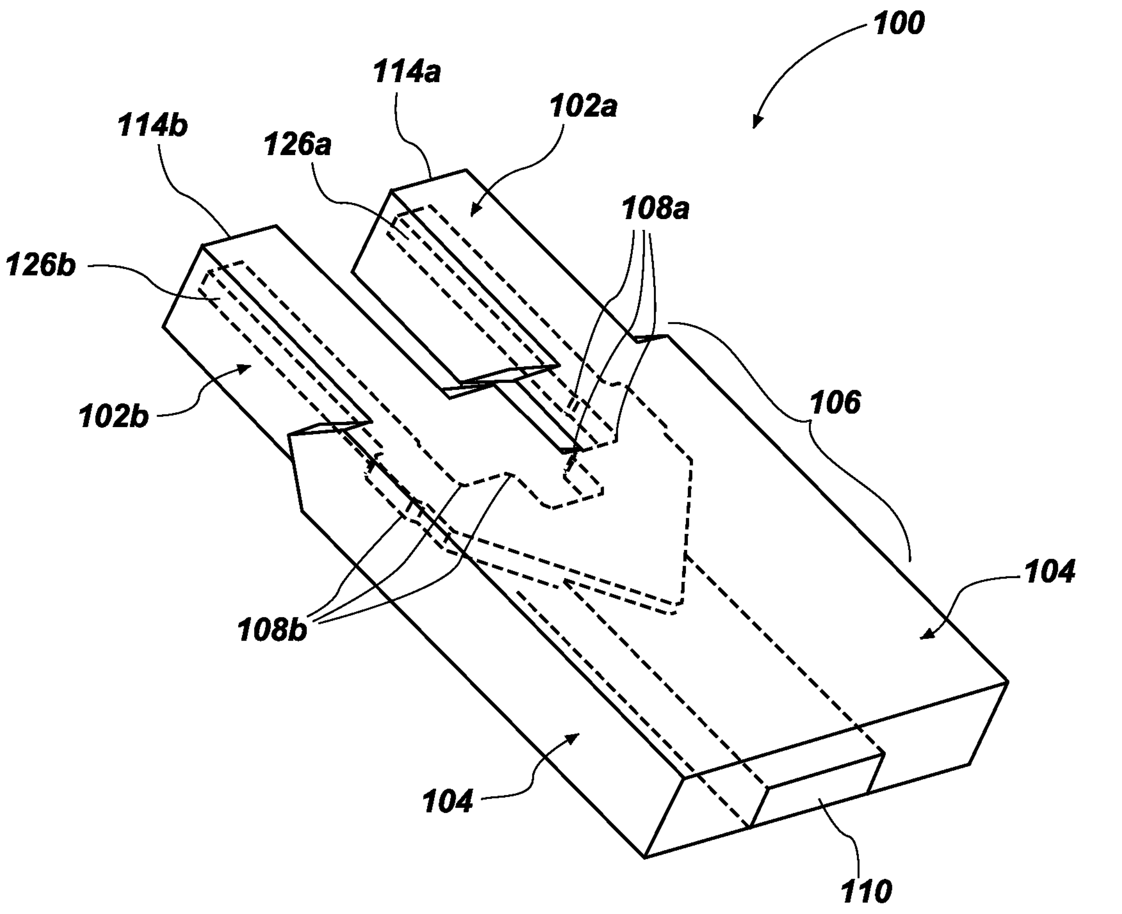
FIG. 1 illustrates a perspective view of a hollow single ridge waveguide to dual-coaxial waveguide transition.

Disclosed herein are improved systems, methods, and devices for communicating electromagnetic energy with an antenna array. Specifically disclosed herein are improved dual-polarization antenna arrays comprising planar combiner networks.

An antenna array described herein includes a plurality of antenna components arranged side-by-side to support a plurality of radiating elements of an antenna array in either a dual polarized antenna array or a single polarized antenna array. Each of the antenna components includes at least one of a first radiating element of a first polarization and may include at least one of a second radiating element of a second polarization that is orthogonal to the first polarization of the first radiating element.

Implementations described herein include singularly polarized antenna components for a passively combined antenna array. The single polarized antenna component comprises a plurality of first radiating elements periodically spaced by a lattice spacing. The single polarized antenna component further includes a transition that is configured to transition an electromagnetic signal from the plurality of first radiating element into a plurality of first waveguides. The single polarized antenna component further includes a combiner network configured to combine electromagnetic signals from the plurality of first waveguides into a single waveguide output port.

Implementations described herein include singularly polarized antenna components for an electrically scanned antenna array. The single polarized antenna component includes a plurality of first radiating elements periodically spaced by a lattice spacing. The single polarized antenna component includes a transition configured to transition an electromagnetic signal from the plurality of first radiating elements into a plurality of waveguides of a waveguide combiner network. The waveguide combiner network fully combines the plurality of first radiating elements into a single output port. The singularly polarized antenna component fits within one lattice spacing of the electrically scanned antenna array. The singularly polarized antenna components for the electrically scanned antenna array may further include one or more multiplexers.

Implementations described herein include dual polarized antenna components for a passively combined antenna array. The dual polarized antenna component comprises a first plurality of radiating elements supporting a first polarization, and a second plurality of radiating elements supporting a second polarization, wherein the second polarization is orthogonal to the first polarization. The first plurality of radiating elements feed into a first H-plane combiner network, and the second plurality of radiating elements feed into a second H-plane combiner network. The dual polarized antenna array includes a first E-plane combiner network that receives an electromagnetic signal from the first H-plane combiner network and outputs the signal with a single output port. The dual polarized antenna array includes a second E-plane combiner network that receives an electromagnetic signal from the second H-plane combiner network and outputs the signal with a single output port.

Further implementations described herein include dual polarized antenna components for an electrically scanned antenna array. The dual polarized antenna component includes a first antenna component with a first polarization and a second antenna component with a second polarization. Each of the first antenna component and the second antenna component include a plurality of radiating elements that are periodically spaced by a lattice spacing. Each of the first antenna component and the second antenna component further include transitions that are configured to transition electromagnetic signals from the plurality of radiating elements into a plurality of waveguides. Further, each of the first antenna component and the second antenna component includes a combiner network configured to combine electromagnetic signals received from the plurality of waveguides into a single waveguide output port. The first antenna component outputs an electromagnetic signal with the first polarization, and the second antenna component outputs an electromagnetic signal with the second polarization, wherein the second polarization is orthogonal to the first polarization. The first antenna component is disposed next to the second antenna component within an antenna array. The combination of the first antenna component and the second antenna component fit within a single lattice spacing in one axis of the antenna array.

As described herein, the single polarized antenna component for the electrically scanned array may include a multiplexer such as a diplexer, quadplexer, or hexaplexer. Further, the first antenna component and/or the second antenna component of the dual polarized antenna components of the electrically scanned array may include a multiplexer such as a diplexer, quadplexer, or hexaplexer.

An antenna assembly described herein includes a waveguide transition device comprising two or more coaxial waveguides. The antenna assembly further includes a radiating component comprising: two or more radiating elements configured to receive or transmit electromagnetic energy through two or more signal ears, wherein each of the two or more signal ears is in communication with a coaxial waveguide of the two or more coaxial waveguides. The antenna assembly is dual polarized.

Further specifically disclosed herein are improved transitions for combining or splitting electromagnetic energy moving between dual coaxial waveguide ports and a hollow waveguide port. A device disclosed herein includes a hollow waveguide port, two or more coaxial waveguide ports, and a transition disposed between the waveguide port and the two or more coaxial waveguide ports. The transition combines or divides electromagnetic energy depending on the direction of travel between the waveguide port and the two or more coaxial waveguide ports. The device may be constructed with metal additive manufacturing techniques (three-dimensional metal printing) and include a series of intricate impedance steps and tapers for transitioning impedance of the electromagnetic energy.

In electromagnetic field theory, the reciprocity theorem (also known as the Lorentz reciprocity theorem) is associated with the coupling energy between fields produced by one source on another. According to antenna reciprocity, the ratio of transmitted power from the transmitting antenna to the received power of the receiving antenna will not change even when the modes of the antennas are interchanged. Reciprocity in antenna communication is desirable because it offers the opportunity to interchangeably use a single pair of antennas in both receiving and transmitting modes. Described herein are antenna arrays comprising a plurality of antenna pairs with orthogonal orientations. This increases the power of the electromagnetic energy being transmitted or received by the antenna array.

Embodiments described herein include improved configurations for a waveguide that can be implemented in an antenna. A waveguide includes a hollow enclosed space for carrying or propagating waves of electromagnetic radiation. In radio-frequency engineering and communications engineering, a waveguide is commonly a hollow metal pipe used to carry radio waves. The electromagnetic waves in a waveguide (which may include a metal pipe or other hollow space) may be imagined as travelling down the guide with a time-varying electric field that is oriented in a discrete set of configurations within the waveguide, dependent on frequency and geometry. Depending on the frequency, waveguides can be constructed of conductive or dielectric materials. Generally, the lower the frequency to be passed, the larger the waveguide. In practice, waveguides allow energy over a set of frequencies to move in both directions, like cables and PCB traces. For such applications, it is desired to operate waveguides with only one mode propagating through the waveguide, or a set of well-defined modes propagating through the waveguide.

Disclosed herein is a balanced twin-wire coaxial waveguide radiating element for use with a broadband waveguide to dual-coaxial transition. The radiating element and transition operate in broadband frequency ranges to transition electromagnetic signals between two balanced coaxial twin-wire pairs connected to an antenna chassis. The electromagnetic signals may be propagated from the wire into waveguide structures in the antenna chassis or may be received from the waveguide structures in the antenna chassis by the wire. The transition may be fabricated using metal additive manufacturing techniques.

Also disclosed herein is a broadband transition between a single or dual ridge waveguide structure, which acts as a transition between a waveguide structure and two coaxial outputs. In an embodiment, a broadband transition may combine elements of a broadband antenna array with coaxial posts at the radiating elements. The disclosure may include a radiating element for an antenna array that is fed by dual-ridge waveguide with a balanced twin coaxial wire. The twin coaxial waveguide feeds symmetric elements with supporting posts attached to a face of an antenna array. There may or may not be capacitive gaps between the balanced radiating elements. The elements may or may not be symmetric in each polarization.

Further disclosed herein is a waveguide combiner network along one axis that uses a series of H-plane combiners to combine from multiple antenna radiating elements to a single port. The single port may be connected to a diplexer as a single integrated part. A combiner and diplexer may be planar and fit within a lattice spacing less than one wavelength, which is necessary for array performance. This is useful for phased arrays in one axis where the lattice spacing between rows is ½ wavelength at the highest frequency of operation. The diplexer allows for a single antenna to operate at two independent frequency bands, such as in a transmit and receive communications application. It will be appreciated that the waveguide combiner network can be a regular waveguide (no ridge), single ridge waveguide, or dual ridge waveguide. A planar quadplexer or hexaplexer can be used instead of a diplexer to provide 4 or 6 simultaneous frequency bands in a single array.

In the following description, for purposes of explanation and not limitation, specific techniques and embodiments are set forth, such as particular techniques and configurations, to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether those elements are shown or described in another embodiment or figure. In other words, elements in the figures may be interchangeable between various embodiments disclosed herein, whether shown or not.

Before the structure, systems, and methods for creating waveguide transitions are disclosed and described, it is to be understood that this disclosure is not limited to the particular structures, configurations, process steps, and materials disclosed herein as such structures, configurations, process steps, and materials may vary. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the terms "hollow ridged waveguide" and "hollow waveguide" broadly encompass waveguides that are single/dual ridge waveguides or waveguides without a ridge, any of which do not have a center conductor, as would be appropriate to a particular application known to those of ordinary skill in the art and those waveguides that are hollow in rectangular, circular, hexagonal, or other geometrical shapes. For example, where applications of the disclosure are specific to a particular waveguide type (e.g., a hollow waveguide vs. a coaxial waveguide vs. an optical waveguide) this disclosure refers to those particular waveguide types by name to differentiate "hollow ridge waveguides" and "hollow waveguides" from waveguides that may be coaxial waveguides, which have a center conductor and an outer conductor, or optical waveguides, which are generally made from a solid dielectric, or other different types and kinds of waveguides. However, a "waveguide" broadly refers to all waveguides of various types and kinds.

As used herein, the term "lattice spacing" refers to the periodic spacing of duplicate radiating elements in an antenna array in one or two axes. Lattice spacing of an array may be equal in both axes of duplication, or it may be different between each axis of duplication.

It is also noted that many of the figures discussed herein show air volumes of various implementations of waveguides, waveguide components, and/or waveguide transitions. In other words, these air volumes illustrate negative spaces of the components within a fabricated element which are created by a metal skin installed in the fabricated element, as appropriate to implement the functionality described. It is to be understood that positive structures that create the negative space shown by the various air volumes are disclosed by the air volumes, the positive structures including a metal skin and being formed using the additive manufacturing techniques disclosed herein.

For the purposes of this description as it relates to metal additive manufacturing, the direction of growth over time is called the positive z-axis, or "zenith" while the opposite direction is the negative z-axis or "nadir." The nadir direction is sometimes referred to as "downward" although the orientation of the z-axis relative to gravity makes no difference in the context of this invention. The direction of a surface at any given point is denoted by a vector that is normal to that surface at that point. The angle between that vector and the negative z-axis is the "overhang angle," θ ("theta").

The term "downward facing surface" is any non-vertical surface of an object being fabricated in a metal additive manufacturing process that has an overhang angle, θ, measured between two vectors originating from any single point on the surface. The two vectors are: (1) a vector perpendicular to the surface and pointing into the air volume and (2) a vector pointing in the nadir (negative z-axis, opposite of the build, or zenith) direction. An overhang angle, θ, for a downward facing surface will generally fall within the range: $0° \leq \theta < 90°$. Overhang angles, θ, for downward facing surfaces are illustrated in various embodiments of hollow metal waveguides, as further described below. As used herein, downward facing surfaces are unsupported by removable support structures from within a waveguide during fabrication, for example, which means that no internal bracing exists within a cavity of a waveguide for supporting downward facing surfaces or build walls.

Referring now to the figures, FIG. 1 illustrates an isometric view of a waveguide transition device 100 comprising a single ridge waveguide 104 to dual coaxial waveguides 102*a*, 102*b*. Some of the figures herein are illustrated such that the dotted lines represent solid components (may be constructed of metal), and non-dotted lines represent the outline of negative space. This convention is specifically applied to FIGS. 1-13, 17, 19, and 24. In FIG. 1, for example, the space between a dotted line and a non-dotted line represents the absence of an element and a negative space wherein air can pass through. This negative space may serve as a waveguide for propagating electromagnetic energy. The negative space may be defined by a metal structure or other solid component.

The waveguide transition device 100 includes, as a part of dual-coaxial waveguides, a first coaxial waveguide 102*a*, with inner conductor 126*a* and outer conductor 114*a*; and a second coaxial waveguide 102*b*, with inner conductor 126*b* and outer conductor 114*b*, which may each be connected via the inner conductors 126*a*, 126*b* to a coaxially fed antenna array element. The coaxial waveguides (may collectively be referred to herein with callout 102) may be constructed of metal for conducting electromagnetic energy between the inner conductors 126 and outer conductors 114 in a TEM mode. The waveguide transition device 100 includes an impedance transition area 106 which serves to match the impedance of the hollow ridged waveguide 104 to the dual coaxial waveguides 102. The impedance transition area 106 may be referred to herein as a "transition."

The device includes a hollow waveguide 104 for propagating electromagnetic energy. The waveguide 104 represents negative space, or the absence of a structure wherein electromagnetic energy can travel in air, vacuum, or other non-conductive material. The transition 106 is configured for transitioning the electromagnetic energy from the hollow single ridge waveguide port 110, through the waveguide 104, and to the coaxial waveguides 102*a*, 102*b*. The coaxial waveguides 102*a*, 102*b* each include an inner conductor 126*a*, 126*b* and an outer conductor 114*a*, 114*b*. The electric field occupies the space between the inner conductor 126 and the outer conductor 114 with minimal penetration into either conductor such that only the electrons near the surface within some number of "skin depths" are excited to move by the field.

The transition 106 is an impedance transition and power combiner/divider region. The transition 106 converts a TE10 mode in the hollow single ridge waveguide to a transverse electromagnetic (TEM) mode in each of the dual coaxial waveguides. The transition 106 also acts as a power combiner or divider depending on which direction an electromagnetic wave is being propagated (e.g., being received or being transmitted). The impedance of the transition 106 may include impedance matching elements 108*a* and 108*b* which may include indents, outdents, steps with rounded corners, steps with corners which are disposed at an angle of 90° or less between adjoining faces of the step, and other features which serve to match the impedance of the transition 106 to a hollow ridged waveguide or to a coaxial waveguide. It is also to be noted that the impedance matching elements 108*a* and 108*b* may further be matched to each other on opposing sides of the transition (e.g., be symmetric or mirror images of each other).

The waveguide transition device 100 may further include a waveguide port 110 for the transition which may be a single ridge waveguide 104 in the example of FIG. 1. The waveguide transition device 100 may be connected to a host of other waveguide components for propagating an electromagnetic wave, including antennas, power combiners, power dividers, radiating elements, and others, for example.

Other transitions, such as dual-ridge transitions are disclosed below. The waveguide transition device 100 may serve to match the impedance of an antenna, particularly a broadband antenna, at the radiating element of the array, with the impedance transition between a coaxial waveguide and a hollow waveguide through the impedance transition 106 using impedance elements 108*a* and 108*b*. As shown in FIG. 1, the waveguide transition device 100 may support a fundamental $TE_{10}$ mode of a hollow single ridge waveguide at waveguide port 110 and a TEM mode at each of the coaxial waveguide conductors. Further, the transition may connect coaxial waveguides 102*a*, 102*b* to a coaxial-fed antenna array element on one end of the waveguide transition device 100 and hollow waveguide corporate combiner network on another end, such as waveguide port 110 of the waveguide transition device 100.

It should also be noted that while the first coaxial waveguide 102*a* and the second coaxial waveguide 102*b* are shown as having a rectangular or square cross-sectional geometry, other geometries are possible, such as circular, elliptical, or multi-faceted polygon geometries, to adjust specific characteristics of the operation of the waveguide and interface with a coaxial-fed antenna array element.

Finally, as discussed above, the waveguide transition device 100 may be made using metal additive manufacturing techniques (i.e., three-dimensional metal printing) which provide significant added benefit to the process of making the waveguide transition device 100. In some cases, metal additive manufacturing techniques allow the waveguide transition device 100 to be made where conventional techniques (such as CNC milling, for example) would be unable to replicate the shapes, sides, and construction of the waveguide transition device 100.

Figure 2:
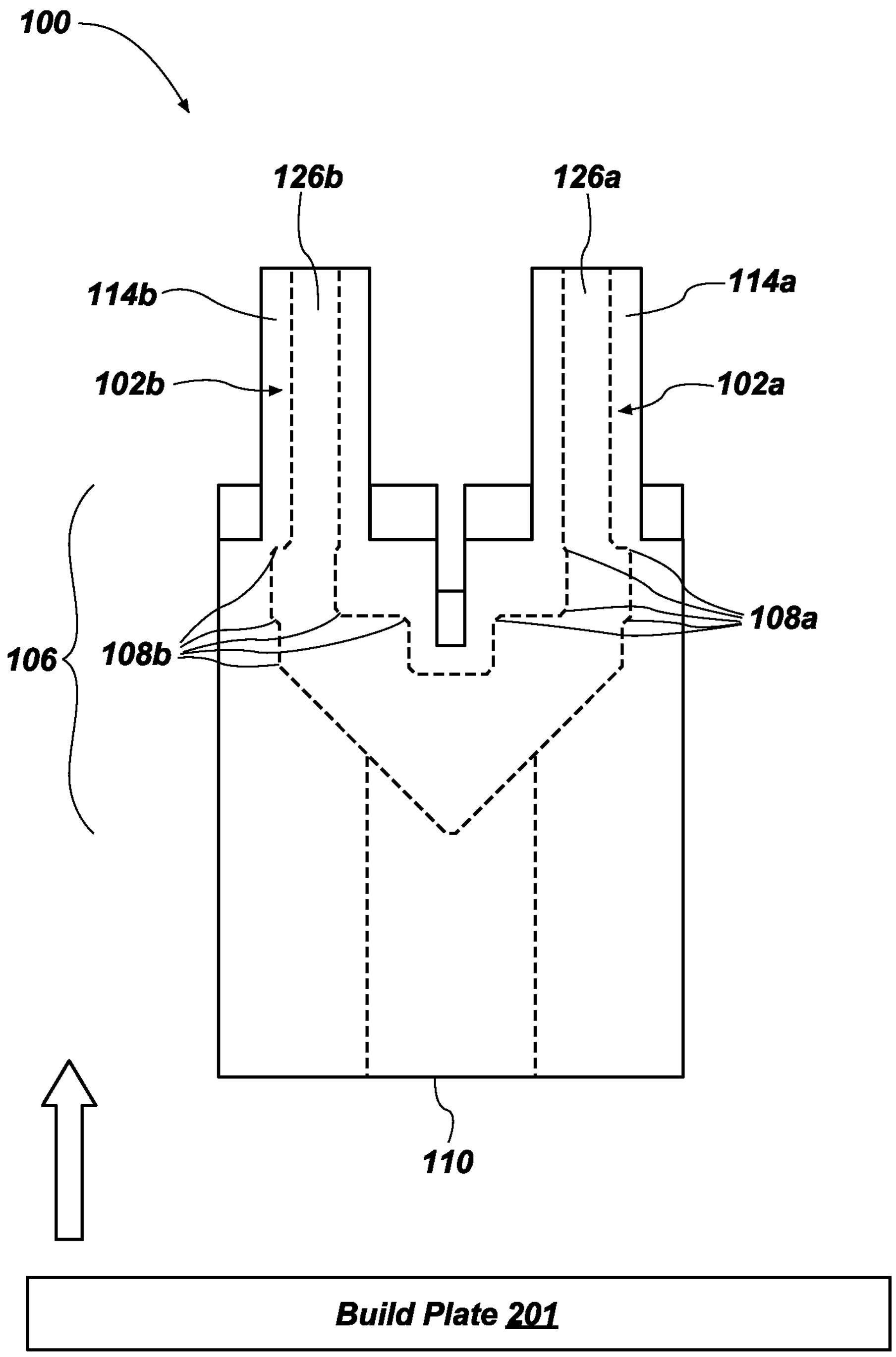
FIG. 2 illustrates a cross-sectional view of a hollow single ridge waveguide to dual-coaxial waveguide transition.

FIG. 2 illustrates a cross-sectional view of a waveguide transition device 100 comprising a single ridge waveguide to dual-coaxial waveguides 102*a*, 102*b*, also shown in FIG. 1. The waveguide transition device 100 may include a first coaxial waveguide 102*a* and a second coaxial waveguide 102*b* which may each be connected to a coaxial-fed antenna array element. Each of the coaxial waveguides 102*a*, 102*b* may be constructed of a metal or other conductive material. The transition may further include an impedance transition 106 which serves to match the impedance of the coaxial waveguides to other hollow waveguide components and to the coaxial input/output requirements. The transition 106 also acts as a power combiner or divider depending on which direction an electromagnetic wave is being propagated (e.g., being received or being transmitted). The impedance transition 106 may include impedance matching elements 108*a* and 108*b* which may include indents, outdents, steps with rounded corners, and other features which serve to match the impedance of the impedance transition 106 to a waveguide or to a coaxial input/output. It is also to be noted that impedance matching elements 108*a* and 108*b* may further be matched to each other on opposing sides of the transition (e.g., be symmetric or mirror images of each other).

The waveguide transition device 100 may further include a hollow waveguide port 110 for the transition which may be a hollow single ridge waveguide in the example of FIG. 2. The waveguide transition device 100 may be connected to a host of other waveguide components for propagating an electromagnetic wave, including antennas, power combiners, power dividers, radiating elements, and others, for example. Other transitions, such as dual-ridge transitions are disclosed below. The transition may serve to match the impedance of an antenna, particularly a broadband antenna, at the radiating element of the array, with the impedance transition between a coaxial waveguide and a hollow waveguide through the impedance transition 106 using impedance elements 108*a* and 108*b*. As shown in FIG. 2, the transition may support a fundamental $TE_{10}$ mode in the hollow waveguide and a TEM mode in each of the coaxial waveguides.

The device may be constructed with metal additive manufacturing (i.e., metal three-dimensional printing). The device may be constructed upward relative to a build plate 201, wherein the z-axis for purposes of metal additive manufacturing is orthogonal to the plane of the build plate 201. The device may be designed to ensure all overhanging angles are oriented for an additive manufacturing process.

Figure 3:
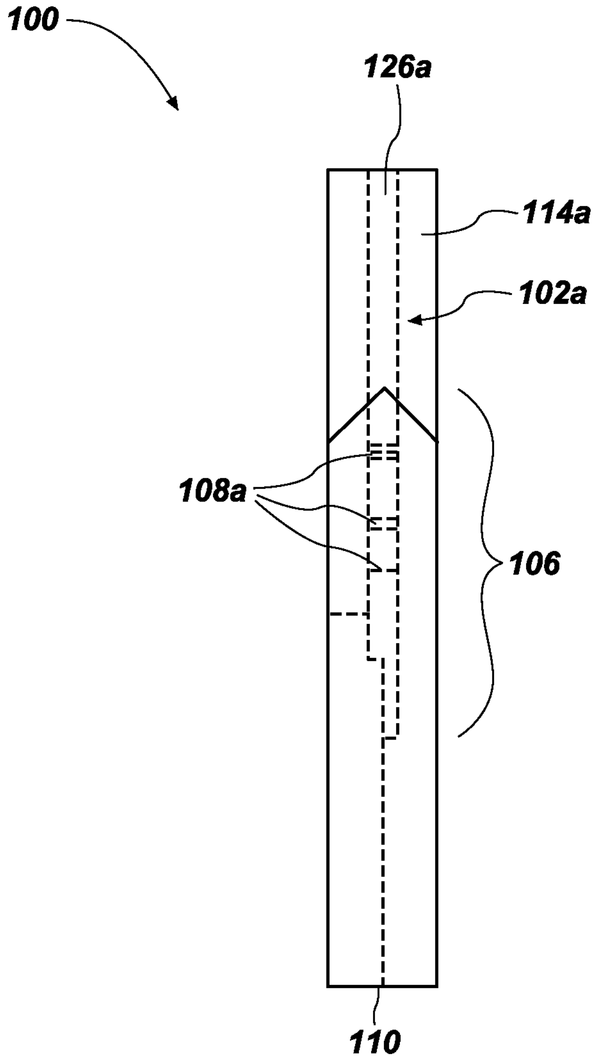
FIG. 3 illustrates a side view of a hollow single ridge waveguide to dual-coaxial waveguide transition.

FIG. 3 illustrates a side view of a waveguide transition device 100 comprising a single ridge waveguide to dual-coaxial waveguides, also shown in FIG. 1 and FIG. 2. The waveguide transition device 100 may include a first coaxial waveguide 102*a* and a second coaxial waveguide 102*b* (shown in FIG. 1 and FIG. 2 and not shown in FIG. 3 due to perspective) which may each be connected to a coaxial-fed antenna array element. The first coaxial waveguide 102*a* includes an inner conductor 126*a* and an outer conductor 114*a*.

The waveguide transition device 100 may further include an impedance transition 106 which serves to match the impedance of the hollow waveguide to other waveguide components and to the coaxial waveguide. The transition 106 also acts as a power combiner or divider depending on which direction an electromagnetic wave is being propagated (e.g., being received or being transmitted). The impedance transition 106 may include impedance matching elements 108*a* and 108*b* (108*b* shown in FIG. 1 and FIG. 2 and not shown in FIG. 3 due to perspective) which may include indents, outdents, steps with rounded corners, and other features which serve to match the impedance of the impedance transition 106 to a hollow waveguide or to a coaxial waveguide. It is also to be noted that impedance matching elements 108*a* and 108*b* may further be matched to each other on opposing sides of the transition (e.g., be symmetric or mirror images of each other).

The waveguide transition device 100 may further include a hollow waveguide port 110 for the transition which may be a hollow single ridge waveguide in the example of FIG. 3. The transition may be connected to a host of other waveguide components for propagating an electromagnetic wave, including antennas, power combiners, power dividers, radiating elements, and others, for example. Other transitions, such as dual-ridge transitions are disclosed below. The transition may serve to match the impedance of an antenna, particularly a broadband antenna, at the radiating element of the array, with the impedance transition between a coaxial waveguide and a hollow waveguide through the impedance transition 106 using impedance elements 108*a* and 108*b*. As shown in FIG. 3, the transition may support a fundamental $TE_{10}$ mode of a hollow waveguide and a TEM mode of a coaxial waveguide.

Figure 4:
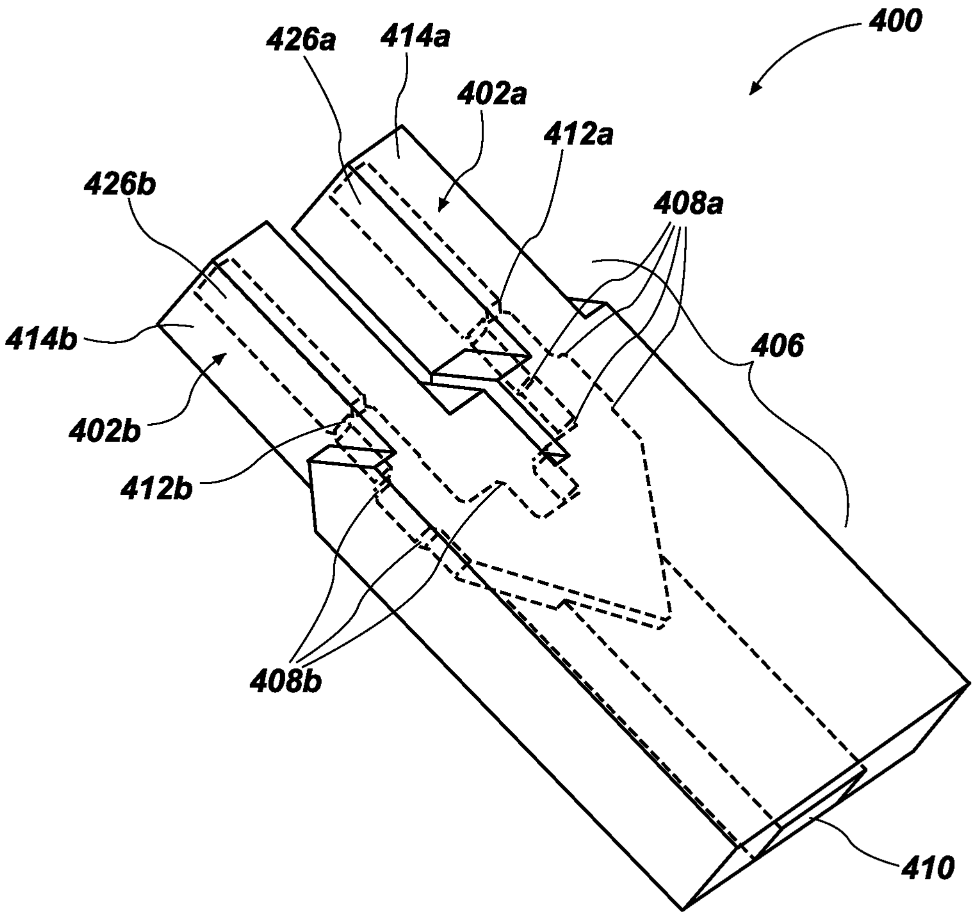
FIG. 4 illustrates a perspective view of a hollow single ridge waveguide to dual-coaxial transition with a rotated impedance transition.

FIG. 4 illustrates an isometric view of a waveguide transition device 400 comprising a single ridge waveguide to dual-coaxial waveguide transition with a rotated coaxial center conductor at the coaxial waveguide ports. The waveguide transition device 400 illustrated in FIG. 4 is like the waveguide transition device 100 illustrated in FIGS. 1-3 but with the addition of the rotational offset of the waveguide, as discussed further herein.

The waveguide transition device 400 may include a first coaxial waveguide 402*a* and a second coaxial waveguide 402*b* which may each be connected to a coaxial-fed antenna array element. The waveguide transition device 400 may further include an impedance transition 406 which serves to match the impedance of the waveguide to other waveguide components and to the coaxial input/output requirements. The transition 406 also acts as a power combiner or divider depending on which direction an electromagnetic wave is being propagated (e.g., being received or being transmitted). The impedance transition 406 may include impedance matching elements 408*a* and 408*b* which may include indents, outdents, steps with rounded corners, and other features which serve to match the impedance of the impedance transition 406 to a waveguide or to a coaxial input/output. It is also to be noted that impedance matching elements 408*a* and 408*b* may further be matched to each other on opposing sides of the waveguide transition device 400 (e.g., be symmetric or mirror images of each other).

The waveguide transition device 400 may further include a hollow waveguide port 410 for the waveguide transition device 400 which may be a hollow single ridge waveguide in the example of FIG. 4. The waveguide transition device 400 may be connected to a host of other waveguide components for propagating an electromagnetic wave, including antennas, power combiners, power dividers, radiating elements, and others, for example. Other transitions, such as dual-ridge transitions are disclosed below. The waveguide transition device 400 may serve to match the impedance of an antenna, particularly a broadband antenna, at the radiating element of the array, with the impedance transition 406 between a coaxial waveguide and a hollow waveguide through the impedance transition 406 using impedance elements 408*a* and 408*b*. As shown in FIG. 4, the waveguide transition device 400 may support a fundamental $TE_{10}$ mode of a hollow waveguide and a TEM mode of a coaxial waveguide. As will be discussed below, a dual ridge waveguide may also support a $TE_{10}$ mode for a hollow waveguide. Further, the waveguide transition device 400 may connect coaxial waveguides 402*a*, 402*b* to a coaxial-fed antenna element on one end of the waveguide transition device 400 and additional hollow waveguide components on another end, such as waveguide port 410 of the waveguide transition device 400.

It should also be noted that while first coaxial waveguide 402*a* and second coaxial waveguide 402*b* are shown as being rectangular/square in cross-section, other cross-section geometries are possible, such as circular, or multi-faceted polygon geometries, to adjust specific characteristics of the operation of the waveguide and interface with a coaxial-fed antenna element.

As shown in FIG. 4, the waveguide transition device 400 includes a first coaxial waveguide 402*a* and a second coaxial waveguide 402*b* which include a rotational offset 412*a*, and 412*b*, respectively. The rotational offset 412*a* and the rotational offset 412*b* may allow the waveguide transition device 400 to operate in one of an E-plane and an H-plane of a radiating element or, alternatively, provide for an additional impedance change for correct impedance matching purposes. For example, the transition shown in FIG. 1 may be joined in a combiner network with the waveguide transition device 400, where the first coaxial waveguide 402*a* and second coaxial waveguide 402*b* are rotated 90 degrees from an orientation of first coaxial waveguide 102*a* and second coaxial waveguide 102*b* of the transition, allowing the transition to operate in an E-plane of a coaxially fed radiating element, for example, and the waveguide transition device 400 to operate in an H-plane of a coaxially fed radiating element, for example. The rotational offsets 412*a* and 412*b* provide a twist in the first coaxial waveguide 402*a* and the second coaxial waveguide 402*b* such that the metal conductor is continuous throughout the twist of the rotational offset 412*a* and 412*b*.

In an implementation, the rotational offsets 412*a*, 412*b* are implemented to ensure that the coaxial waveguides are offset 90-degrees relative to one another. In this implementation, the first coaxial waveguide 102*a* may be oriented orthogonal, or nearly orthogonal, to the second coaxial waveguide 102*b*.

Finally, as discussed above, the waveguide transition device 400 may be made using metal additive manufacturing techniques which provides significant added benefit to the process of making the waveguide transition device 400. In some cases, metal additive manufacturing techniques allows the waveguide transition device 400 to be made where conventional techniques (such as CNC milling, for example) would be unable to replicate the shapes, sides, and construction of the waveguide transition device 400.

Figure 5:
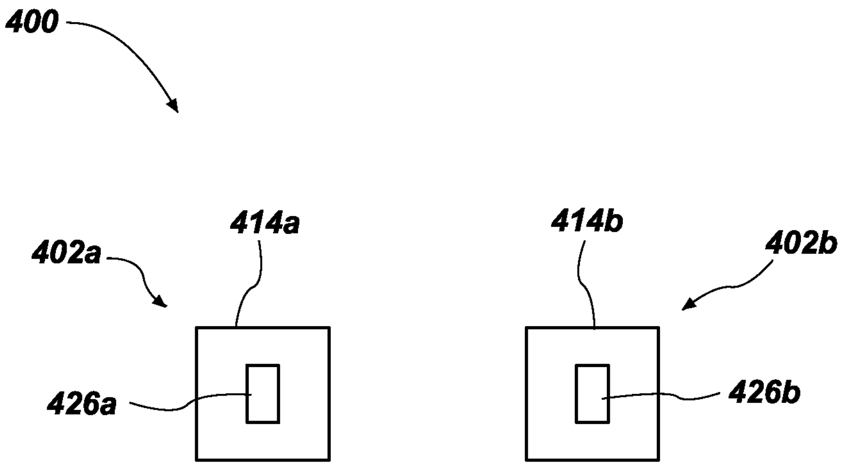
FIG. 5 illustrates a top view of metal center conductors and outer conductors of a coaxial waveguide within a single ridge waveguide to dual-coaxial waveguide transition.

FIG. 5 illustrates a top view of a waveguide transition device 400 comprising metal center conductors (426*a*, 426*b*) and metal outer conductors (414*a*, 414*b*) of dual-coaxial waveguides 402*a*, 402*b* in a single ridge waveguide to dual-coaxial waveguide transition, also shown in FIG. 4. FIG. 5 illustrates a first coaxial waveguide 402*a* that comprises an inner conductor 426*a* and an outer conductor 414*a*. The figure further illustrates a second coaxial waveguide 402*b* including an inner conductor 426*b* and an outer conductor 414*b*.

As shown in FIG. 5, a top of inner conductor 426*a* and a top of inner conductor 426*b* are disposed within outer conductors 414*a* and 414*b* of the coaxial waveguides 402*a* and 402*b*, and are rectangularly shaped, although other shapes are possible, as discussed above. As discussed above with respect to FIG. 4, the first coaxial waveguide 402*a* and the second coaxial waveguide 402*b* may be rotated by 90 degrees, as desired, to allow a coaxial radiating element connected to the waveguide transition device 400 to operate in the E-plane or the H-plane based on the requirements of a particular application.

The coaxial waveguides 402*a*, 402*b* may be sized to match to a radiating element coaxial geometry. The air volume (represented in FIG. 5 as the space between the inner and outer conductors of coaxial the waveguides 402*a*, 402*b* may be sized to provide impedance match between an antenna element and transition region inside the waveguide.

Figure 6:
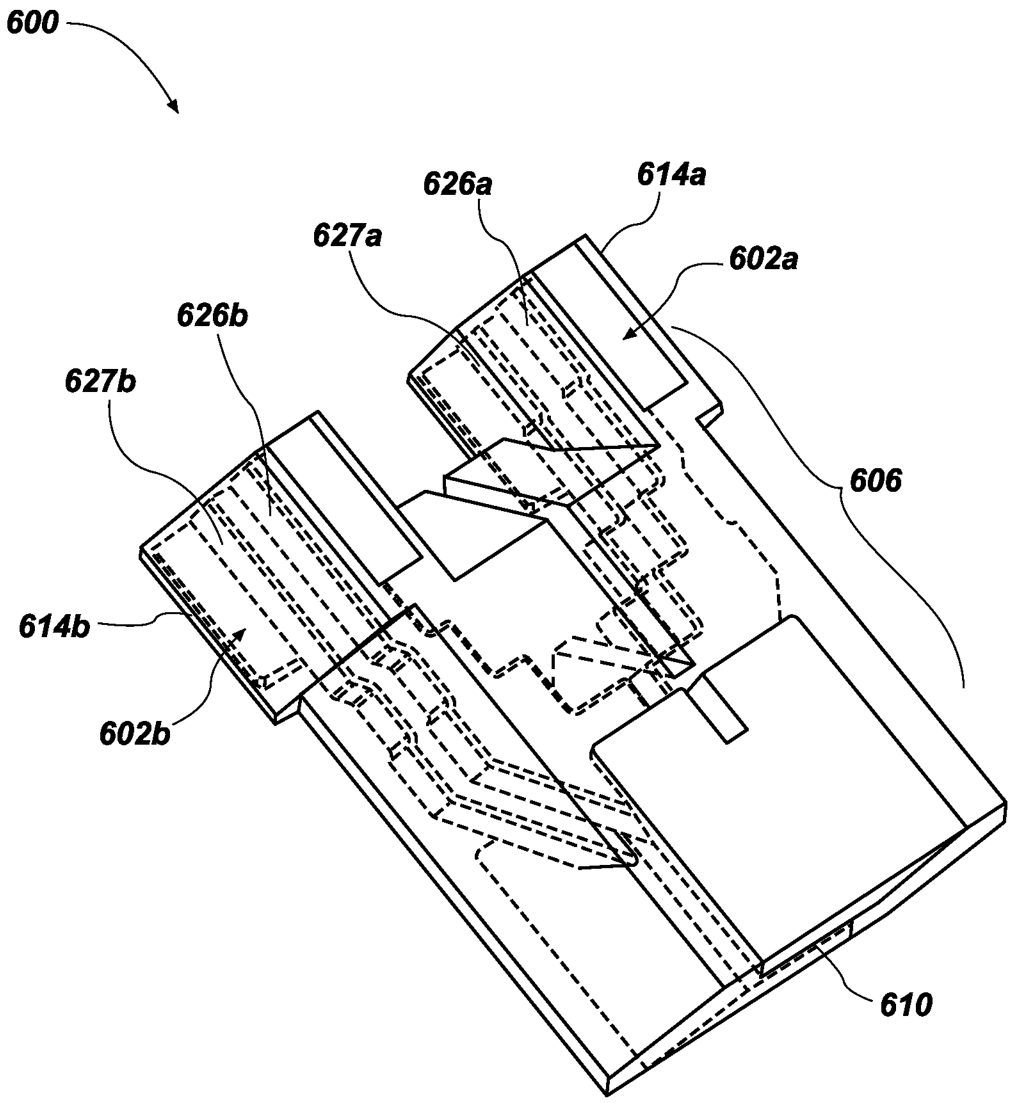
FIG. 6 illustrates a perspective view of a dual-ridge waveguide to dual twin-wire balanced coaxial waveguide transition.

FIG. 6 illustrates an isometric view of a waveguide transition device 600 comprising a hollow dual-ridge waveguide to dual twin-wire balanced coaxial waveguides. The waveguide transition device 600 essentially provides a direct conversion and power split from a hollow dual ridge waveguide $TE_{10}$ mode into a balanced twin-wire coaxial mode.

The waveguide transition device 600 includes three metal conductors for each of the two twin-wire balanced coaxial waveguides (e.g., two balanced inner conductors and one outer conductor in each twin-wire balanced coaxial waveguide arrangement). The first coaxial waveguide 602*a* includes a first inner conductor 626*a* and a second inner conductor 627*a* enclosed by the outer conductor 614*a* body of the twin-wire balanced coaxial waveguide. The second coaxial waveguide 602*b* includes a first inner conductor 626*b* and a second inner conductor 627*b* enclosed by the outer conductor 614*b* body of the twin-wire balanced coaxial waveguide. The waveguide transition device 600 may further include an impedance transition 606, which is similar in implementation and description to the transition 106, shown in FIG. 1 and including (and duplicating)

impedance elements. The waveguide transition device 600 further includes a hollow dual ridge waveguide port 610.

Figure 7:
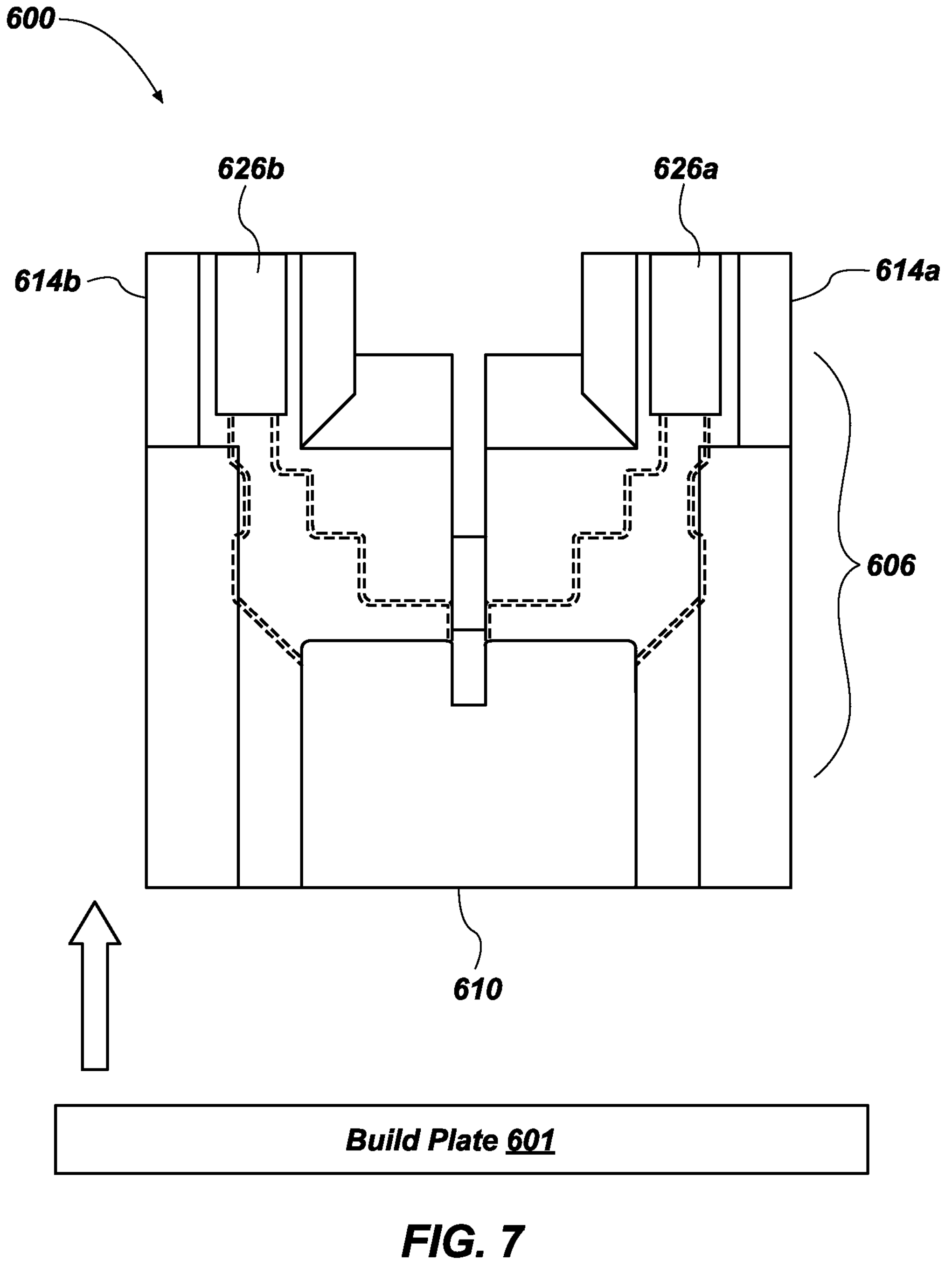
FIG. 7 illustrates a cross-sectional view of a dual-ridge waveguide to dual twin-wire balanced coaxial waveguide transition.

FIG. 7 illustrates a cross-sectional view of a waveguide transition device 600 comprising a hollow dual-ridge waveguide to dual twin-wire balanced coaxial ports, also shown in FIG. 6. The waveguide transition device 600 essentially provides a direct conversion and power split from a hollow dual ridge waveguide $TE_{10}$ mode into a balanced twin-wire coaxial mode, only one side of which is shown due to the perspective of FIG. 7, in a single waveguide transition device 600 to make the waveguide transition device 600 a hollow dual-ridge waveguide to dual twin-wire balanced coaxial waveguide transition.

Accordingly, the waveguide transition device 600 includes four inner metal conductors (e.g., a dual twin-wire arrangement). The device includes a first coaxial waveguide 602*a* including a first inner conductor 626*a* and a second inner conductor 627*a*. The device includes a second coaxial waveguide 602*b* including a first inner conductor 626*b* and a second inner conductor 627*b*. The second inner conductors 627*a*, 627*b* are not shown due to the cross-sectional view of FIG. 7. The outer conductors 614*a*, 614*b* for the balanced twin-wire coaxial waveguide are provided by the external body of waveguide transition device 600. The waveguide transition device 600 may further include an impedance transition 606, which is similar in implementation and description to the transition 406, shown in FIG. 4 and including (and duplicating) impedance elements 408*a* and 408*b*. The waveguide transition device 600 further includes a hollow waveguide port 610.

The device may be constructed with metal additive manufacturing (i.e., metal three-dimensional printing). The device may be constructed upward relative to a build plate 601, wherein the z-axis for purposes of metal additive manufacturing is orthogonal to the plane of the build plate 601. The device may be designed to ensure all overhanging angles are oriented for an additive manufacturing process.

Figure 8:
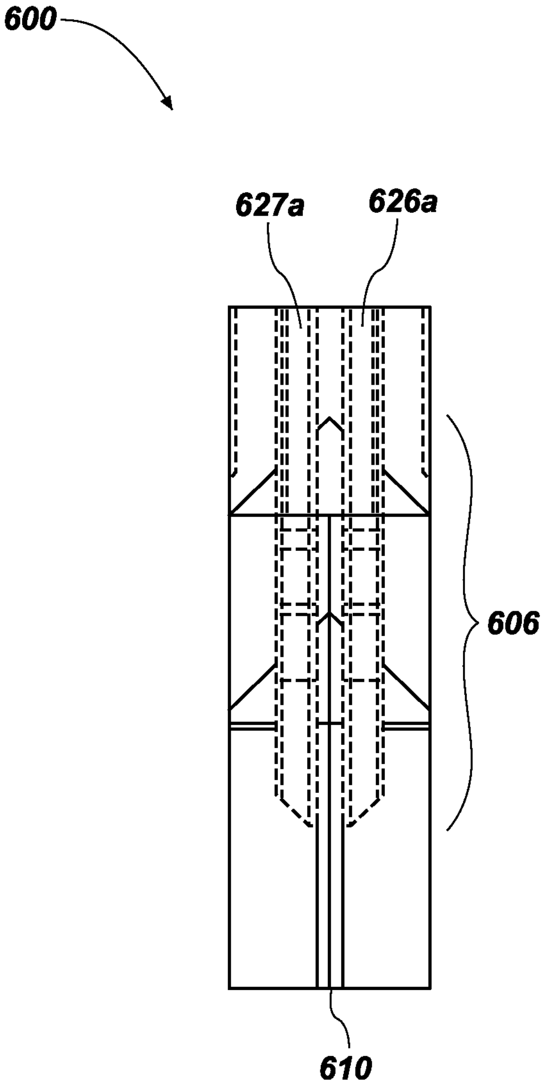
FIG. 8 illustrates a side view of a dual-ridge waveguide to dual twin-wire balanced coaxial waveguide transition.

FIG. 8 illustrates a side view of a waveguide transition device 600 comprising a hollow dual-ridge waveguide to dual twin-wire balanced coaxial waveguide, also shown in FIG. 6. The waveguide transition device 600 essentially provides a direct conversion and power split from a hollow dual ridge waveguide $TE_{10}$ mode into a balanced twin-wire coaxial mode. Accordingly, the waveguide transition device 600 includes four metal inner conductors (e.g., a dual twin-wire arrangement).

The first coaxial waveguide 602*a* includes a first inner conductor 626*a* and a second inner conductor 627*a*. The second coaxial waveguide 602*b* is not illustrated due to the perspective of FIG. 8. However, the first inner conductor 626*a* and the second inner conductor 627*a* of the first coaxial waveguide 602*a* are seen as discrete individual conductors for a balanced twin-wire coaxial waveguide. The waveguide transition device 600 may further include an impedance transition 606, which is similar in implementation and description to the transition 406, shown in FIG. 4 and including (and duplicating) impedance elements 408*a* and 408*b*. The waveguide transition device 600 further includes a hollow waveguide port 610.

Figure 9:
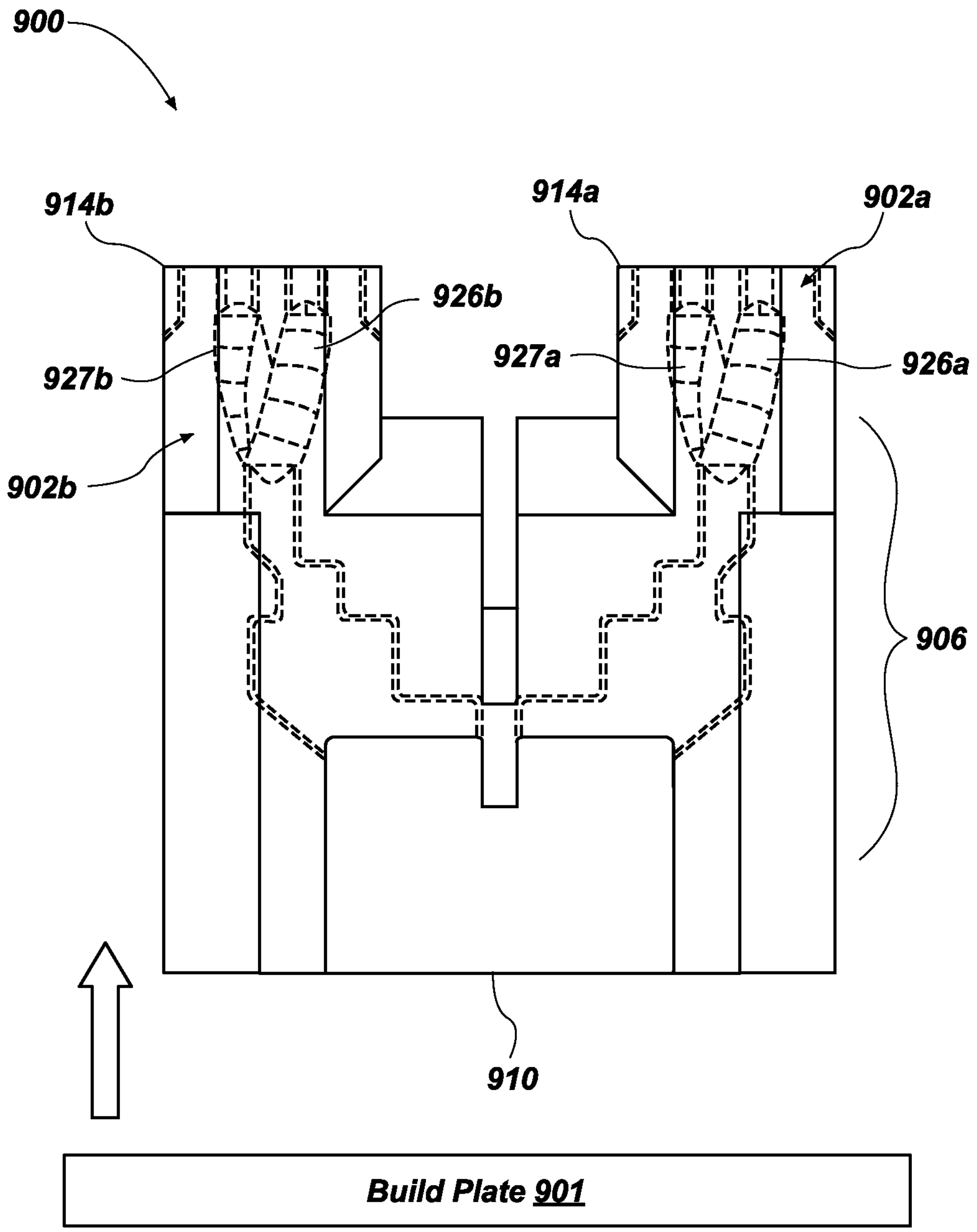
FIG. 9 illustrates a cross sectional view of a dual-ridge waveguide to dual twin-wire balanced helical coaxial waveguide transition with a helical twist coaxial wire waveguide.

FIG. 9 illustrates a cross sectional view of a waveguide transition device 900 comprising a hollow dual-ridge waveguide to dual twin-wire balanced coaxial waveguide with a helical twist twin-wire coaxial waveguide. FIG. 9 and the other figures herein (specifically, FIGS. 1-13, 17, 19, and 24) are illustrated such that the dotted lines represent solid components (may be constructed of metal), and non-dotted lines represent the outline of negative space. In FIG. 9, for example, the dotted lines represent coaxial wire within the waveguide that is oriented with a helical twist. The solid lines represent the outline of a solid component that is not illustrated, such that the space between a dotted line and a solid line represents negative space wherein air can pass through.

The waveguide transition device 900 essentially provides a direct conversion and power split from a hollow dual ridge waveguide $TE_{10}$ mode into a balanced twin-wire coaxial mode, including a helical twist in the balanced coaxial twin-wire waveguide to reorient the balanced twin wire orientation to align with a twin-wire fed radiating element.

Accordingly, the waveguide transition device 900 includes four metal inner conductors which are oriented within the waveguide transition device 900 with a helical 90-degree twist. The waveguide transition device 900 includes a first coaxial waveguide 902*a* and a second coaxial waveguide 902*b*. The first coaxial waveguide 902*a* includes twin wires in a helical twist formation, wherein the twin wires constitute the first inner conductor 926*a* and the second inner conductor 927*a* surround by the outer conductor 914*a*. Similarly, the second coaxial waveguide 902*b* includes twin wires in a helical twist formation, wherein the twin wires constitute the first inner conductor 926*b* and the second inner conductor 927*b* surround by the outer conductor 914*b*.

The twin wires in the helical twist formations (i.e., the inner conductors of the coaxial waveguides) are disposed between the impedance transition 906. The waveguide transition device 900 includes the impedance transition 906, which is similar in implementation and description to the transition 406, shown in FIG. 4 and including (and duplicating) impedance elements 408*a* and 408*b*. The waveguide transition device 900 further includes a hollow waveguide port 910.

The orientation of the conductor wires is determined based on the cross-sectional geometry of the wire. The cross-sectional geometry may be rectangular, square, elliptical, circular, or some other geometric shape. The orientation of the cross-sectional geometry of the conductor wire may be changed from a first end (at the impedance transition 906 region) to a second end (distal from the impedance transition 906 region). In an implementation as illustrated in FIG. 9, the orientation of the conductor wire at the second end is orthogonal relative to the orientation of the conductor wire at the first end. In this case, the helical twist formation causes the conductor wire to twist until its orthogonal to itself.

The device may be constructed with metal additive manufacturing (i.e., metal three-dimensional printing). The device may be constructed upward relative to a build plate 901, wherein the z-axis for purposes of metal additive manufacturing is orthogonal to the plane of the build plate 901. The device may be designed to ensure all overhanging angles are oriented for an additive manufacturing process.

Figure 10:
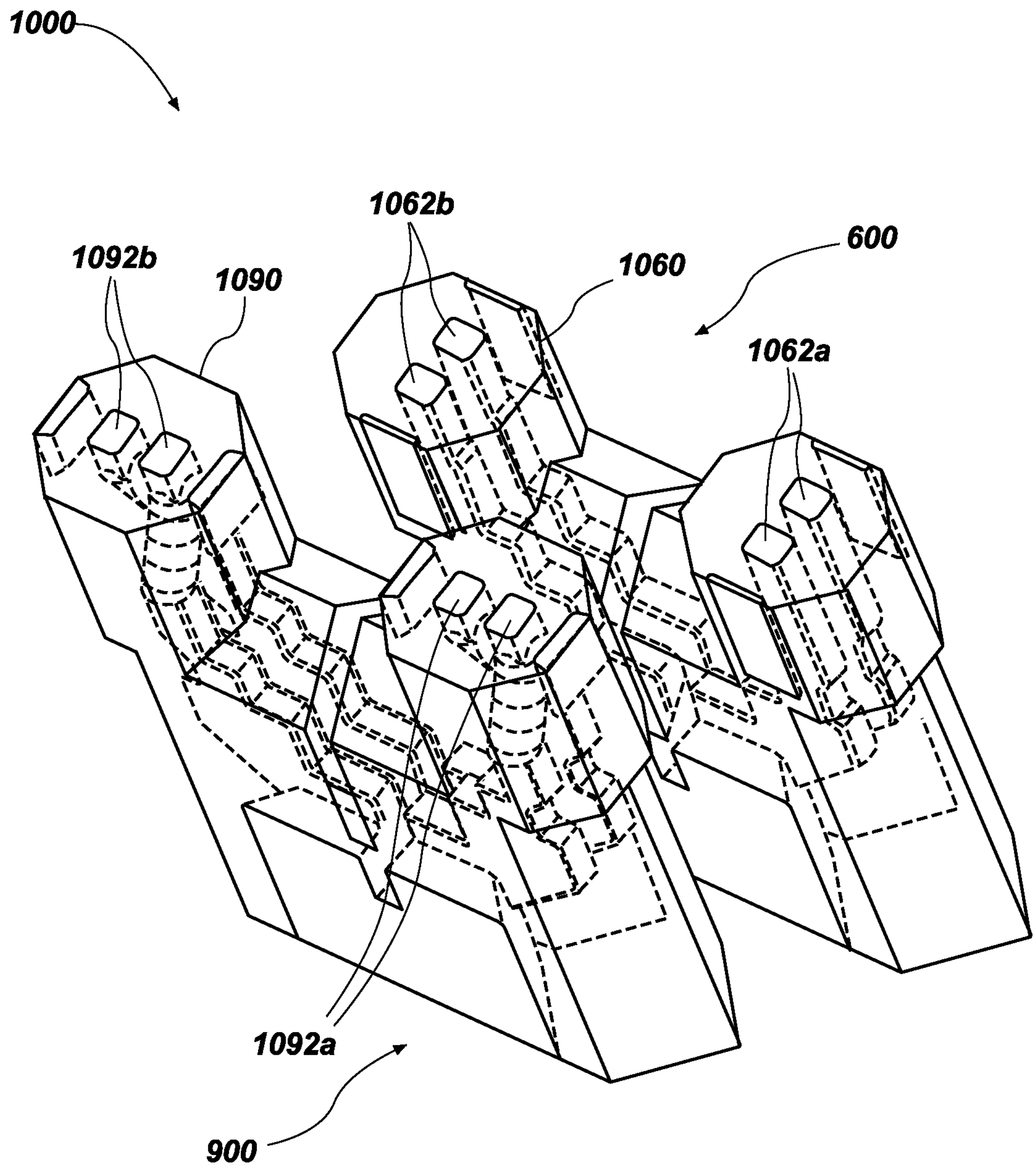
FIG. 10 illustrates a perspective view of two dual-ridge waveguide to dual twin-wire balanced coaxial waveguide with a helical twist coaxial wire waveguide at an orthogonal reorientation of the twin coaxial wire.

FIG. 10 illustrates a perspective view of a waveguide transition device 1000 comprising two hollow dual-ridge waveguide to dual twin-wire balanced coaxial waveguide transitions wherein the transition is similar in implementation and description to the waveguide transition device 600 and similar in implementation and description to the waveguide transition device 900. The waveguide transition device 1000 essentially includes the waveguide transition device 600 illustrated in FIG. 6 and the waveguide transition device 900 illustrated in FIG. 9.

The waveguide transition device 1000 includes the dual twin-wire balanced coaxial waveguide (see 600) illustrated in FIG. 6 and further includes the dual twin-wire balanced coaxial waveguide with a helical twist twin-wire coaxial waveguide (see 900) illustrated in FIG. 9. The helical twist coaxial twin-wire waveguide of the transition 1090 from waveguide transition device 900 orients the twin-wire balanced coaxial waveguide ports of the transition 1090 from waveguide transition device 900 at an orthogonal orientation relative to the twin-wire balanced coaxial waveguide ports of the transition 1060 from waveguide transition device 600. The transitions 1060, 1090 from devices 600 and 900 are combined into a single antenna array element to generate waveguide transition device 1000.

The pair of waveguides in each of devices 600 and 900 support two orientations of twin wire coax for feeding dual-polarized antenna array elements which are fed by a twin-wire balanced coaxial waveguide. The helical twist of the inner conductors within the coaxial waveguide allows for reorientation of the twin wire coax to align with the orientation of the twin-wire balanced antenna radiating element.

As shown in FIG. 10, twin-wire inner conductor pairs 1062*a* and 1062*b* are similarly oriented. The conductor pairs 1092*a* and 1092*b*, however, are oriented similarly to each other but orthogonal to conductor pairs 1062*a* and 1062*b*. The orientation of the conductor pairs is determined based on the cross-sectional orientation of the wire. In an implementation wherein the conductor wires comprise a cross-sectional rectangular geometry (as illustrated in FIG. 10), the orientation of the conductor wires is determined based on the long-side (or short-side) orientation of the cross-sectional rectangle. The cross-sectional rectangular geometry of the transition 1060 conductors or orthogonal relative to the cross-sectional rectangular geometry of the transition 1090 conductors.

Accordingly, the transitions 1060 and 1090 may each operate in one of an E-plane and an H-plane while also feeding a dual-polarization antenna array comprised of twin-wire balanced coaxial radiating elements. The helical twists implemented on conductor pairs 1092*a* and 1092*b* allow appropriate orientation or reorientation of twin-wire balanced coaxial waveguide fed antenna radiating elements and facilitate a dual polarization broadband antenna array.

Figure 11:
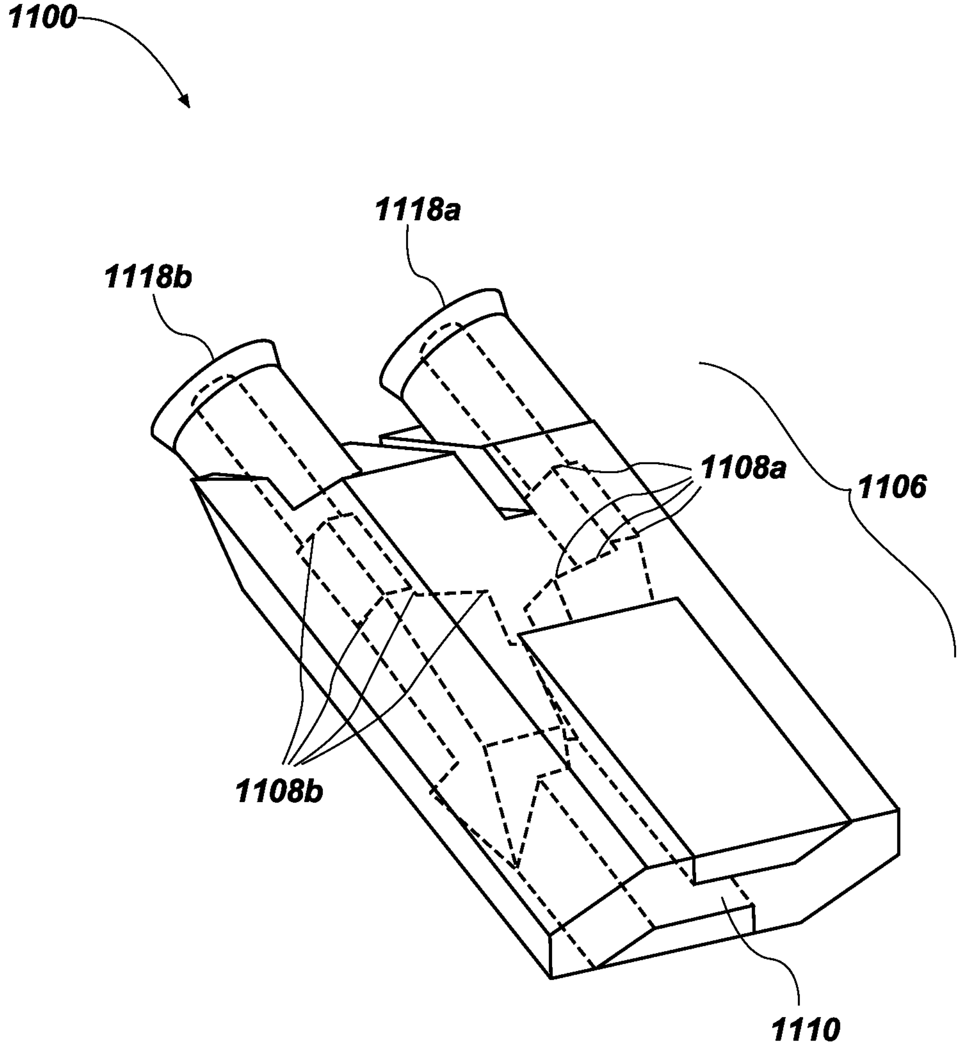
FIG. 11 illustrates a perspective view of a dual-ridge waveguide to dual-coaxial waveguide output transition.

FIG. 11 illustrates an isometric view of a waveguide transition device 1100 comprising a hollow dual-ridge waveguide to dual circular coaxial waveguide output. The waveguide transition device 1100 includes a first circular coaxial waveguide 1118*a* and a second circular coaxial waveguide 1118*b* (e.g., a cross section of the coaxial waveguide outer conductor and inner conductor are circular) as shown in FIG. 11. It should be noted that the cross-sectional geometry of the inner conductor(s) disposed within the coaxial waveguide need not be the same cross-sectional geometry of the wholistic waveguide. For example, the coaxial waveguide may have an elliptical cross-sectional geometry while the one or more inner conductors disposed within the coaxial waveguide have a rectangular cross-sectional geometry.

The first and second circular coaxial waveguides 1118*a*, 1118*b* may each be directly connected to a coaxial-fed antenna element. The waveguide transition device 1100 may further include an impedance transition 1106 which serves to match the impedance of the waveguide transition device 1100 to other waveguide components and to the coaxial input/output requirements. The transition 1106 also acts as a power combiner or divider depending on which direction an electromagnetic wave is being propagated (e.g., being received or being transmitted). The impedance transition 1106 may include impedance matching elements 1108*a* and 1108*b* which may include indents, outdents, steps with rounded corners, a first and second taper of each ridge of a dual ridge waveguide to support the transition to a coaxial waveguide, and other features which serve to match the impedance of the impedance transition 1106 to a hollow waveguide or to a coaxial waveguide. It is also to be noted that impedance matching elements 1108*a* and 1108*b* may further be matched to each other on opposing sides of the waveguide transition device 1100 (e.g., be symmetric or mirror images of each other). The waveguide transition device 1100 may further include a hollow waveguide port 1110.

Figure 12:
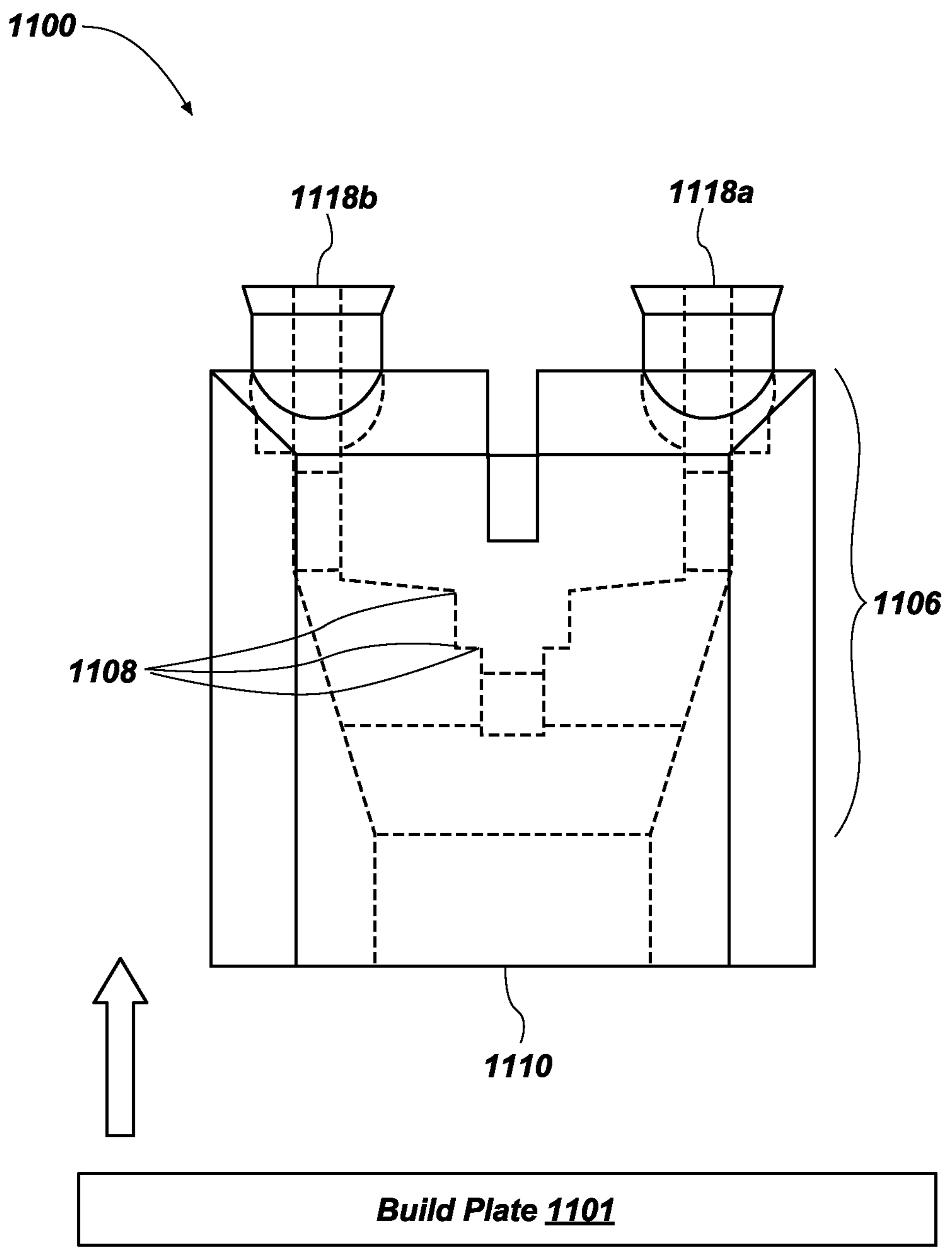
FIG. 12 illustrates cross-sectional view of a dual-ridge waveguide to dual coaxial waveguide output transition.

FIG. 12 illustrates cross-sectional view of a waveguide transition device 1100 comprising a dual-ridge waveguide to dual circular coaxial waveguide output, also shown in FIG. 11. The waveguide transition device 1100 may include a first and second circular coaxial waveguide 1118*a*, 1118*b* (e.g., a cross section of the coaxial waveguide outer conductor and inner conductor are circular) as shown in FIG. 11. The first and second circular coaxial waveguide 1118*a*, 1118*b* may each be connected to a coaxial-fed antenna element. The waveguide transition device 1100 may further include an impedance transition 1106 which serves to match the impedance of the waveguide transition device 1100 to other waveguide components and to the coaxial waveguide input/output requirements. The transition 1106 also acts as a power combiner or divider depending on which direction an electromagnetic wave is being propagated (e.g., being received or being transmitted). The impedance transition 1106 may include impedance matching elements 1108 which may include indents, outdents, steps with rounded corners, a first and second taper of each ridge of a dual ridge waveguide to support the transition to a coaxial waveguide, and other features which serve to match the impedance of the impedance transition 1106 to a hollow dual ridge waveguide or to a coaxial waveguide. It is also to be noted that impedance matching elements 1108 may further be matched to each other on opposing sides of the waveguide transition device 1100 (e.g., be symmetric or mirror images of each other). The waveguide transition device 1100 may further include a hollow waveguide port 1110.

The device may be constructed with metal additive manufacturing (i.e., metal three-dimensional printing). The device may be constructed upward relative to a build plate 1101, wherein the z-axis for purposes of metal additive manufacturing is orthogonal to the plane of the build plate 1101. The device may be designed to ensure all overhanging angles are oriented for an additive manufacturing process.

Figure 13:
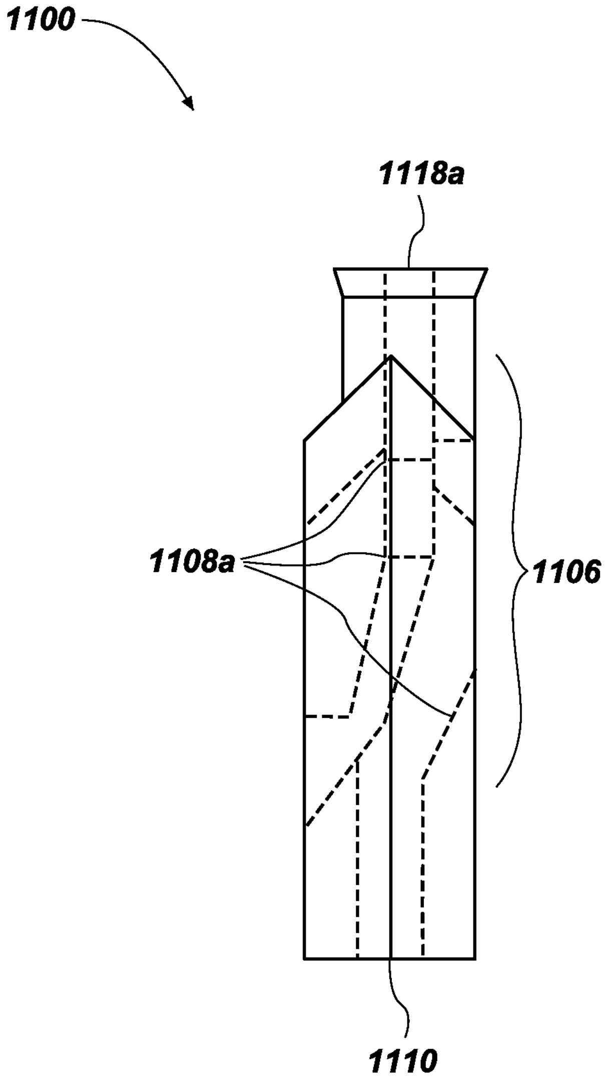
FIG. 13 illustrates a side view of a dual-ridge waveguide to dual coaxial waveguide output transition.

FIG. 13 illustrates a side view of a waveguide transition device 1100 comprising a hollow dual-ridge waveguide to dual circular coaxial waveguide output. The waveguide transition device 1100 may include a circular coaxial waveguide 1118*a* (e.g., a cross section of the coaxial waveguide outer conductor and inner conductor are circular) as shown in FIG. 11. The circular coaxial waveguide 1118*a* may be connected to a coaxial fed antenna array element. The second circular coaxial waveguide 1118*b* is not visible in FIG. 11 due to perspective. The waveguide transition device 1100 may further include an impedance transition 1106 which serves to match the impedance of the hollow dual ridge waveguide to the dual circular coaxial waveguide. The transition 1106 also acts as a power combiner or divider depending on which direction an electromagnetic wave is being propagated (e.g., being received or being transmitted). The impedance transition 1106 may include impedance matching elements 1108*a* and 1108*b* which may include indents, outdents, steps with rounded corners, a first and second taper of each ridge of a dual ridge waveguide to support the transition to a coaxial waveguide, and other features which serve to match the impedance of the impedance transition 1106 to a hollow waveguide or to a coaxial waveguide input/output. It is also to be noted that impedance matching elements 1108*a* and 1108*b* may further be matched to each other on opposing sides of the waveguide transition device 1100 (e.g., be symmetric or mirror images of each other). The waveguide transition device 1100 may further include a hollow waveguide port 1115.

Figure 14:
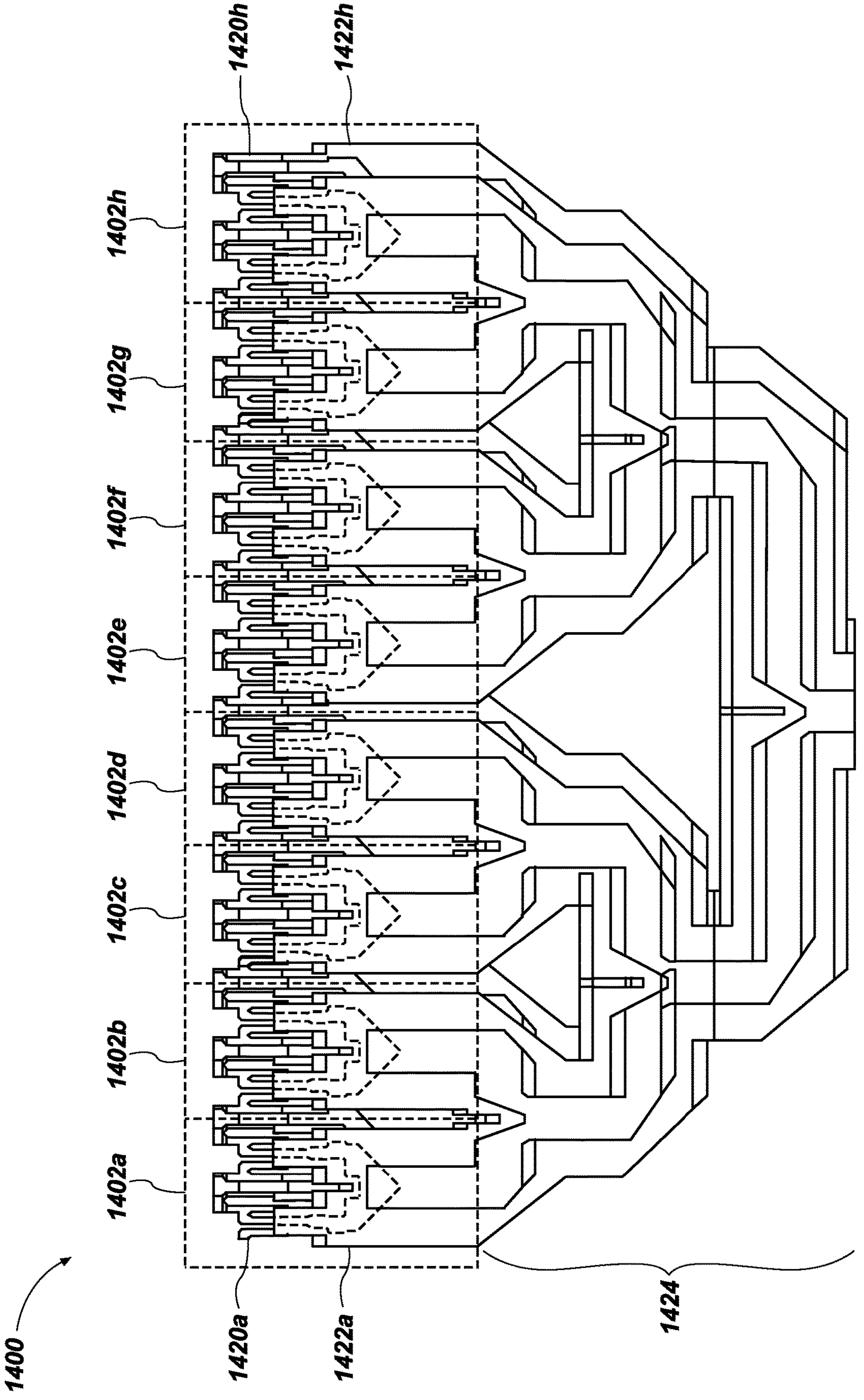
FIG. 14 illustrates a side view of an antenna array element and corporate combiner which incorporates a set of branched single ridge waveguide combiners to dual-coaxial waveguide transitions in a combiner/divider antenna element.

FIG. 14 illustrates a side view of an antenna array 1400 comprising a single combined row of an antenna array which incorporates a number of coaxial-fed antenna elements connected to the coaxial waveguide of the waveguide transition device 400 at 402*a* and 402*b* shown in FIG. 4, above, followed by a hollow single-ridge waveguide combiner network connected to single ridge waveguide port. FIG. 14 is an example of a waveguide combiner network attached to a waveguide-to-coax transition and a coaxial-fed radiating element with broad bandwidth. In an implementation, the lattice spacing between radiating elements is 0.5 wavelengths at the highest frequency, and this allows for electronic scanning in the y-axis (not illustrated, axis orthogonal to the plane of the figure or in the direction into and out of the image). In some implementations, it is possible for the lattice spacing between radiating elements to extend up to one wavelength at the highest frequency of operation for the antenna array. FIG. 14 illustrates two rows of combiners feeding into a dual-polarized antenna element.

It is noted, for purposes of description that the transition may be implemented on side of antenna array 1400, that is not visible due to perspective in FIG. 14. As shown in FIG. 14, a plurality of the transitions 1402*a*-1402*h* are disposed on a combiner divider antenna element. Each one of transitions 1402*a*-1402*h* include a coaxial-fed antenna radiating element 1420*a*-1420*h* and an impedance transition 1422*a*-1422*h*. The plurality of transitions 1402*a*-1402*h* may further be connected by a series of hollow waveguide power combiners/dividers 1424 in a hollow waveguide combiner network. Also, as shown in FIG. 14, two rows of combiners (antenna elements 1400) are provided which feed a dual-polarized antenna element with each row of antenna elements operating in the E-plane or H-plane, as desired. As shown herein, a spacing between coaxial waveguide ports allows for a lattice spacing between radiating elements that is less than or equal to one wavelength of the working frequency of the antenna array and allows for an electronic scan in the direction orthogonal to the row over a wide bandwidth with spacing less than half a wavelength of the working frequency of the antenna array.

In an implementation, the antenna array is implemented with pairs of transitions that may have different components or orientations. For example, an antenna array may be manufactured that includes a pair of transitions from devices 100 and 400 illustrated herein; or a pair of transitions from devices 100 and 600 illustrated herein; or a pair of transitions from devices 100 and 900 illustrated herein; or a pair of transitions from devices 100 and 1100 illustrated herein. Any of the transition devices illustrated herein, including devices 100, 400, 600, 900, and 1100 may be paired with one another in any suitable combination. Additionally, same devices may be paired with one another such that an antenna array may include a pair of identical or mirror-image devices 1100 illustrated in FIG. 11. The device pairs may be selected to ensure that the coaxial waveguide ports are oriented in the desired direction. Accordingly, because the waveguide transition device 1100 is symmetrical, a pair of transitions may include two identical or mirror-image devices 1100. In another implementation, an antenna array may include a pair of devices include waveguide transition device 600 and waveguide transition device 900 as illustrated in FIG. 10. The transition embodiments may be selected based on whether the transition has asymmetries that use the rotation to achieve orientation with the radiating element.

Figure 15:
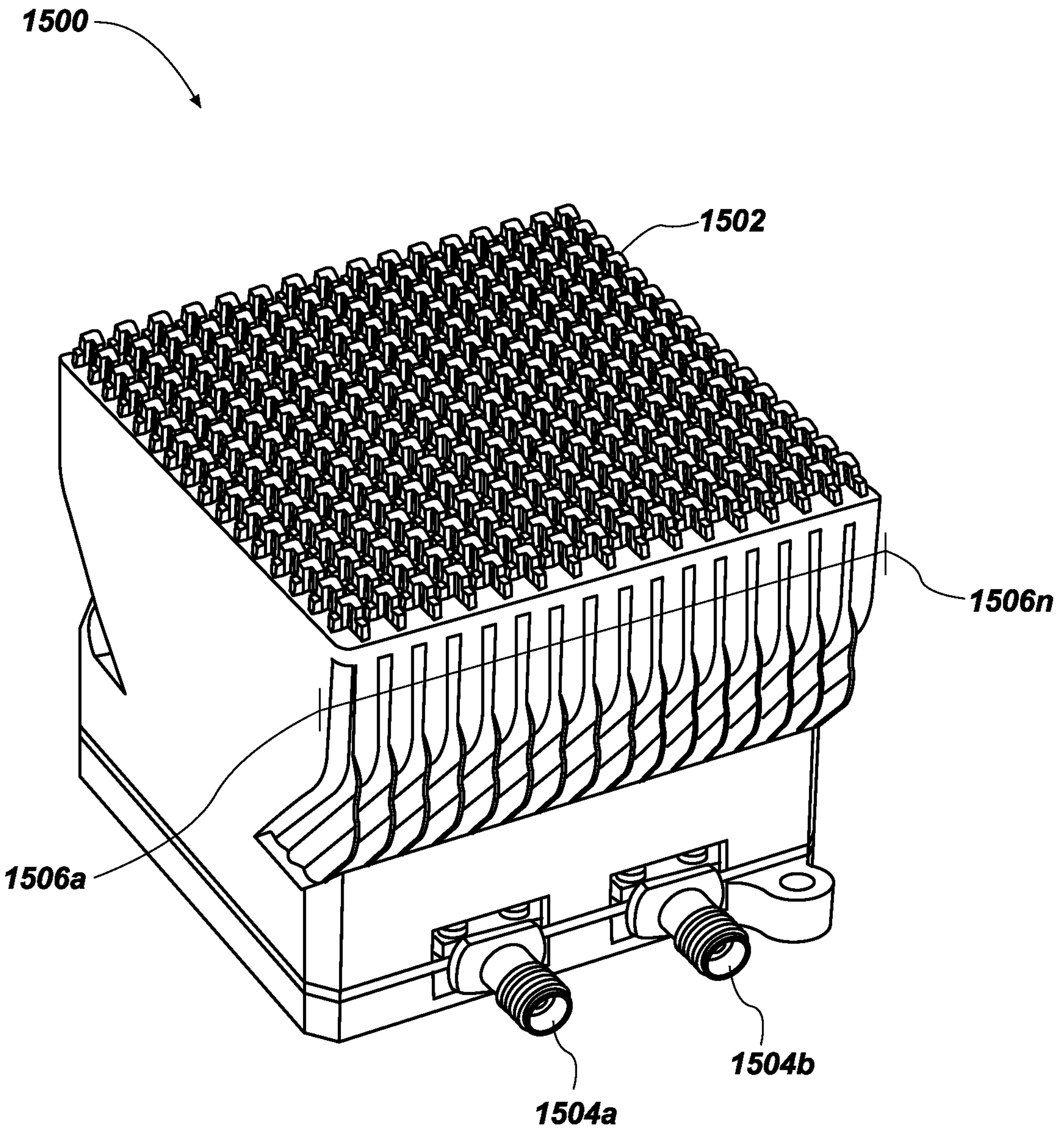
FIG. 15 illustrates fabricated dual-polarized array with combiner network and integrated transition from ridge waveguide to coaxial-fed antenna element at each combiner/divider antenna element.

FIG. 15 illustrates fabricated dual-polarized array 1500 with combiner network and integrated transition from ridge waveguide to coaxial waveguide at each combiner/divider antenna element. In an implementation, the lattice spacing between the radiating elements allows for electronic scan in a single axis. The broad bandwidth of radiating elements allows for multi-band operation.

The array 1500 may incorporate the above-mentioned waveguide elements, disclosed herein. For example, the array 1500 may include a plurality of radiating elements 1502 and coaxial inputs 1504*a*, 1504*b*. The array 1500 may further include a plurality of combiners (antenna elements 1400 as shown in FIG. 14 as representations of air volume) in a chassis produced by metal additive manufacturing techniques, as antenna elements 1506*a*-1506*n*. The array 1500 may be a dual-polarized array which incorporates a broad bandwidth radiating element for multi-band operation.

The array 1500 includes the plurality of radiating elements 1502 and located beneath the radiating elements 1502 (relative to the illustration in FIG. 15) are a plurality of waveguide combiner networks. The array 1500 combines the energy from each row of polarized radiating elements 1502 one row at a time. The energy from each of the radiating elements 1502 in a single row is combined to a single point. This enables improved backend processing for managing operations of the array 1500.

The array 1500 may be implemented as a phased array, which is an electronically scanned array with a computer-controlled array of antennas that create a beam of electromagnetic waves that can be electronically steered to point in different directions without moving the antennas. This is implemented by electronically altering the phase between radiating elements 1502 or between rows of radiating elements 1502. When the phase of the radiating element 1502 is changed, the beam of electromagnetic energy can point off-orthogonal to the antenna rather than perfectly orthogonal to the antenna. In this case, the antenna does not need to be physically or mechanically pointed and can instead be electrically pointed to a desired direction.

The antenna arrays described herein may be implemented in a phased array such as a passive phased array (PESA), an active electronically scanned array (AESA), a hybrid beam forming phased array, or a digital beam forming (DBF) array. The geometries of the elements in the array 1500 and the spacings between different elements in the array 1500 are optimized for combining electromagnetic energy from independent radiating elements 1502 to generate an electronically controllable phased array.

Figure 16:
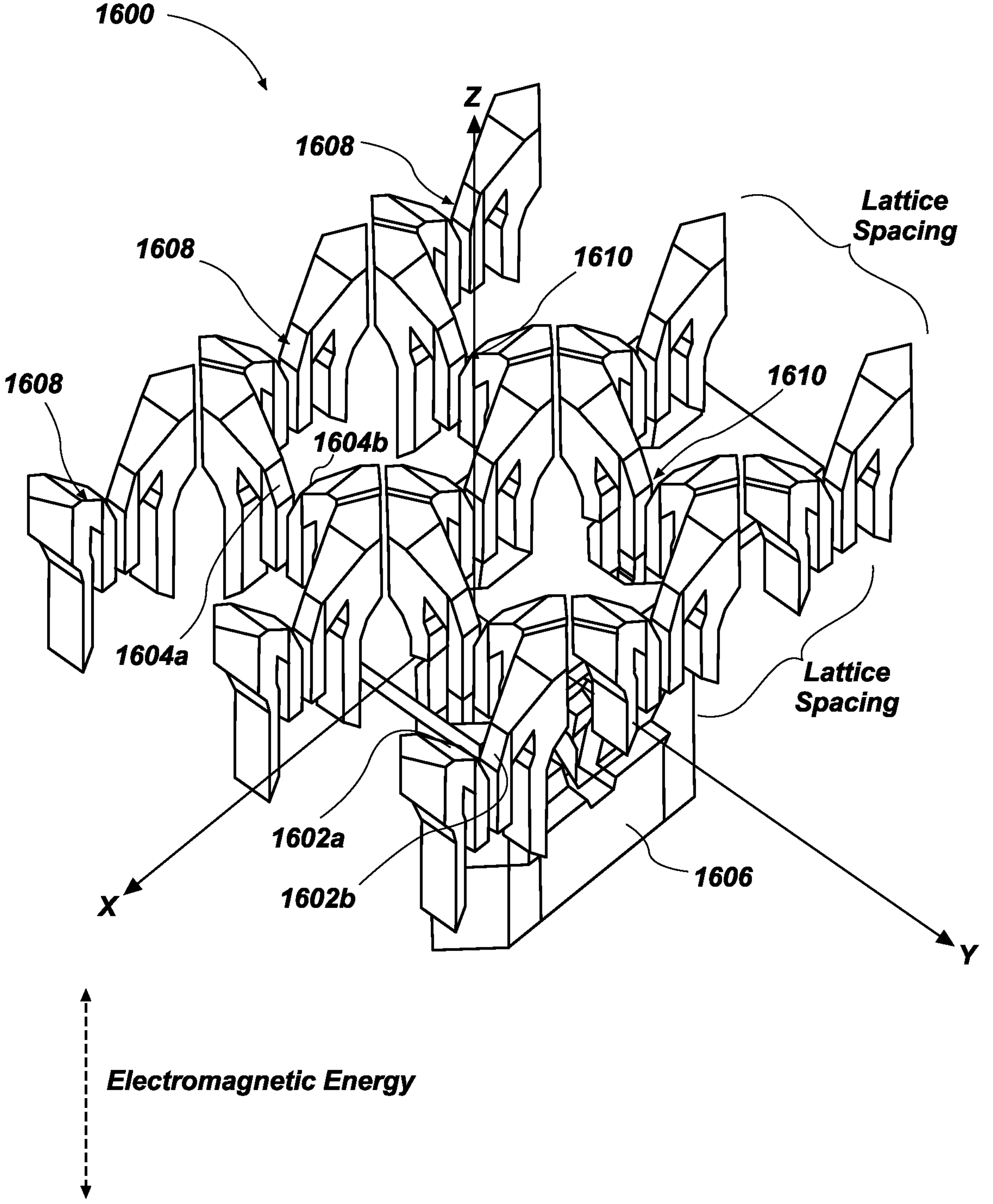
FIG. 16 illustrates an isometric view of an array of radiating elements fed by balanced twin-wire coaxial waveguide, where two waveguide feed sections are shown.

FIG. 16 illustrates an isometric view of an array 1600 comprising radiating elements fed by a waveguide. Only two waveguide feed sections are shown in FIG. 16. FIG. 16 is illustrated such that all components are depicted with solid lines, including solid components (e.g., the metal radiating components 1608) and also those components indicating the boundary of negative space wherein air can pass through.

The array 1600 receives or transmits electromagnetic energy through the waveguide transition device 1606 as illustrated. The waveguide transition device 1606 is incorporated in a waveguide transition device such as those illustrated in FIGS. 1-13 (see devices 100, 400, 600, 900, and 1100).

The array 1600 includes a plurality of radiating components 1608, 1610 such that each waveguide transition device feeds into one or more radiating components 1608, 1610. The radiating components 1608, 1610 are configured for receiving and transmitting electromagnetic energy. The array 1600 includes a plurality of first radiating components oriented at a "benchmark" orientation, which may be referred to herein as benchmark radiating components 1608. The array 1600 further includes a plurality of second radiating components oriented at an orthogonal orientation relative to the benchmark radiating components 1608, which may be referred to herein as orthogonal radiating components 1610. In the example illustrated in FIG. 16, the benchmark radiating components 1608 are oriented along the x-axis and the orthogonal radiating components 1610 are oriented along the y-axis, although it should be appreciated that any orientation is acceptable if the orthogonal radiating components 1610 comprise an orthogonal orientation relative to the benchmark radiating components 1608.

The orientations of the benchmark radiating components 1608 and the orthogonal radiating components 1610 determine the polarization of the electromagnetic waves that are received or transmitted by the radiating components 1608, 1610. Thus, the electromagnetic waves being transmitted or received by the benchmark radiating components 1608 comprise a polarization that is orthogonal to the polarization of the electromagnetic waves being transmitted or received by the orthogonal radiating components 1610. The radiating components 1608, 1610 support dual linear polarization.

The benchmark radiating components 1608 include radiating elements configured to receive or transmit electromagnetic energy though signal ears. Each of the signal ears is in communication with a coaxial waveguide of the waveguide transition device 1606. The radiating elements associated with a benchmark radiating component 1608 may be referred to as benchmark radiating elements 1602*a*, 1602*b* as discussed herein. As illustrated in FIG. 16, the benchmark radiating components 1608 are oriented along the x-axis and each include two benchmark radiating elements 1602*a*, 1602*b* as part of the signal ears that are also oriented along the x-axis.

The orthogonal radiating components 1610 also include radiating elements configured to receive or transmit electromagnetic energy though signal ears. Each of the signal ears is in communication with a coaxial waveguide of the waveguide transition device 1606. The radiating elements associated with an orthogonal radiating component 1610 may be referred to as orthogonal radiating elements 1604*a*, 1604*b* as discussed herein. As illustrated in FIG. 16, the orthogonal radiating components 1610 are oriented along the y-axis and each include two orthogonal radiating elements 1604*a*, 1604*b* as part of the signal ears that are also oriented along the y-axis.

The array 1600 is constructed such that a single waveguide transition device 1606 feeds two pairs of radiating components including a first radiating component comprising a first pair of radiating elements and a second radiating component comprising a second pair of radiating elements. The spacings between the individual radiating elements, the pairs of radiating elements, and the waveguide transition devices are optimized to maintain the desired λ (lambda) spacing at the top frequencies of operation. In implementations described herein, the spacing between two radiating elements may be equal to the lattice spacing of the antenna array.

In an implementation, a single waveguide transition device 1606 feeds two pairs of radiating components of the same orientation. Thus, a single waveguide transition device 1606 is configured for one type of polarization, and neighboring waveguide transition devices may be configured for an orthogonal polarization. The single waveguide transition device therefore ultimately feeds four independent radiating elements (and signal ears) that are tuned to the same polarization.

The array 1600 can be implemented as a phased array. Phased arrays offer numerous advantages by providing reduced total swept volume and rapid beam scanning. Phased arrays are used in military and commercial applications such as wireless communication systems and radar systems. The main purpose of a phased array antenna is to scan a wide angular range with high array gain without mechanically pointing the array. Generally, the lattice spacing between radiating components 1608, or equivalently 1610, in both the x- and y-axes within a phased array antenna is limited to 0.5λ or less to avoid performance problems caused by grating lobes. However, in the array 1600 described herein, the lattice spacing between the radiating elements 1602, 1604 is optimized at 0.5λ but may extend up to 1.0λ. The lattice spacing cannot exceed 1.0λ without suffering significant performance degradation.

FIG. 16 further illustrates the bounds of a lattice spacing in the X-axis direction and the Y-axis direction. The lattice spacing refers to the spacing between duplicate radiating elements. In FIG. 16, duplicated radiating elements may be seen in the X-axis direction and the Y-axis direction, and thus lattice spacings may be identified between those duplicated radiating elements in either axis.

Figure 17:
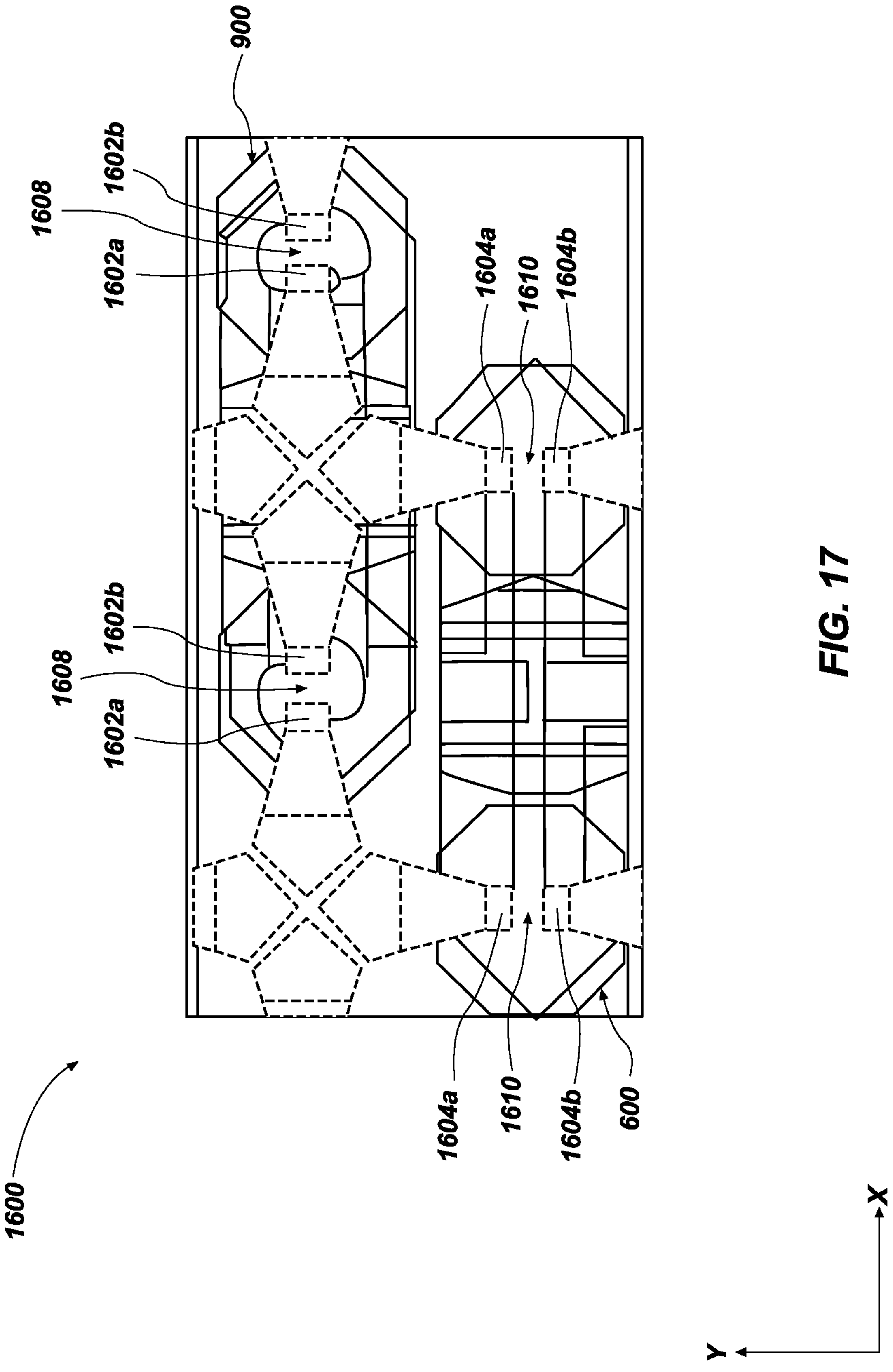
FIG. 17 illustrates a top-down view of an array of radiating elements fed by balanced twin-wire coaxial waveguide.

FIG. 17 illustrates a top-down view of the array 1600 first illustrated in FIG. 16. FIG. 17 is illustrated such that the dotted lines represent solid components (may be constructed of metal), and non-dotted lines represent the outline of negative space. The negative space is empty such that air can pass through.

The array 1600 includes a waveguide transition device 600 comprising a hollow dual-ridge waveguide to dual twin-wire balanced coaxial waveguide such as the waveguide transition device 600 first illustrated in FIG. 6. The array 1600 further includes a waveguide transition device 900 comprising a hollow dual-ridge waveguide to dual twin-wire balanced coaxial waveguide with a helical twist twin-wire coaxial waveguide such as the waveguide transition device 900 first illustrated in FIG. 9. The illustration depicted in FIG. 17 includes the two waveguide devices each feeding into two pairs of radiating elements.

As illustrated in FIG. 17, the waveguide transition device 900 feeds into radiating components 1608 oriented along the x-axis, which may be referred to as the benchmark radiating components 1608 for purposes of discussion. The waveguide transition device 600 feeds into radiating components 1610 oriented along the y-axis, which may be referred to as the orthogonal radiating components 1610 for purposes of discussion.

The waveguide transition device 900 feeds into two benchmark radiating components 1608 as shown in FIG. 17. Each of the two benchmark radiating components 1608 includes two benchmark radiating elements 1602*a*, 1602*b*. The waveguide transition device 600 feeds into two orthogonal radiating components 1610 as shown in FIG. 17. Each of the two orthogonal radiating components 1610 includes two orthogonal radiating elements 1604*a*, 1604*b*. The waveguide transition devices 600, 900 may be selected such that the coaxial waveguides comprise orthogonal orientations relative to one another. The coaxial waveguides may thereby feed into radiating components that are orthogonal relative to one another and may thereby receive and transmit electromagnetic radiation with orthogonal polarization. The arrays described herein support dual linear polarization by integrating orthogonally polarized waveguide transition devices within a single antenna array.

The electromagnetic energy that is propagated through the coaxial waveguides are radiated out by the radiating elements 1602, 1604 at the desired amplitude and phase. This results in an efficient planar radiation geometry in free space. In the reverse implementation, wherein electromagnetic energy is received by the array 1600, the electromagnetic energy radiates through free-space and is received by the radiating elements 1602, 1604 and then propagated through the coaxial waveguides.

The array 1600 may be referred to as a sub-array, or a single portion of a large-scale antenna array. The array 1600 may be duplicated in the x- and y-directions an unlimited number of times depending on the application. In an implementation, the array 1600 is duplicated a number of times equal to a power of 2, such as 2, 4, 8, 16, 32, 64, 128, 256, 512, or 1024 times, and so forth. The performance of the individual arrays 1600 will be impacted by the performance of surrounding arrays 1600 within a large-scale antenna array.

Figure 18:
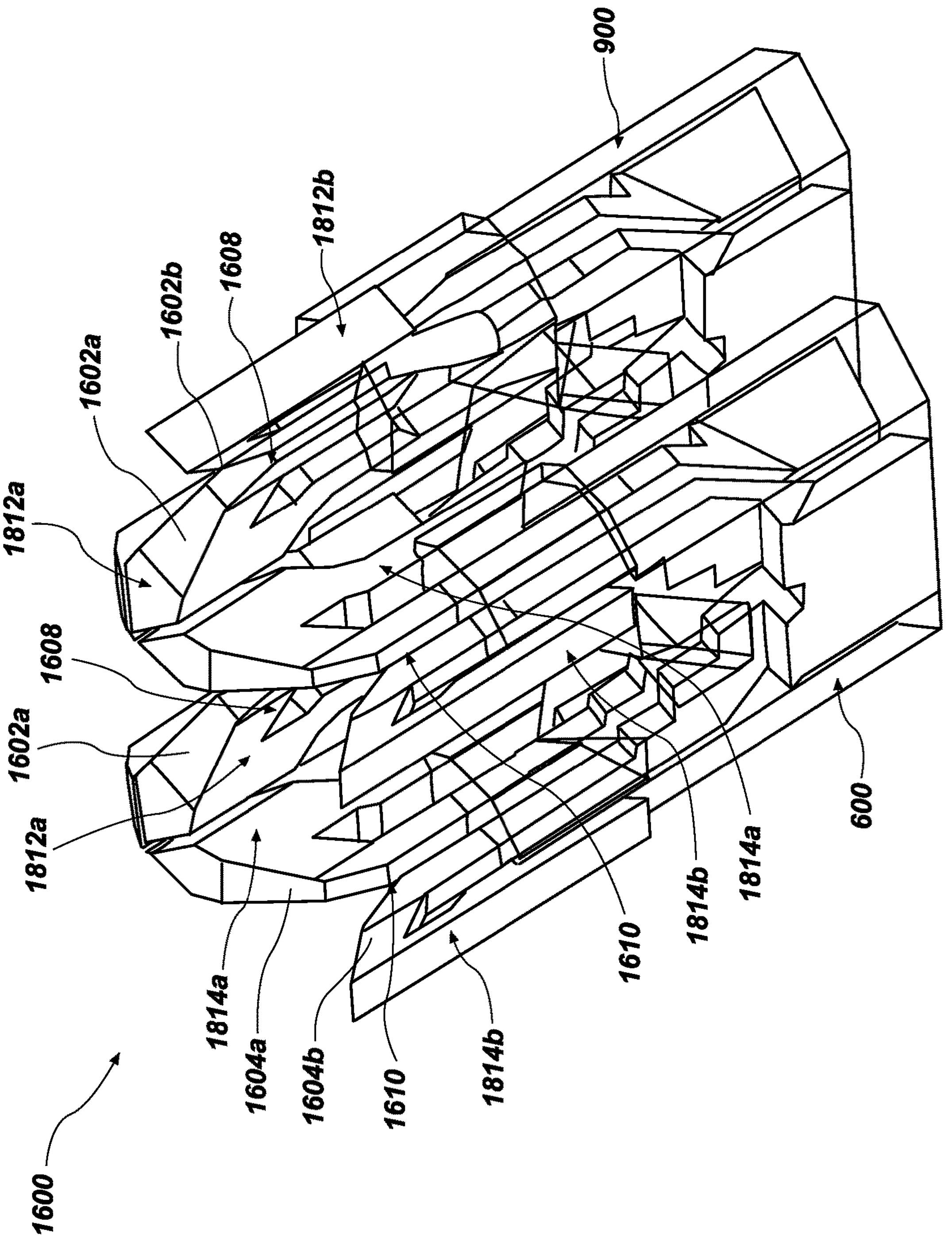
FIG. 18 illustrates an isometric view of an array of radiating elements fed by balanced twin-wire coaxial waveguide.

FIG. 18 illustrates an isometric view of the array 1600 also illustrated in FIGS. 16 and 17. As shown in FIG. 18, the array includes two waveguide devices, including the waveguide transition device 600 comprising a hollow dual-ridge waveguide to dual twin-wire balanced coaxial waveguide such as the waveguide transition device 600 first illustrated in FIG. 6. The array 1600 further includes the waveguide transition device 900 comprising a hollow dual-ridge waveguide to dual twin-wire balanced coaxial waveguide with a helical twist twin-wire coaxial waveguide such as the waveguide transition device 900 first illustrated in FIG. 9.

Consistent with the illustration presented in FIG. 17, the waveguide transition device 600 feeds into two orthogonal radiating components 1610 and the waveguide transition device 900 feeds into two benchmark radiating components 1608. The waveguide transition device 600 therefore feeds into four orthogonal radiating elements 1604*a*, 1604*b* and the waveguide transition device 900 feeds into four benchmark radiating elements 1602*a*, 1602*b*.

The radiating components 1608, 1610 include signal ears. The radiating elements 1602, 1604 are configured to receive or transmit electromagnetic energy through the signal ears. Each of the signal ears is in communication with a coaxial waveguide. Each of the benchmark radiating components 1608 includes two signal ears, which may be referred to herein as benchmark signal ears 1812*a*, 1812*b* for purposes of discussion. Each of the orthogonal radiating components 1610 includes two signal ears, which may be referred to herein as orthogonal signal ears 1814*a*, 1814*b* for purposes of discussion.

Each of the signal ears 1812*a*, 1812*b*, 1814*a*, 1814*b* is in communication with a coaxial waveguide such as those coaxial waveguides illustrated herein (see, e.g., 102*a*, 102*b* first illustrated in FIG. 1; 402*a*, 402*b* first illustrated in FIG. 4; 602*a*, 602*b* first illustrated in FIG. 6; and 902*a*, 902*b* first illustrated in FIG. 9.) A pair of coaxial waveguides therefore feeds into a pair of signal ears. Each signal ear 1812*a*, 1812*b*, 1814*a*, 1814*b* includes a signal portion (the "top" portion disposed in a positive z-axis direction relative to the waveguide device and the build plate) and a grounding portion. The signal portion receives and transmits an electromagnetic energy signal. The grounding portion physically contacts the waveguide transition device (see e.g., 100, 400, 600, 900, 1100) to ground the signal ear with the subarray body and provides physical support and contact for fabrication of the ear using additive manufacturing.

The array 1600 is constructed such that there is a physical connection from the waveguide ridge to the grounding portion of a signal ear 1812*a*, 1812*b*, 1814*a*, 1814*b*. The physical connection between the grounding portion of the signal ears 1812*a*, 1812*b*, 1814*a*, 1814*b* and the subarray body (or waveguide transition device) enables numerous benefits. One benefit is realized during manufacturing and enables the waveguide transition device and the attached radiating components to be constructed of a single piece of metal using metal additive manufacturing. This increases the overall strength and structural stability of the array. Additionally, the physical connection between the grounding portion and the subarray body increases performance of the array by increasing the amount of electromagnetic energy that is received or transmitted by the array.

Figure 19:
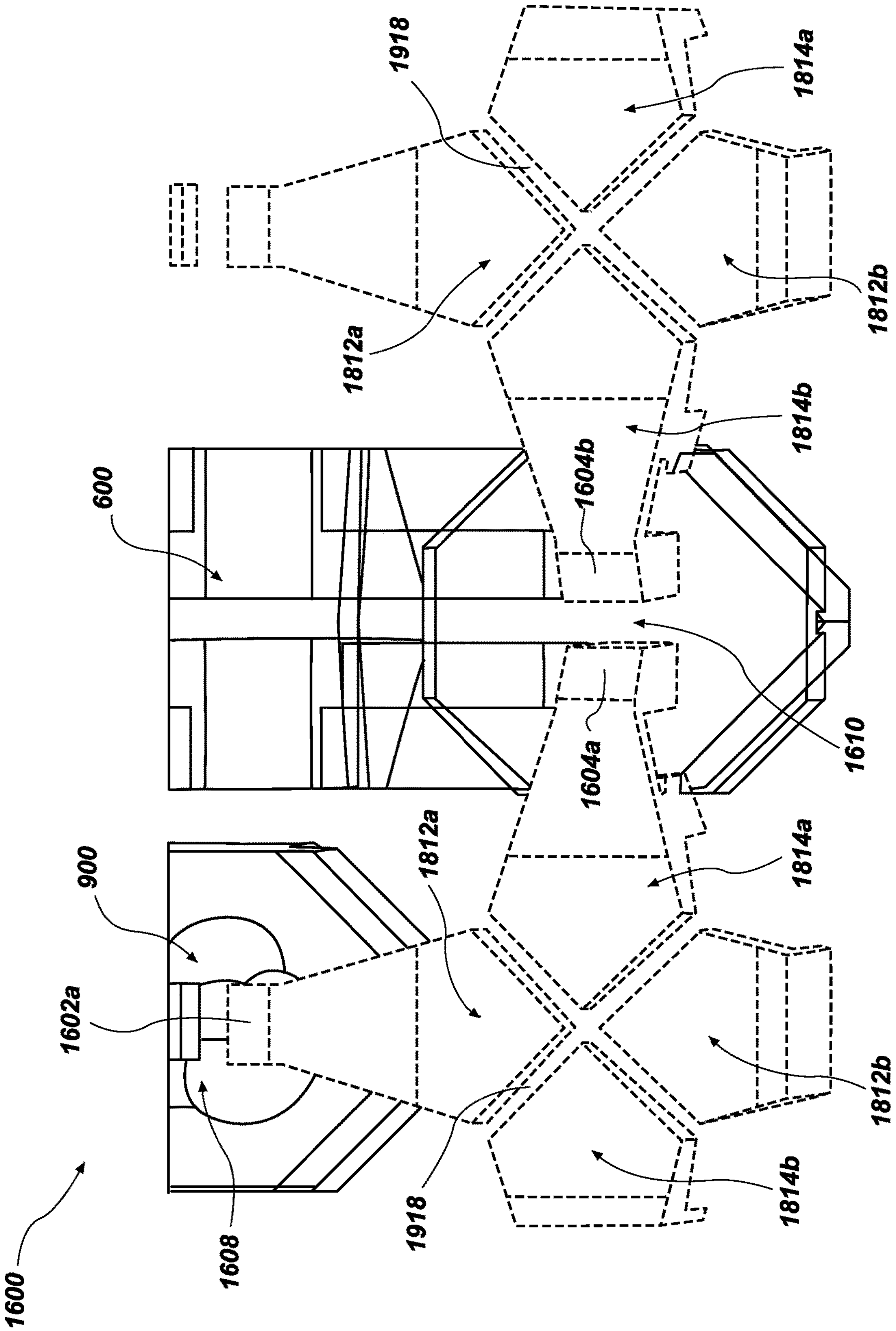
FIG. 19 illustrates a top-down view of a portion of an array of radiating elements fed by balanced twin-wire coaxial waveguide.

FIG. 19 illustrates a top-down view of a portion of the array 1600 first illustrated in FIG. 16. FIG. 19 is illustrated such that the dotted lines represent solid components (may be constructed of metal), and non-dotted lines represent the outline of negative space. The negative space is empty such that air can pass through.

FIG. 19 specifically illustrates a portion of the waveguide transition device 600 feeding into an orthogonal radiating component 1610 comprising a first orthogonal radiating element 1604*a* and a second orthogonal radiating element 1604*b*. FIG. 19 further illustrates a portion of the waveguide transition device 900 feeding into a benchmark radiating component 1608 comprising a first benchmark radiating element 1602*a* and a second benchmark radiating element 1602*b* (not shown). The orthogonal radiating component 1610 includes a first orthogonal signal ear 1814*a* and a second orthogonal signal ear 1814*b*. The benchmark radiating component 1608 includes a first benchmark signal ear 1812*a* and a second benchmark signal ear 1812*b* (not shown attached to the waveguide transition device 900).

The ports of the coaxial waveguides 602*a*, 602*b* from the waveguide transition device 600 feed into the orthogonal signal ears 1814*a*, 1814*b*. The ports of the coaxial waveguides 902*a*, 902*b* feed into the benchmark signal ears 1812*a*, 1812*b*. The pairs of signal ears 1812, 1814 include independent signal ears wherein each signal ear is in communication with a different coaxial waveguide.

The signal ears 1812*a*, 1812*b*, 1814*a*, 1814*b* approach one another and form a signal ear grouping. The signal ear grouping comprising two benchmark signal ears 1812 and two orthogonal signal ears 1814. The distance between the signal ears within the signal ear grouping is referred to as a capacitive gap 1918. The capacitive gap 1918 enables the array 1600 to support a broad frequency bandwidth of operation. In a typical implementation, this may include greater than 3:1 bandwidth (meaning the upper frequency of operation is greater than 3× the lower frequency of operation). The capacitive gap 1918 is included in embodiments wherein the broad frequency bandwidth of operation is needed or desired. In alternative implementations, it is not desirable to have a broad frequency bandwidth of operation, and in these implementations, the capacitive gap 1918 may be eliminated such that the signal ears 1812*a*, 1812*b* 1814*a*, 1814*b* forming the signal ear grouping physically touch one another (see, e.g., FIG. 23). It should be appreciated that any of the embodiments described herein may be implemented with or without the capacitive gap depending on the implementation.

Figure 20:
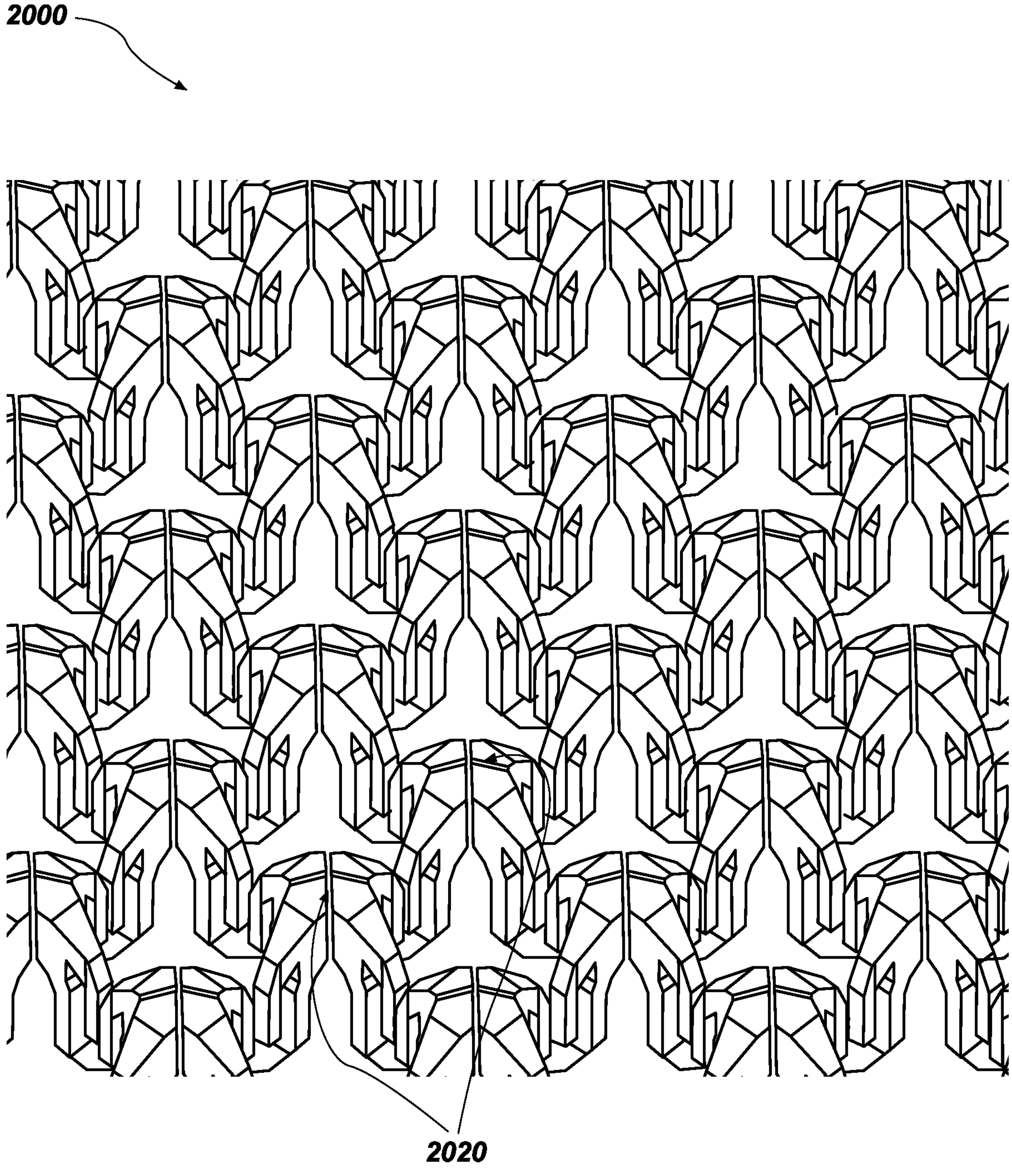
FIG. 20 illustrates an isometric view of an array of radiating elements fed by balanced twin-wire coaxial waveguide.

FIG. 20 illustrates an isometric view of an antenna array 2000 comprising a plurality of arrayed elements. In FIG. 20, the waveguides and transitions are omitted from the illustration and only the metal face of the antenna array 2000 forming the radiating components is shown. The metal face of the antenna array 2000 includes a plurality of groupings of radiating components wherein four signal ears approach one another to form a signal ear grouping 2020. The metal face of the antenna array 2000 further includes a plurality of coaxial waveguide regions wherein the metal signal ears 1812*a*, 1812*b*, 1814*a*, 1814*b* communicate with a waveguide transition device (see, e.g., devices 100, 400, 600, 900, 1100; not shown in FIG. 2000) as discussed herein.

Figure 21:
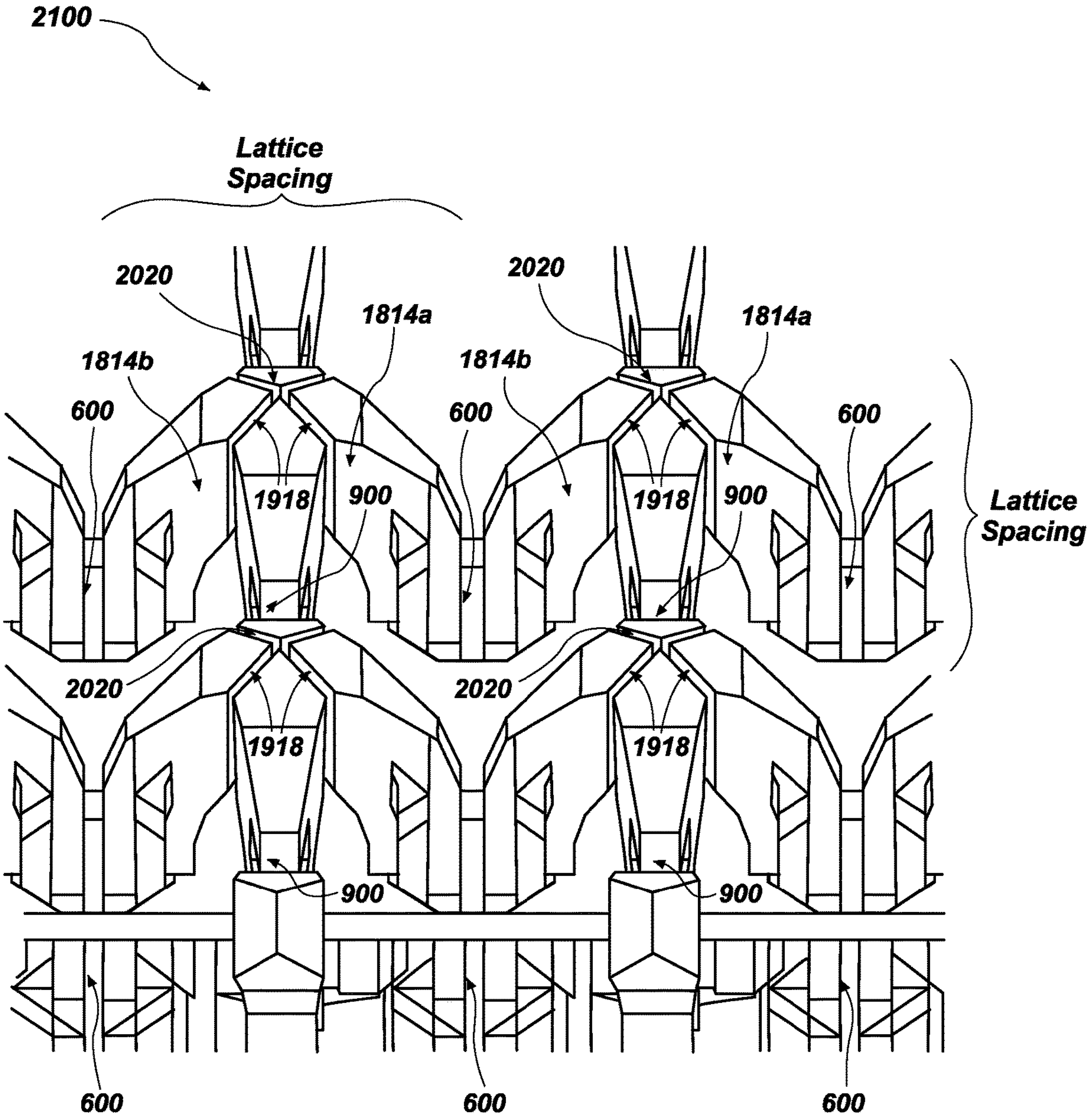
FIG. 21 illustrates an isometric view of an array of radiating elements fed by balanced twin-wire coaxial waveguide.

FIG. 21 illustrates an isometric view of an antenna array 2100. The antenna array is arranged in rows such that the radiating components of adjacent waveguide transition devices are orthogonal relative to one another. In the implementation illustrated in FIG. 21, one row of waveguide transition devices includes a series of waveguide transition devices 600 and an adjacent row of waveguide transition devices includes a series of waveguide transition devices 900. In this implementation, one row of waveguide transition devices includes a hollow dual-ridge waveguide to dual twin-wire balanced coaxial waveguides; and an adjacent row of waveguide transition devices includes a hollow dual-ridge waveguide to dual twin-wire balanced coaxial waveguide with a helical twist twin-wire coaxial waveguide. The helical twist twin-wire coaxial waveguide enables a 90-degree shift in orientation over a short distance. Thus, when a waveguide with a helical twist is adjacent to a waveguide with no helical twist, the waveguides will be orthogonal to each other, and the radiating elements extending from the waveguides can also be orthogonal to one another. In an implementation, all pairs of radiating elements are orthogonal to the nearest pair of radiating elements (in the implementation illustrated in FIG. 21, the nearest pair of radiating elements is located diagonally relative to the x-axis rows of antennas).

FIG. 21 further illustrates lattice spacings between duplicate radiating elements in the antenna array 2100. In the horizontal axis of FIG. 21, lattice spacings may be seen between duplicate radiating elements for the waveguide transition devices 600. Further, in the vertical axis of FIG. 12, lattice spacings may be identified between duplicate radiating elements for the waveguide transition devices 900. The lattice spacing refers to the periodic spacing of duplicate radiating elements in the antenna array 2100 in one or two axes. The lattice spacings in a first axis of the antenna array 2100 may be equal to or different from lattice spacings in a second axis of the antenna array 2100.

Figure 22:
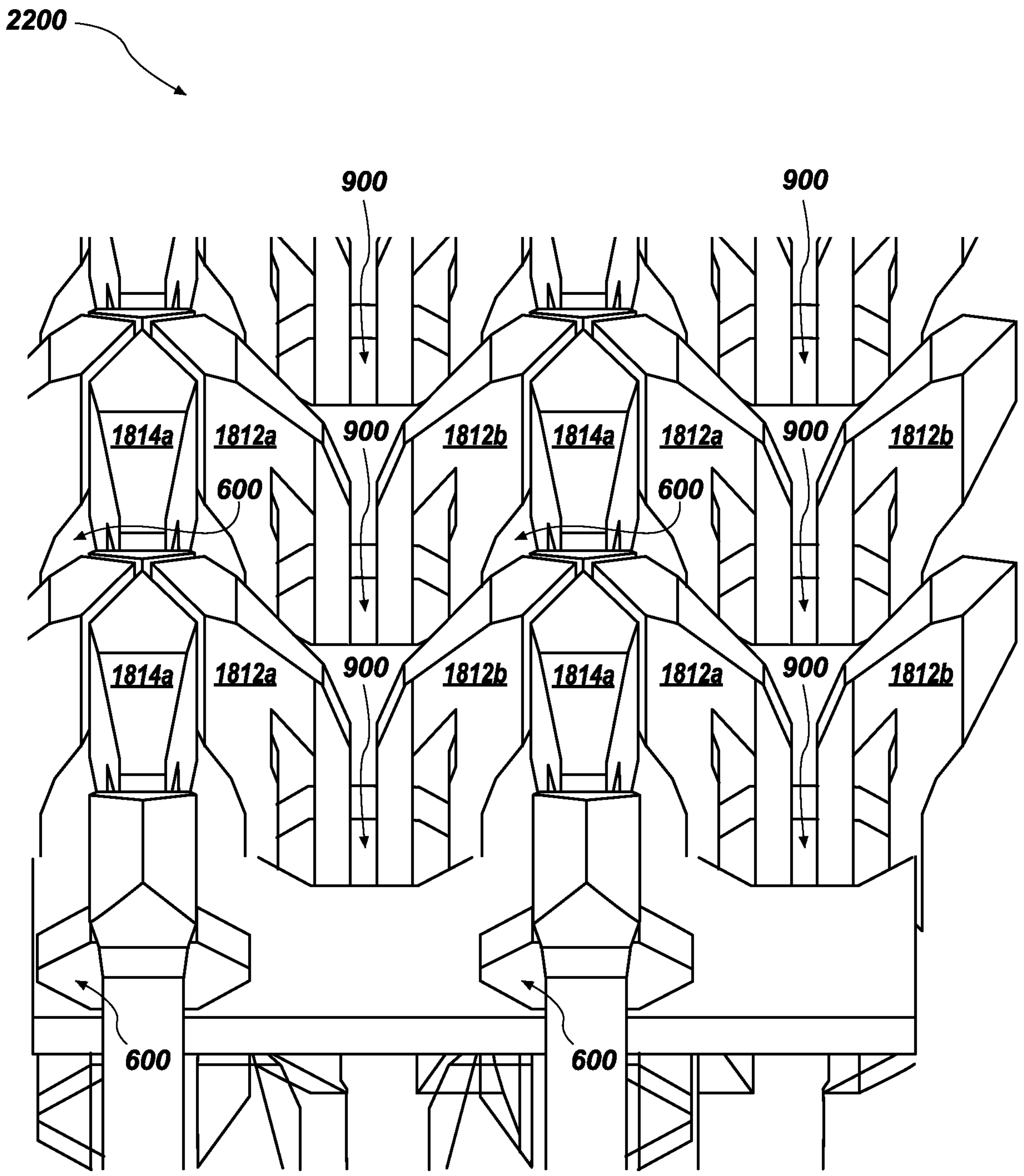
FIG. 22 illustrates an isometric view of an array of radiating elements fed by balanced twin-wire coaxial waveguide.

FIG. 22 illustrates an isometric view of an antenna array 2200. The antenna array comprises a plurality of waveguide transition devices (see, e.g., 100, 400, 600, 900, 1100) arranged in a checkerboard pattern and connected with metal radiating components. In the implementation illustrated in FIG. 22, the waveguide transition devices 600, 900 are arranged in a checkerboard pattern such that the nearest waveguide transition device is always orthogonal. For example, the nearest waveguide transition device to a waveguide transition device 600 is always a waveguide transition device 900. The waveguide transition device 600 does not include a helical twist and the waveguide transition device 900 includes a helical twist. This ensures that the electromagnetic energy radiated from the radiating elements which propagated through the waveguide transition device 900 is orthogonal to the electromagnetic energy radiated through the radiating elements which propagated through the waveguide transition device 600. The waveguide transition devices feed into the radiating elements 1812*a*, 1812*b*, 1814*a*, 1814*b* (not illustrated in FIG. 22). Thus, when the nearest-neighbor waveguide transition devices are orthogonal, the nearest-neighbor radiating element outputs will also be orthogonal. This enables a dual linearly polarized antenna in a single aperture.

Figure 23:
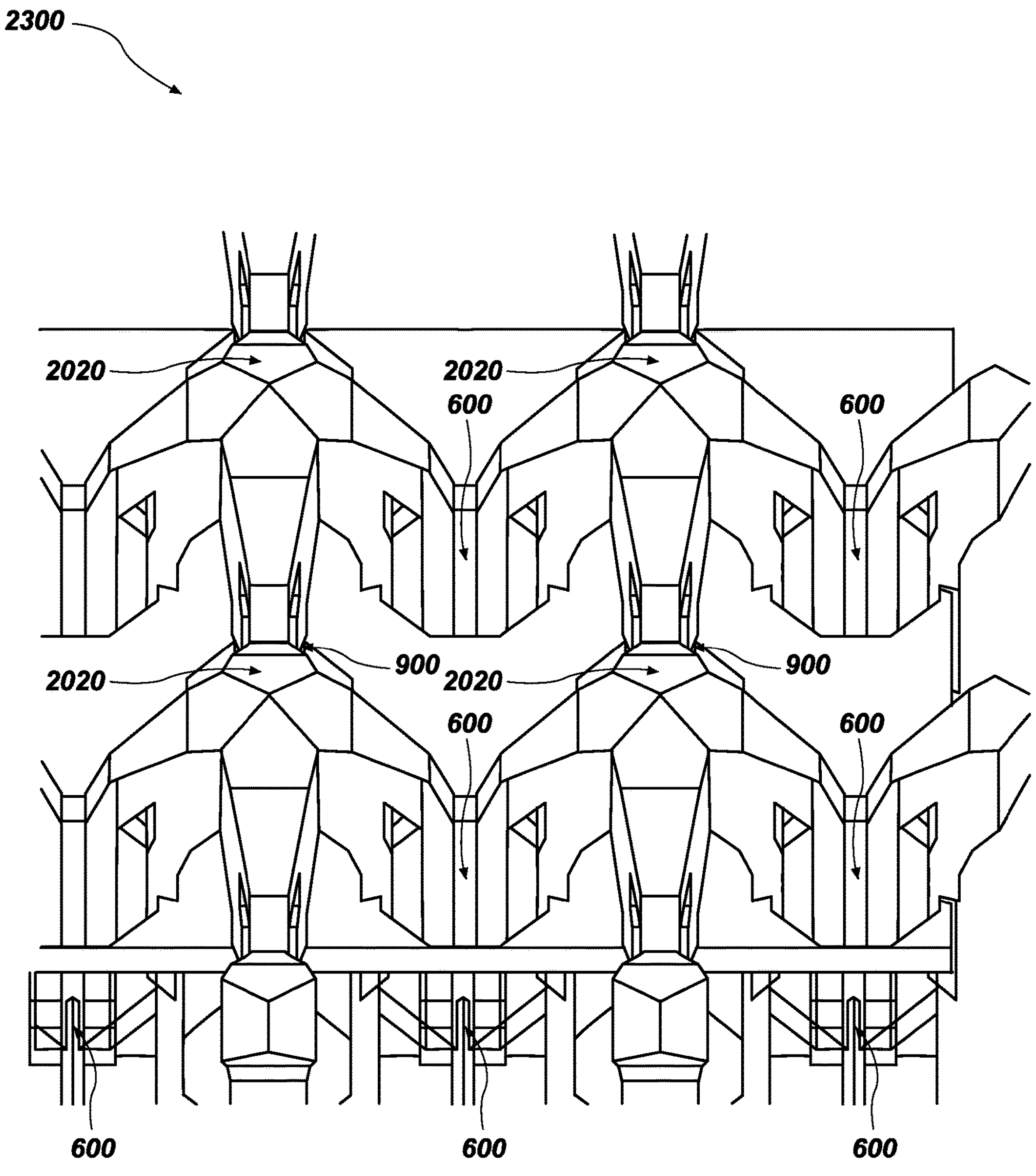
FIG. 23 illustrates an isometric view of an array of radiating elements fed by balanced twin-wire coaxial waveguide.

FIG. 23 illustrates an isometric view of an antenna array 2300. The antenna array 2300 is similar in implementation to the antenna array 2100 illustrated in FIG. 21. The antenna array 2300 illustrated in FIG. 23 is arranged such that the signal ear groupings 2020 are "closed" and do not include a capacitive gap 1918. In this implementation, the signal ears 1812*a*, 1812*b*, 1814*a*, 1814*b* of adjacent radiating components are physically touching such that there is no capacitive gap 1918. By contrast, in the antenna array 2100 illustrated in FIG. 21, the signal ears 1812*a*, 1812*b*, 1814*a*, 1814*b* are arranged to provide a capacitive gap 1918 between radiating components.

Figure 24:
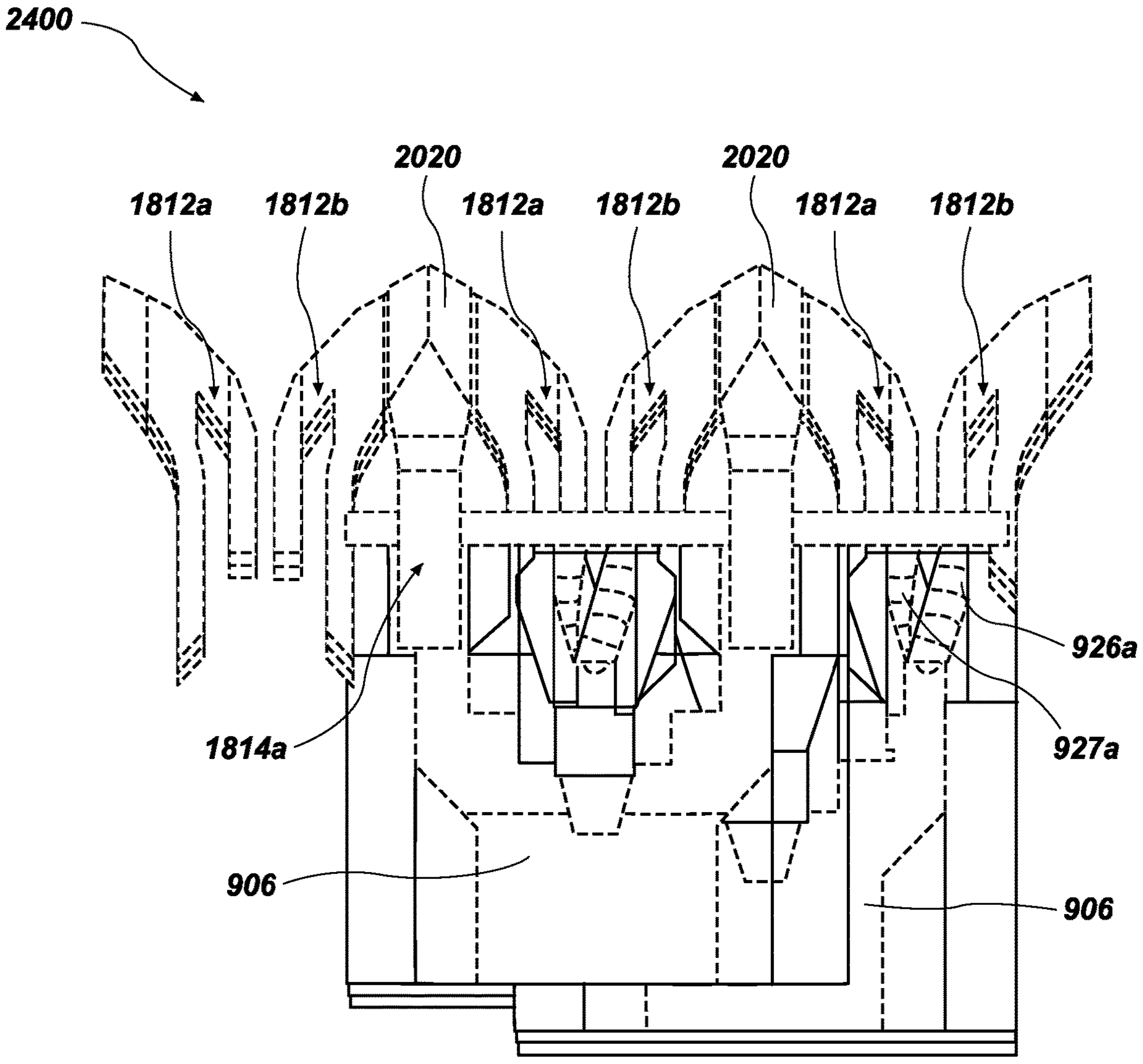
FIG. 24 illustrates an isometric view of an array of radiating elements fed by balanced twin-wire coaxial waveguide.

FIG. 24 illustrates a side view of an antenna array 2400. FIG. 24 is illustrated such that the dotted lines represent solid components (may be constructed of metal), and non-dotted lines represent the outline of negative space. The negative space is empty such that air can pass through.

The antenna array 2400 includes rows of waveguide transition devices feeding into metal radiating components. The antenna array 2400 is arranged such that one row of waveguide transition devices exclusively includes a certain type of waveguide transition device (see e.g., 100, 400, 600, 900, or 1100 as illustrated herein). An adjacent row of waveguide transition devices may include a different type of waveguide transition device such that adjacent rows are orthogonal relative to one another. In another embodiment, adjacent rows of waveguide transition devices include the same type as transition device. For example, an antenna array may include only rows of waveguide transition device 1100 because waveguide transition device 1100 has symmetrical inner and outer conductors on the coaxial waveguide.

In FIG. 24, the antenna array 2400 includes rows of waveguide transition device 900 and further includes rows of waveguide transition device 600. The rows with waveguide transition devices 900 and 600 radiate orthogonally relative to one another. The antenna array 2400 could alternatively include rows with different types of waveguide transition devices 100, 400, 600, 900, 1100 as discussed herein.

In the implementation illustrated in FIG. 24, the signal ear groupings 2020 are arranged such that the independent signal ears 1812*a*, 1812*b*, 1814*a*, 1814*b* are touching one another. This implementation may be preferred when the antenna array 2400 is implemented over a narrow bandwidth. In a typical implementation, a narrow bandwidth is less than 3:1 bandwidth (meaning the upper frequency of operation is less than 3× the lower frequency of operation).

Figure 25:
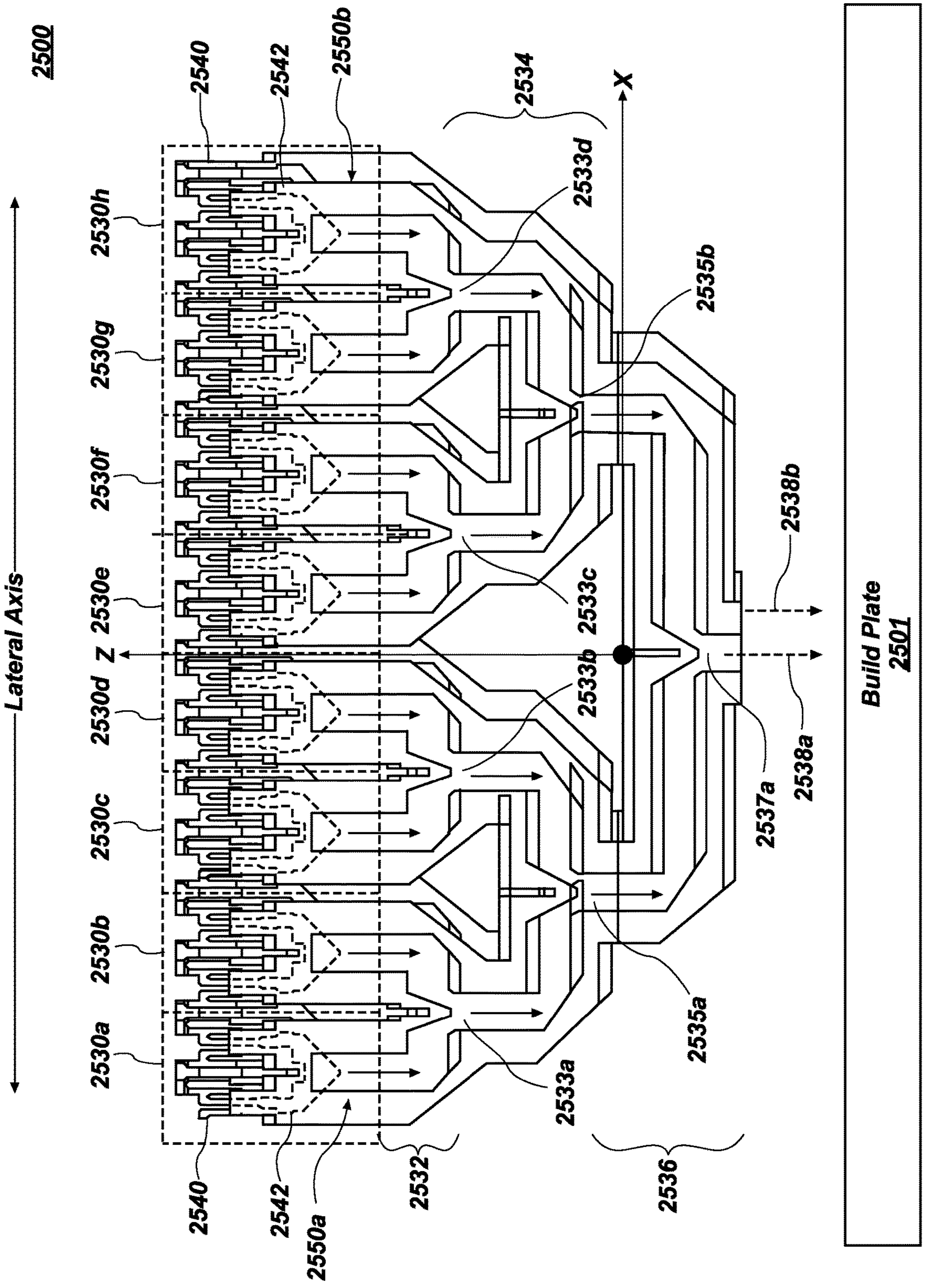
FIG. 25 illustrates a straight-on view of a frontal plane of a dual polarized network comprising two antenna components, wherein each antenna component includes radiating elements, transitions, and a waveguide combiner network.

FIG. 25 illustrates a straight-on view of a frontal plane of a dual polarized waveguide combiner network, transitions, and radiating elements comprising two antenna components ("dual polarized network 2500"). The dual polarized network 2500 includes two planar rows of independent antenna components, including a first antenna component 2550*a* and a second antenna component 2550*b*. The antenna components 2550*a*, 2550*b* are stacked side-by-side with the second antenna component 2550*b* located behind the first antenna component 2550_a_ in the view illustrated in FIG. 25, such that only portions of the second antenna component 2550_b_ are visible in the figure. The first antenna component 2550_a_ and the second antenna component 2550_b_ are offset relative to one another along a lateral axis of the dual polarized network 2500.

Each of the antenna components 2550_a_, 2550_b_ of the dual polarized network 2500 independently includes a plurality of radiating elements and transitions 2530_a_-2530_h_, which may include any of the transition devices 100, 400, 600, 900, 1100 described herein. In the example illustrated in FIG. 25, the antenna components 2550_a_, 2550_b_ each include a first transition 2530_a_, a second transition 2530_b_, a third transition 2530_c_, a fourth transition 2530_d_, a fifth transition 2530_e_, a sixth transition 2530_f_, a seventh transition 2530_g_, and an eight transition 2530_h_, but it should be appreciated that the quantity of transitions is variable depending on the desired operating specifications of the dual polarized network 2500.

The antenna components 2550_a_, 2550_b_ each include a first combiner stage 2532, a second combiner stage 2534, and a third combiner stage 2536. Each of the combiner stages 2532, 2534, 2536 includes one or more waveguide combiner/dividers that combine electromagnetic signals from two or more independent waveguides into a single waveguide (or, when the electromagnetic signal travels in the opposite direction, will divide a single waveguide into two or more independent waveguides). The dual polarized network 2500 is fully combined such that the plurality of radiating elements and transitions 2530_a_-2530_h_ eventually feed into a first single output port 2538_a_ for a first polarization and a second single output port 2538_b_ for a second polarization. The first single output port 2538_a_ is associated with the first antenna component 2550_a_ and the second single output port 2538_b_ is associated with the second antenna component 2550_b_. The first polarization of the first single output port 2538_a_ is orthogonal to the second polarization of the second single output port 2538_b_.

Each of the antenna components 2550_a_, 2550_b_ may include any suitable number of combiner stages 2532, 2534, 2536, and the quantity of combiner stages 2532, 2534, 2536 may be optimized and adjusted based on the desired operational specifications of the dual polarized network 2500. Each of the combiner stages 2532, 2534, 2536 includes one or more combiners. The combiners are configured to combine electromagnetic signals from two or more independent waveguides into a single waveguide. It should be appreciated that the combiners may also function as dividers when the electromagnetic signal is traveling in the opposite direction (i.e., the divider receives an electromagnetic signal from a single waveguide and divides that electromagnetic signal across two or more independent waveguides). In the embodiment illustrated in FIG. 25, each of the combiners is an H-plane combiner.

The first combiner stage 2532 illustrated in FIG. 25 includes four independent first combiners 2533_a_, 2533_b_, 2533_c_, 2533_d_. It should be appreciated that the first combiner stage 2532 may include any number of first combiners 2533_a_-2533_d_ depending on the operational specifications of the waveguide combiner 2500 and the quantity of transition devices 2530_a_-2530_h_. The first combiners 2533_a_-2533_d_ receive electromagnetic signals that have propagated through a radiating element and transition device 2530_a_-2530_h_ and combines those electromagnetic signals into a single output port for each of the two polarizations. The single output ports of the first combiners 2533_a_-2533_d_ in the first combiner stage 2532 feed directly into the second combiners 2535_a_, 2535_b_ of the second combiner stage 2534.

The second combiner stage 2534 illustrated in FIG. 25 includes two independent second combiners 2535_a_, 2535_b_. The second combiners 2535_a_-2535_b_ receive as input the electromagnetic signals that have previously been combined in the first combiner stage 2532 and are output through the output ports of the first combiners 2533_a_-2533_d_. The second combiners 2535_a_-2535_b_ combine electromagnetic signals from two (or more) independent waveguides and output those electromagnetic signals into a single output port. The single output ports of the second combiners 2535_a_-2535_b_ of the second combiner stage 2534 feed directly into the third combiner 2537_a_ of the third combiner stage 2536.

The third combiner stage 2536 illustrated in FIG. 25 includes one third combiner 2537_a_. The third combiner 2537_a_ receives as input the electromagnetic signals that have previously been combined in the first combiner stage 2532 and the second combiner stage 2534. In some implementations and depending on the desired operational specifications of the dual polarized network 2500, the third combiner 2537_a_ could combine with another combiner within the third combiner stage 2536 (not shown) and lead into a fourth combiner stage (not shown). The quantity of combiner stages 2532, 2534, 2536 is variable depending on the desired operational specifications of the dual polarized network 2500. There is no maximum quantity of combiner stages 2532, 2534, 2536 or combiners. In the example illustrated in FIG. 25, the third combiner stage 2536 outputs to the single output ports 2538_a_, 2538_b_ of the dual polarized network 2500.

The radiating elements and transition devices 2530_a_-2530_h_ are illustrated in FIG. 25 with a dotted line bounding box drawn around each independent radiating element set and transition device 2530_a_-2530_h_. The radiating elements and transition devices 2530_a_-2530_h_ may include the structure and functionality of any of the transition devices 100, 400, 600, 900, 1100 described herein. The radiating elements and transition devices 2530_a_-2530_h_ each include one or more radiating elements 2540 that are configured to receive and/or transmit an electromagnetic signal. The radiating elements and transition devices 2530_a_-2530_h_ further each include an impedance transition region 2542.

In the dual polarized network 2500 illustrated in FIG. 25 the combiners 2533_a_-2533_d_, 2535_a_-2535_b_, 2537_a_ are H-plane combiners. However, the disclosure is not limited to H-plane combiners. Other combiners may be used instead of or in addition to the H-plane combiners to form the dual polarized network 2500.

The dual polarized network 2500 may be fabricated using additive manufacturing techniques, including three-dimensional printing techniques using metal or a metal alloy. The dual polarized network 2500 is fabricated in the positive Z-axis direction relative to the build plate 2501. When the dual polarized network 2500 is disposed in this orientation (as shown in FIG. 25), then the lateral axis of the dual polarized network 2500 runs parallel to the X-axis.

Figure 26:
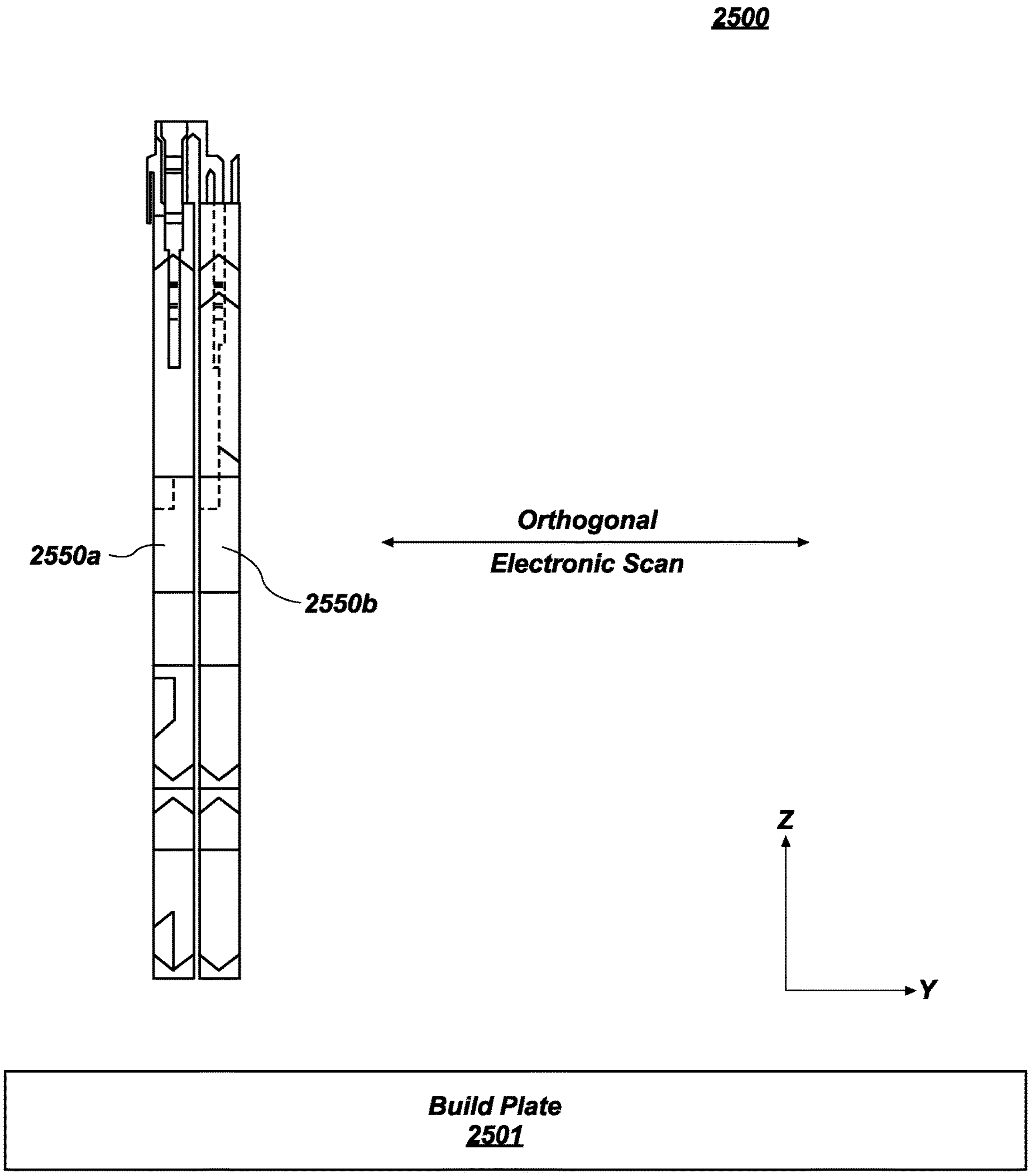
FIG. 26 illustrates a straight-on side view of a sagittal plane of the dual polarized network comprising the two antenna components arranged side-by-side.

FIG. 26 is a straight-on side view of a sagittal plane of the dual polarized network 2500. In FIG. 26, the dual polarized network 2500 has been rotated about its vertical axis (parallel to the Z-axis) one quarter turn in the clockwise direction, such that the Y-axis points in the right-hand direction and the X-axis points out of the page. By contrast, in FIG. 25, the X-axis points in the right-hand direction and the Y-axis points into the page. As noted herein, the orientation of the axes is determined based on the build direction of the dual polarized network 2500 relative to the build plate 2501, wherein the dual polarized network 2500 is fabricated in the positive Z-axis direction relative to the build plate 2501.

The dual polarized network 2500 includes the two antenna components stacked side-by-side, including the first antenna component 2550*a* and the second antenna component 2550*b*. The dual polarized network 2500 fits within a single lattice spacing in the Y-axis of FIG. 25 and FIG. 26 of an antenna array. The antenna array may include any number of dual polarized networks 2500 that all fit within one lattice spacing in the Y-axis of FIG. 25 and FIG. 26 of the antenna array. The antenna components 2550*a*, 2550*b* may be copies of one another (i.e., with the same dimensions, quantity of transitions, quantity of combiners, and so forth) or may be different from one another.

The antenna components 2550*a*, 2550*b* stand side-by-side as illustrated in FIG. 26. The side-by-side antenna components 2550*a*, 2550*b* cascade and may passively combine into a secondary waveguide combiner network of a dual polarized passive antenna array. The secondary combiner network may be located below (in the negative Z-axis direction) of the antenna components 2550*a*, 2550*b* and may connect to ports 2538*a*, 2538*b* to fully combine electromagnetic energy from each polarization to a single port. Alternatively, the side-by-side antenna components 2550*a*, 2550*b* cascade and may combine into an actively scanned antenna array in one axis.

The antenna components 2550*a*, 2550*b* are arranged such that both antenna components 2550*a*, 2550*b* fit within a Y-axis distance that is less than one wavelength of a working frequency of the antenna array (wherein the dual polarized network 2500 is a component of the antenna array). This allows for an orthogonal electronic scan that is disposed in a direction that is orthogonal to the frontal plane of the combiner networks (i.e., an electronic scan travelling in the Y-axis direction as shown in FIG. 26). This occurs over a wide bandwidth. Ideal spacing for electronic scan is less than one-half a wavelength of the working frequency of the antenna array.

While of similar structure, the antenna components 2550*a*, 2550*b* may carry different signals with respect to each other. For example, one of the antenna components 2550*a* may propagate one signal or wave while the other antenna components 2550*b* may carry a different signal or wave that is radiated with orthogonal polarization to the first wave. The antenna components 2550*a*, 2550*b* shown in FIG. 25 and FIG. 26 are configured to radiate dual linear orthogonal polarization. Other forms of polarization may be used as well such as linear, including horizontal and vertical, or circular, including left hand circular polarization (LHCP) and right-hand circular polarization (RHCP).

Figure 27:
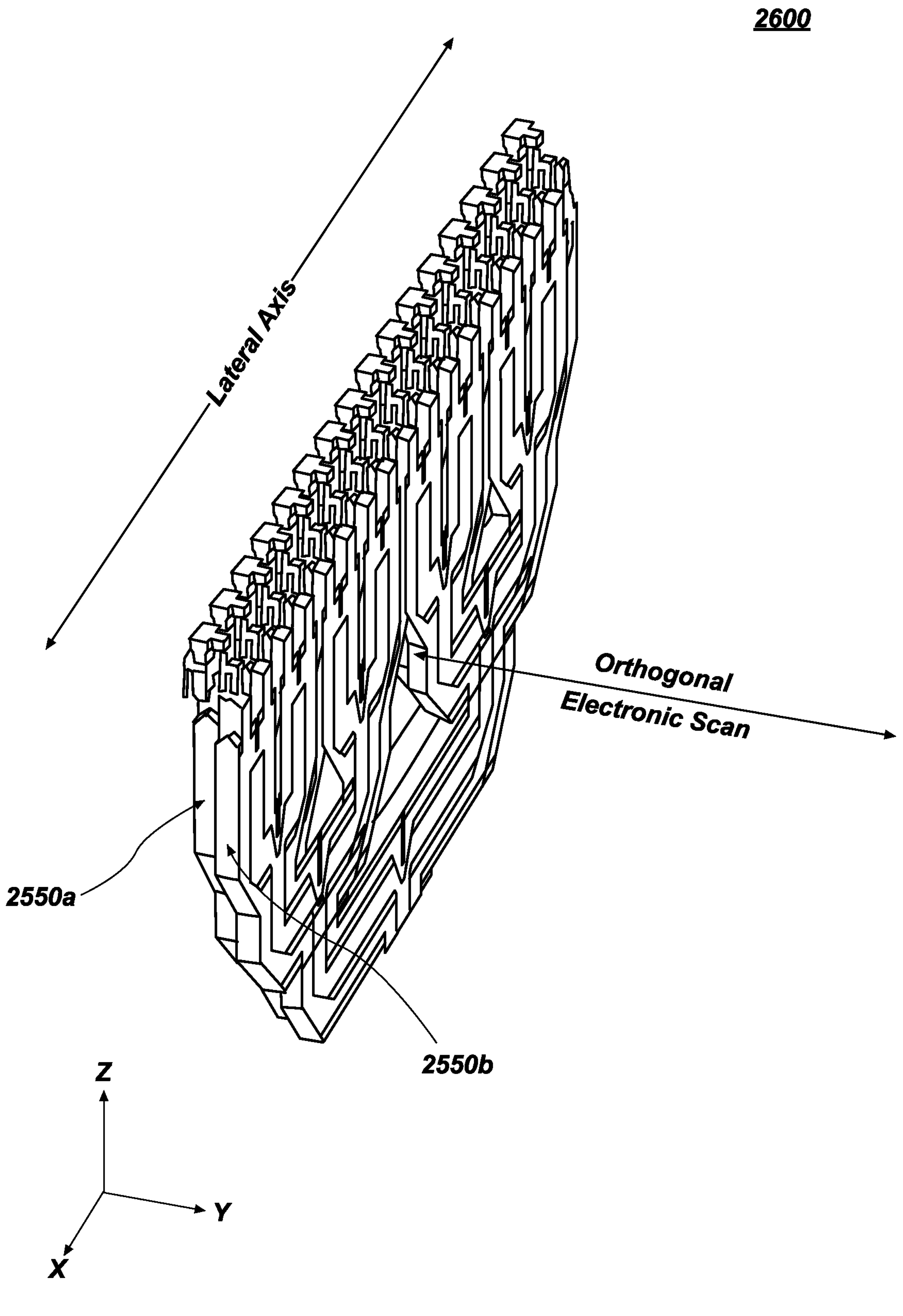
FIG. 27 illustrates a perspective view of the dual polarized network comprising the two antenna components arranged side-by-side, wherein each of the two antenna components includes radiating elements, transitions, and a waveguide combiner network.

FIG. 27 is a perspective aerial view of the dual polarized network 2500 comprising the two antenna components 2550*a*, 2550*b*. The two antenna components 2550*a*, 2550*b* are offset relative to one another along a lateral axis running a length of the dual polarized network 2500. In FIG. 27, the lateral axis of the dual polarized network 2500 runs parallel to the X-axis. The X-axis is identified based on the direction of fabrication of the dual polarized network 2500, wherein the dual polarized network 2500 is fabricated in the positive Z-axis direction relative to a build plate (not shown in FIG. 27). In alternative embodiments, the two antenna components 2550*a*, 2550*b* may be aligned with one another along the lateral axis.

The dual polarized network 2500 is designed such that antenna components 2550*a*, 2550*b* can be duplicated along the Y-axis shown in FIG. 27. The lattice spacing between radiating elements of the antenna components 2550*a*, 2550*b* is less than one wavelength at a highest frequency of operation. In one embodiment this lattice spacing is less than or equal to one-half a wavelength at a highest frequency of operation for the dual polarized network 2500. This allows for orthogonal electronic scanning in the Y-axis direction (i.e., orthogonal to the lateral axis and a frontal plane of the dual polarized network 2500).

Figure 28:
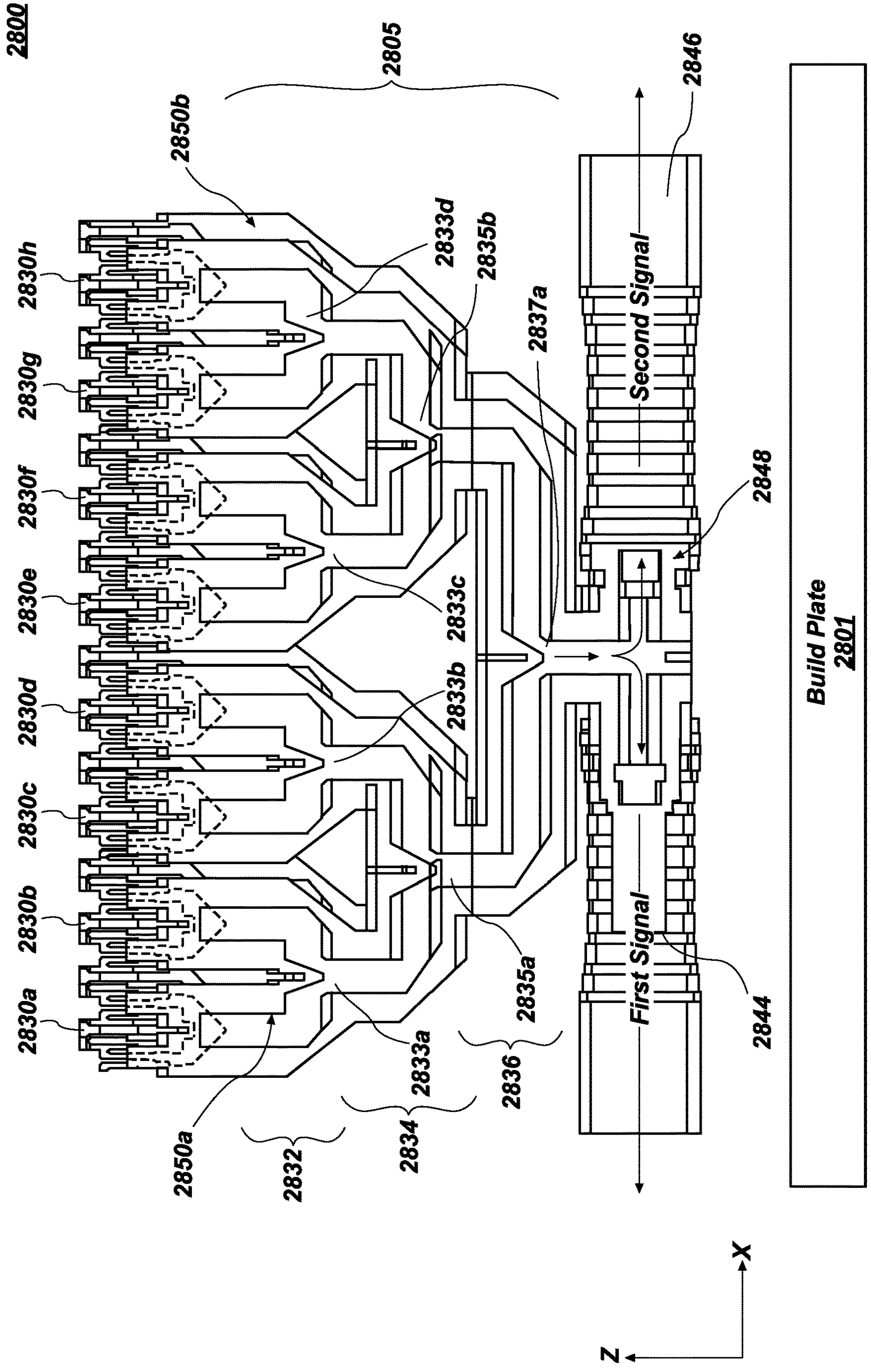
FIG. 28 illustrates a straight-on view of a frontal plane of a diplexer network comprising two antenna components, wherein each antenna component includes radiating elements, transitions, a waveguide combiner network, and a diplexer.

FIG. 28 illustrates a straight-on view of a frontal plane of a dual polarized waveguide combiner network comprising two antenna components and two diplexers "diplexer network 2800". Like the dual polarized network 2500 illustrated in FIGS. 25-27, the diplexer network 2800 includes two antenna components, including a first antenna component 2850*a* and a second antenna component 2850*b*, wherein the second antenna component 2850*b* is stacked behind the first antenna component 2850*a* and is only partially visible in FIG. 28. Unlike the dual polarized network 2500, the diplexer network 2800 includes a diplexer 2848 for each antenna component 2850*a*, 2850*b*. Because the antenna components 2850*a*, 2850*b* are stacked side-by-side, only the diplexer 2848 for the first antenna component 2850*a* is prominent in the foreground in FIG. 28.

The antenna components 2850*a*, 2850*b* each include a combiner network portion 2805 and a diplexer that receives an electromagnetic signal that is output by the combiner network portion 2805. The combiner network portions 2805 of the first antenna component 2850*a* and the second antenna component 2850*b* are like the combiner network illustrated in the dual polarized network 2500 illustrated in FIGS. 25-27. The combiner network portion 2805 includes a first combiner stage 2832, a second combiner stage 2834, and a third combiner stage 2836. The first combiner stage 2832 illustrated in FIG. 28 includes four independent first combiners 2833*a*, 2833*b*, 2833*c*, 2833*d* that receive an electromagnetic signal from two or more waveguides associated with the radiating elements and transitions 2830*a*-2830*h* and combine those electromagnetic signals into a single output port that feeds into combiners of the second combiner stage 2834. The second combiner stage 2834 includes two independent second combiners 2835*a*, 2835*b* that receive electromagnetic signals output by the first combiner stage 2832 and combine those electromagnetic signals into an output port that feeds into the third combiner stage 2836. The third combiner stage 2836 includes a single third combiner 2837*a*, which serves as the single output port for the entire combiner network portion 2805.

The combiner network portion 2805 is "fully combined" because it receives electromagnetic signals from a plurality of waveguides and fully combines those electromagnetic signals into a single output port. The combiners of the combiner network portion 2805 may each be H-plane combiners. Alternatively, the combiners of the combiner network portion 2805 may each be E-plane combiners.

Again, like the dual polarized network 2500 discussed in connection with FIGS. 25-27, the quantity of combiner stages, combiners, and transitions illustrated in FIG. 28 is exemplary only. There is no maximum quantity of combiner stage, combiners, or transitions. The quantity of each of these components may be adjusted and optimized based on the desired operating specifications of an antenna array.

The single output port of the combiner network portion 2805 feeds into a diplexer 2848. Each of the first antenna component 2850*a* and the second antenna component 2850*b* feeds into its own diplexer 2848. The diplexer 2848 implements frequency domain multiplexing by splitting and/or joining electromagnetic signals into two distinct frequency bands. The diplexer 2848 receives an electromagnetic signal by way of the output port of the third combiner 2837*a*. The diplexer 2848 splits this electromagnetic signal into two separate electromagnetic signals each comprising a different frequency bandwidth. The two electromagnetic signals comprise a first signal over a first frequency bandwidth and a second signal over a second frequency bandwidth that is non-overlapping with the first frequency bandwidth. The first signal at the first frequency bandwidth travels through the diplexer 2848 through the first diplexer branch 2844. The second signal at the second frequency travels through the diplexer 2848 through the second diplexer branch 2846. Depending on the configurations of the diplexer 2848, higher frequency signals and lower frequency signals may be directed to either of the first diplexer branch 2844 or the second diplexer branch 2846. Neither of the diplexer branches 2844, 2846 is exclusive to higher or lower frequencies.

The first diplexer branch 2844 and the second diplexer branch 2846 may have different lengths. In the implementation illustrated in FIG. 28, and with respect to the first antenna component 2850*a*, the first diplexer branch 2844 comprises a length that is shorter than a length of the second diplexer branch 2846. The opposite may be true for the diplexer branches 2844, 2846 of the second antenna component 2850*b* (not visible in FIG. 28), such that the first diplexer branch 2844 of the second antenna component 2850*b* comprises a length that is longer than a length of the second diplexer branch 2846 of the second antenna component 2850*b*.

The lengths of the diplexer branches may correspond such that the shorter diplexer branches (i.e., the first diplexer branch 2844 of the first antenna component 2850*a* and the second diplexer branch 2846 of the second antenna component 2850*b*) are the same length. Similarly, the longer diplexer branches (i.e., the second diplexer branch 2846 of the first antenna component 2850*a* and the first diplexer branch 2844 of the second antenna component 2850*b*) may have the same length. The diplexers 2848 of the first antenna component 2850*a* and the second antenna component 2850*b* may be arranged in this fashion to ensure the appropriate spacing between the first antenna component 2850*a* and the second antenna component 2850*b*. The spacing between the first antenna component 2850*a* and the second antenna component 2850*b* may be determined by the lattice spacing of the antenna array, wherein the lattice spacing is the periodic spacing between duplicate radiating elements of the antenna array.

As shown in FIG. 28, the first antenna component 2850*a* and the second antenna component 2850*b* stand side-by-side. In the implementation illustrated in FIG. 28, the first antenna component 2850*a* and the second antenna component 2850*b* are offset relative to one another along a longitudinal axis of the diplexer 2848 (i.e., along the X-axis). In the illustration in FIG. 28, the second antenna component 2850*b* is arranged behind the first antenna component 2850*a* and is only partially visible. As the antenna components are stacked side-by-side, the orientations of the shorter and longer diplexer branches are alternated. This is implemented such that a shorter diplexer branch is always disposed next to a longer diplexer branch, and vice versa. Alternatively, the orientations of the shorter and longer diplexer branches need not be alternated but may be on the same side.

The diplexer network 2800 may be replicated any number of times within an antenna array. There is no maximum number of antenna components 2850*a*, 2850*b* that may be arranged side-by-side and "stacked" in an antenna array. Each antenna component 2850*a*, 2850*b* contains radiating elements that operate in the E-plane or the H-plane, as desired. The antenna components 2850*a*, 2850*b* are arranged such that the lattice spacing of the radiating elements of the antenna components 2850*a*, 2850*b* is less than or equal to one wavelength of a working frequency of the antenna array. This allows for an electronic scan in a direction that is orthogonal to a frontal plane of an antenna component (i.e., in the Y-axis direction as shown in FIG. 28, which is into or out of the page). This occurs over a wide bandwidth. Ideally, the lattice spacing is less than or equal to one-half a wavelength of the working frequency of the antenna array.

The antenna components 2850*a*, 2850*b* contain dual polarized radiating elements that enable a dual polarized signal. The radiating elements support dual linear (Horizontal and Vertical) or dual circular (Right Hand and Left Hand) polarization.

Figure 29:
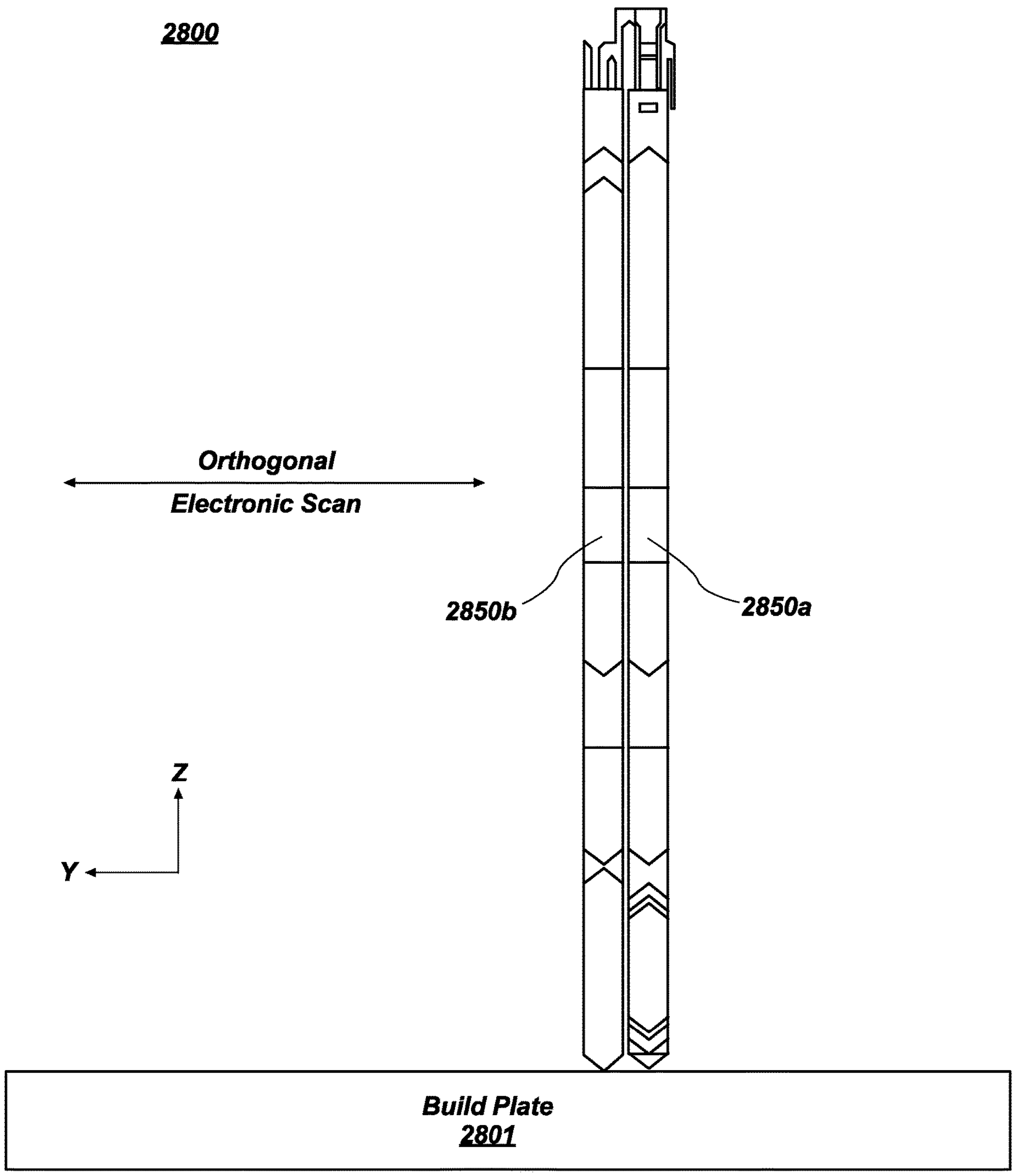
FIG. 29 illustrates a straight-on side view of a sagittal plane of the diplexer network illustrating the two antenna components arranged side-by-side.

FIG. 29 illustrates a straight-on side view of a sagittal plane of the diplexer network 2800. In FIG. 29, the diplexer network 2800 has been rotated about its vertical axis (parallel to the Z-axis) one quarter turn in the counter-clockwise direction, such that the Y-axis points in the left-hand direction and the X-axis points into the page. By contrast, in FIG. 28, the X-axis points in the right-hand direction and the Y-axis points into the page. As noted herein, the orientation of the axes is determined based on the build direction of the diplexer network 2800 relative to the build plate 2801, wherein the diplexer network 2800 is fabricated in the positive Z-axis direction relative to the build plate 2801. The diplexer network 2800 includes the first antenna component 2850*a* and the second antenna component 2850*b* described in connection with FIG. 28.

Figure 30:
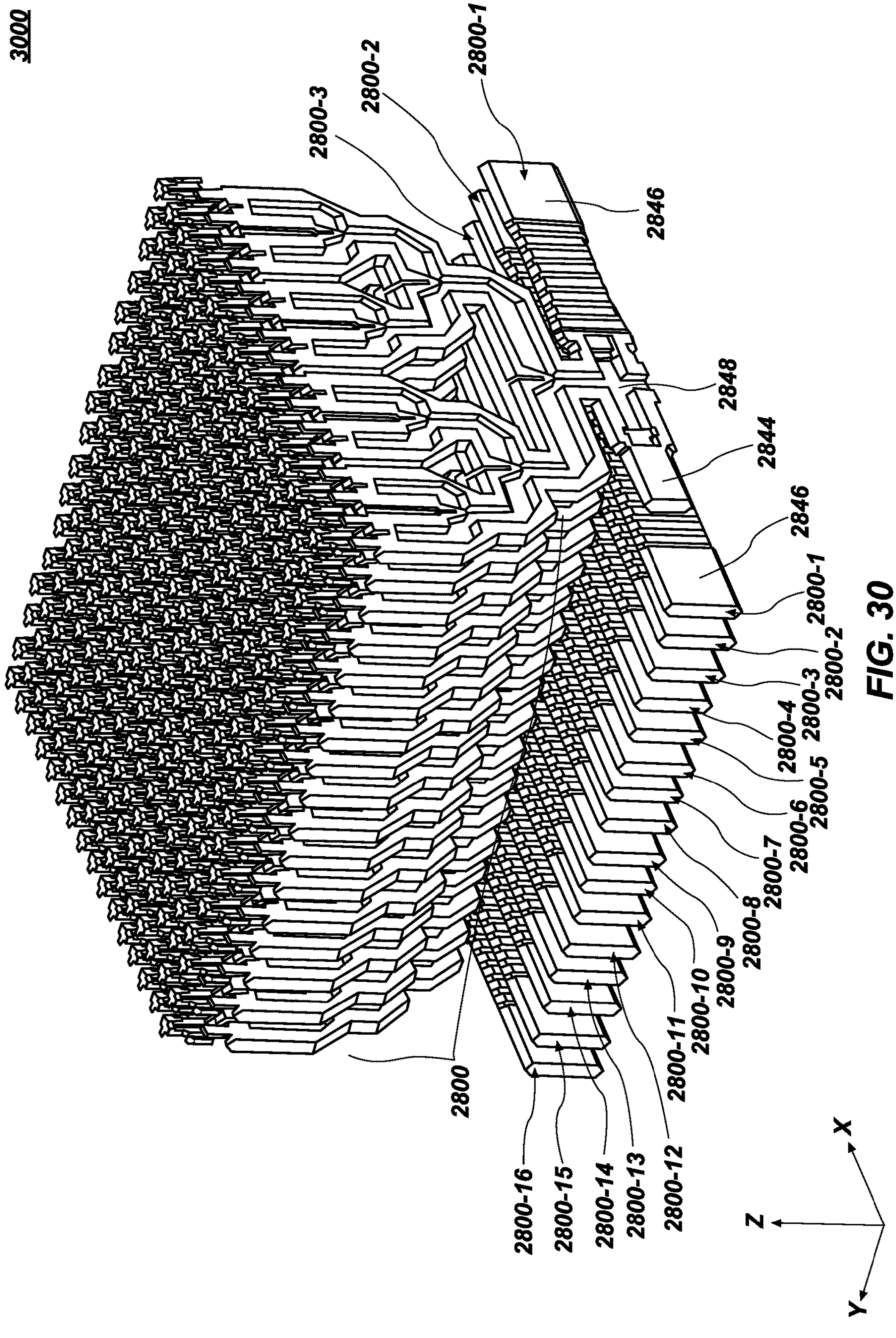
FIG. 30 illustrates a perspective view of an antenna array comprising a plurality of the diplexer network, wherein each diplexer network includes two antenna components, and wherein each antenna component includes radiating elements, transitions, a planar waveguide combiner network, and a diplexer.

FIG. 30 is a perspective view of an antenna array 3000 comprising a plurality of diplexer networks 2800 stacked side-by-side. The example antenna array 3000 comprises sixteen diplexer networks 2800 stacked side-by-side, wherein each diplexer network 2800 includes two antenna components (see antenna components 2850*a*, 2850*b*) and two diplexers (i.e., a diplexer 2848 for each antenna component 2850*a*, 2850*b*). The antenna array 3000 therefore includes 32 antenna components that each include radiating elements, transitions, a combiner network portion, and a diplexer. Each of the antenna component "rows" is configured to feed dual-polarized antenna radiating elements. The lattice spacing of the antenna array 3000 is less than or equal to one-half of a wavelength at a highest frequency of operation for the antenna array 3000.

The antenna array 3000 includes the plurality of diplexer networks 2800 arranged side-by-side and forming rows of planar antenna components. The antenna array 300 includes, for example, a first diplexer network 2800-1, a second diplexer network 2800-2, a third diplexer network 2800-3, and so forth through the sixteenth diplexer network 2800-16. There is no maximum quantity of diplexer networks 2800 within the antenna array 3000, and the quantity of the diplexer network 2800 may be optimized based on the desired operational specifications of the antenna array 3000. Each diplexer network 2800 includes a first antenna component (see 2850*a* at FIGS. 28-29) with a corresponding diplexer 2848 and a second antenna component (see 2850*b* at FIGS. 28-29) with a corresponding diplexer 2848. Thus, the example illustrated in FIG. 30 includes sixteen diplexer networks 2800-1 through 2800-16 and therefore includes 32 planar antenna components.

As shown in FIG. 30, the diplexers across the antenna array 3000 are arranged with alternating short branches and long branches. Each diplexer 2848 includes a short branch and a long branch, such that each diplexer network 2800 (i.e., a combination of two diplexers) includes two short branches and two long branches. The short branches and the long branches of the diplexer networks 2800 are arranged with alternating positioning such that a short branch is adjacent to a long branch within the antenna array 3000. It should be appreciated that it is not required to alternate the short branches and the long branches of the diplexer as shown in FIG. 30. In alternative embodiments, and depending on space constraints, the short branches may be disposed side-by-side without alternating with the long branches, and so forth.

For example, the first diplexer network 2800-1 includes a first antenna component with a first diplexer and a second antenna component with a second diplexer. The first antenna component of the first diplexer network 2800-1 (i.e., the front-most antenna component visible in FIG. 30) is oriented with the short branch (first diplexer branch 2844) on the left-hand side of FIG. 30 and the long branch (second diplexer branch 2486) on the right-hand side of FIG. 30. The second antenna component of the first diplexer network 2800-1 is disposed behind the first antenna component and is only partially visible in FIG. 30. The second antenna component of the first diplexer network 2800-1 is arranged such that the long branch (second diplexer branch 2846) is located on the left-hand side (visible in FIG. 30); and the short branch (first diplexer branch 2844, not visible in FIG. 30) is located on the right-hand side disposed behind the first antenna component and not visible in FIG. 30.

The antenna array 3000 may be arranged such that the antenna components have radiating elements with orthogonal polarizations. For example, the first antenna component of the first diplexer network 2800-1 may have a radiating element that provides a linear Horizontal polarization while the second antenna component of the first diplexer network 2800-1 has a radiating element that provides a linear Vertical polarization. This may continue such that the first antenna component of the second diplexer network 2800-2 has a radiating element that provides a linear Horizontal polarization and the second antenna component of the second diplexer network 2800-2 has a radiating element that provides a linear Vertical polarization. This alternating polarization of the antenna components is continued throughout the antenna array 3000. Thus, each diplexer network 2800 is dual polarized and the antenna array 3000 as a whole is dual polarized.

If a certain antenna component (see 2850*a*, 2850*b*) comprises a radiating element configured for linear Horizontal polarization, then that radiating element may emit electromagnetic signals with a linear Horizontal polarization. The emitted electromagnetic signals may include low-band or low frequency signals and may additionally include high-band or high frequency signals. The different frequency signals are propagated through different branches of the diplexer. Similarly, if a certain antenna component (see 2850*a*, 2850*b*) comprises a radiating element configured for linear Vertical polarization, then the radiating element may emit electromagnetic signals with a linear Vertical polarization. These emitted electromagnetic signals may include the low-band or low frequency signals and may further include the high-band or high frequency signals. The antenna array 3000 is not limited to certain types of polarization and may transmit/receive electromagnetic signals with circular polarization or linear polarization. Circular polarization can be created from linear Horizontal and linear Vertical components, as is known to those of skill in the art.

As stated above, the diplexer 2848 is used to split signals into two different signals having two different frequencies. Thus, the antenna array 3000 can split an electromagnetic signal into two different signals having different frequencies. The antenna array 3000 can therefore transmit and receive electromagnetic signals at the same time. In other words, the two separate frequencies of the diplexer may be transmitted both at the same time, received both at the same time, or one may be transmitted while the other is received at the same time. Such simultaneous transmission and reception of different frequency signals in low profile electronically scanned antennas, such as those described herein, has been accomplished by using two separate antennas for transmitting and receiving the different frequency signals. This has not been accomplished in traditional systems with a single antenna array that provides electronic beam steering because traditional antenna arrays do not have sufficient space to include a diplexer for accomplishing this purpose and due to the fabrication complexity, which requires additive manufacturing to fabricate. The configuration described herein allows the operation of both transmitting and receiving to be done by one compact antenna array 3000.

Furthermore, as described earlier, each diplexer 2848 may have a long branch and a short branch. As the antenna components (see 2850*a*, 2850*b*) of the diplexer networks 2800 alternate orientation, the side on which the long branches and short branches are disposed may also alternate. The orientations of the diplexer branches 2844, 2846 alternate sides as the antenna components alternate in the antenna array 3000. Similarly, the low and high frequency signals may alternate within the antenna array 3000 just as the diplexer branches 2844, 2846 alternate sides. This configuration enables significant spacing advantages that allow a greater quantity of antenna components to be placed within a smaller space. This allows for more antenna components to be disposed within a single antenna array 3000.

The antenna array 3000 is appropriate for use as a phased antenna array to scan in the Y-axis, or in a direction through the stacked rows of antenna components (i.e., in a direction that is orthogonal to a frontal plane of the diplexer networks 2800). The spacing between the antenna components in the antenna array 3000 is less than or equal to one-half of a wavelength at a frequency of operation for the antenna array 3000.

The antenna array 3000 may be implemented as an electronically scanning array, and in this implementation, the spacing between the antenna components may be less than or equal to one-half of a wavelength at an operation frequency of the antenna array 3000. The antenna array 3000 may further be implemented as a passive array, and in this implementation, the spacing between antenna components having the same polarization is less than or equal to one wavelength at an operational frequency of the antenna array 3000. In some implementations, the wavelength used for measuring the distances between antenna components is a wavelength at the highest frequency of operation for the antenna components.

The antenna array 3000 is fabricated using additive manufacturing techniques and may specifically be fabricated using metal additive manufacturing techniques. The antenna array 3000 may be fabricated as a single metal element with indivisible components, such that the fabrication process does not require any separate joining processes for joining separate components. The antenna array 3000 is fabricated in the positive Z-axis direction relative to a build plate, such as the build plate 2801.

Alternate embodiments of antenna arrays are within the scope of this disclosure. For example, the antenna array 3000 may be modified to include a quadplexer for each antenna component instead of a diplexer. A quadplexer may be achieved, for example, by adding additional diplexers to the ends of the diplexer branches 2844, 2846. Furthermore, the antenna array 3000 may be modified to include a hexaplexer for each antenna component instead of either a diplexer or quadplexer.

Figure 31:
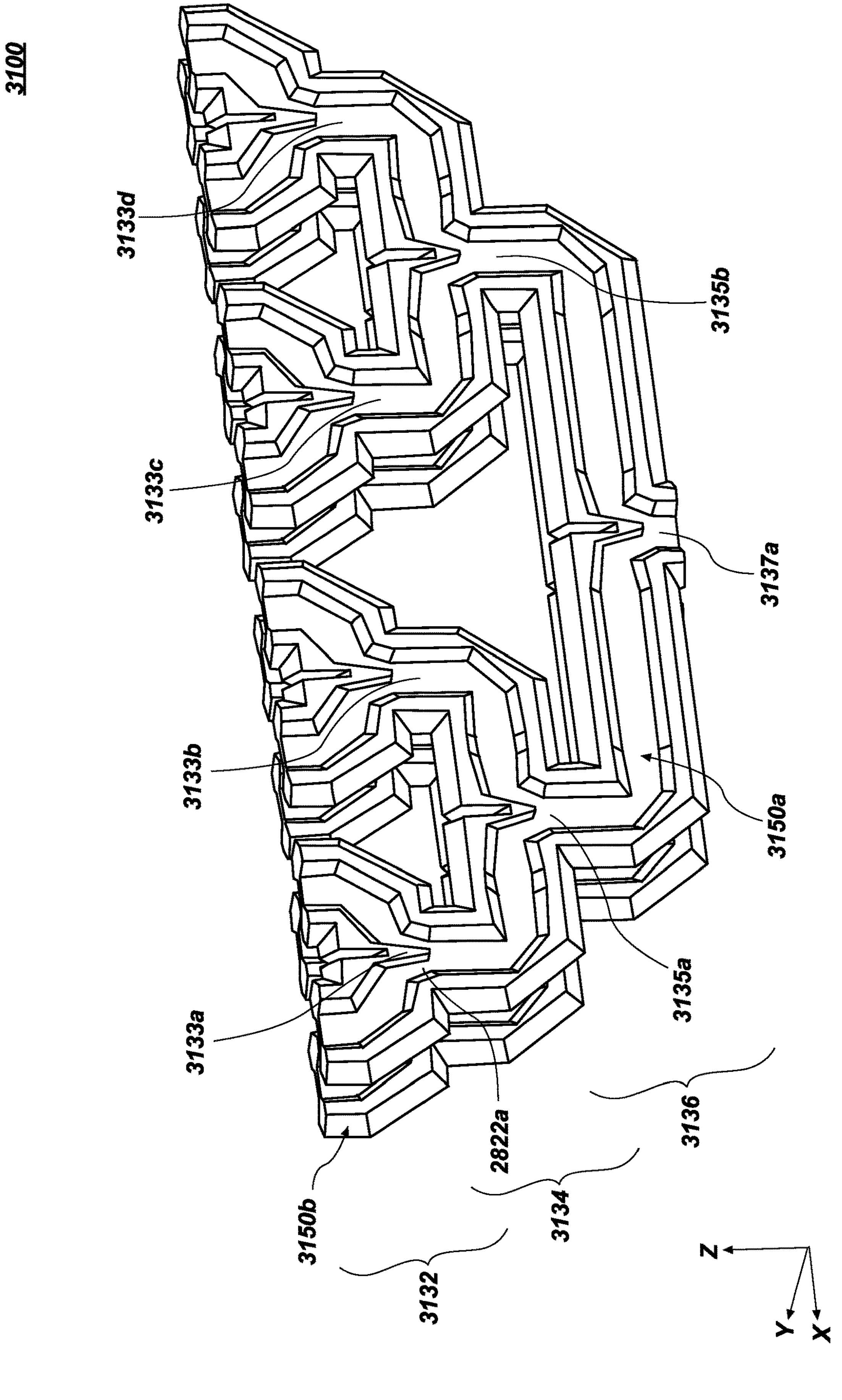
FIG. 31 illustrates a perspective view of a frontal plane of a dual ridge network comprising two antenna components, wherein each of the two antenna components includes a planar waveguide combiner network configured to support a dual polarized antenna array.

FIG. 31 illustrates a perspective view of a frontal plane of a dual ridge waveguide combiner network configured to support a dual polarized antenna array comprising two antenna components ("dual ridge network 3100"). The dual ridge network comprises a combiner network, like the dual polarized network 2500 and the diplexer network 2800 described herein. The dual ridge network 3100 includes a first antenna component 3150*a* and a second antenna component 3150*b*, wherein the antenna components 3150*a*, 3150*b* are stacked-by-side like the antenna components discussed in connection with the dual polarized network 2500 and the diplexer network 2800.

Each of the antenna components 3150*a*, 3150*b* of the dual ridge network 3100 independently includes a plurality of combiner stages. In the example illustrated in FIG. 31, the dual ridge network 3100 includes a first combiner stage 3132, a second combiner stage 3134, and a third combiner stage 3136. The combiner stages 3132, 3134, 3136 comprise the same functionality as the combiner stage discussed in connection with the dual polarized network 2500 and the diplexer network 2800.

The first combiner stage 3132 may receive electromagnetic signals from transitions, such as the transition devices 100, 400, 600, 900, 1100 described herein. The first combiner stage 3132 includes four independent first combiners 3133*a*, 3133*b*, 3133*c*, 3133*d* that each receive electromagnetic signals from two or more waveguides and combine those electromagnetic signals into a single output port, which then feeds into the second combiner stage 3134. The second combiner stage 3134 illustrated in FIG. 31 includes two independent second combiners 3135*a*, 3135*b* which receive electromagnetic signals from output ports of the first combiner stage 3132 and combine those electromagnetic signals into single output ports. The output ports of the second combiner stage 3134 feed into the third combiner stage 3136, which includes one third combiner 3137 in the example illustrated in FIG. 31. The antenna components are fully combined because the plurality of electromagnetic signals is fully combined by the cascading combiners series 3132, 3134, 3136 into a single output port.

Figure 32:
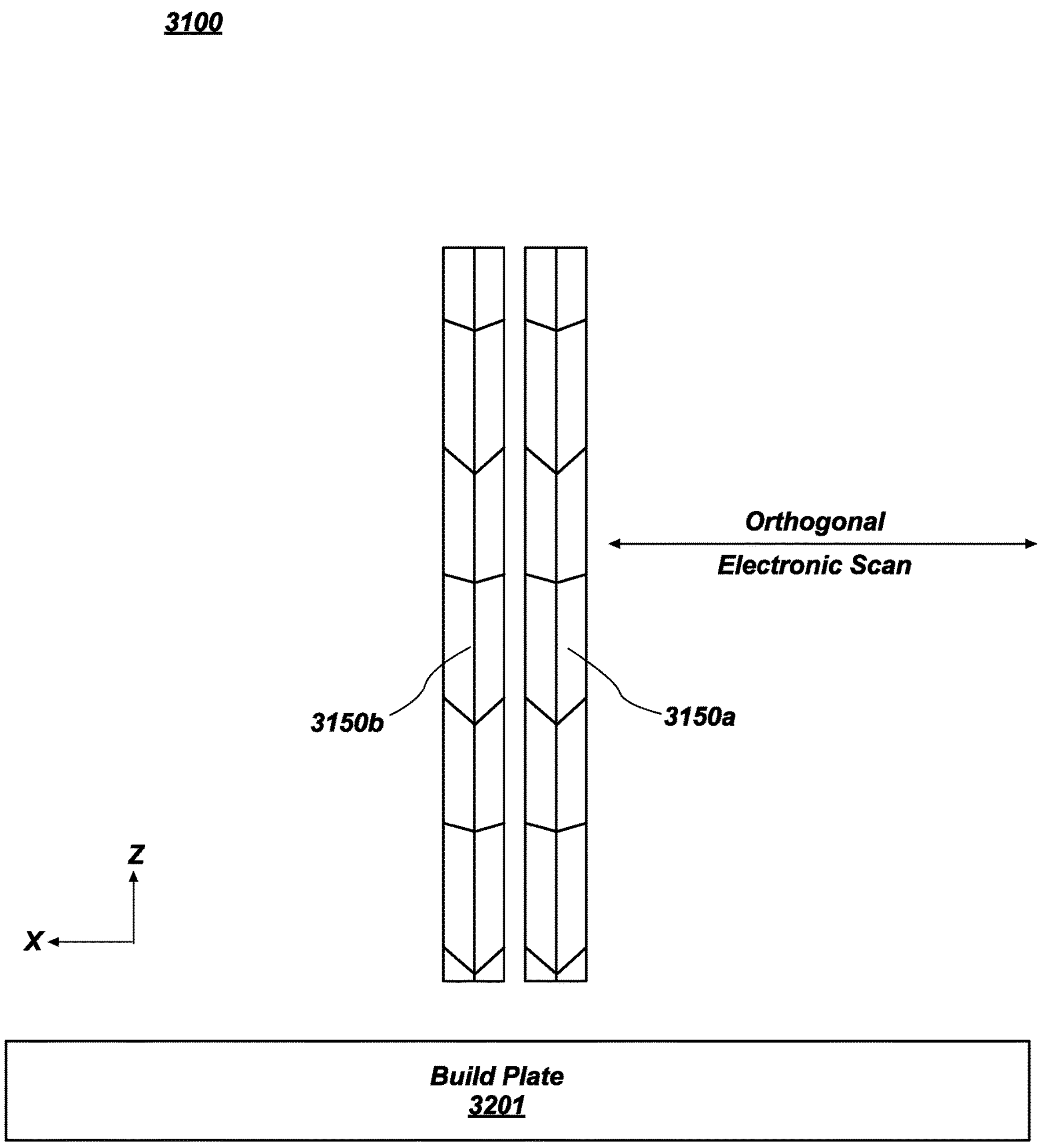
FIG. 32 illustrates a straight-on side view of sagittal plane of the dual ridge network configured to support a dual polarized antenna array.

FIG. 32 illustrates a straight-on side view of a sagittal plane of the dual ridge network 3100. In FIG. 32, the dual ridge network 3100 is oriented relative to the build plate 3201 for additive manufacturing in the positive Z-axis direction. The dual ridge network 3100 includes the two antenna components 3150*a*, 3150*b* stacked side-by-side. The dual ridge network 3100 fits within a single lattice spacing of an antenna array, wherein the antenna array comprises a plurality of instances of the dual ridge network 3100 (such as the antenna array 3000 comprising the plurality of diplexer networks 2800). The antenna components 3150*a*, 3150*b* may be copies of one another (i.e., with the same dimensions, quantity of transitions, quantity of combiners, and so forth) or may be different from one another.

The antenna components 3150*a*, 3150*b* are arranged such that their total depth (space occupied in the X-axis direction) is a distance that is less than or equal to one wavelength of a working frequency of the dual ridge network 3100. This allows for an orthogonal electronic scan that is disposed in a direction that is orthogonal to the frontal plane of the dual ridge network 3100 (i.e., an electronic scan travelling in the X-axis direction as shown in FIG. 32). This occurs over a wide bandwidth with spacing less than one-half a wavelength of the working frequency of the dual ridge network 3100.

While of similar structure, the antenna components 3150*a*, 3150*b* may provide signal to radiating elements of the same or of orthogonal polarization. For example, radiating elements connected to 3150*a*, 3150*b* may be of polarizations linear, including horizontal and vertical, or circular, including left hand circular polarization (LHCP) and right-hand circular polarization (RHCP).

Figure 33:
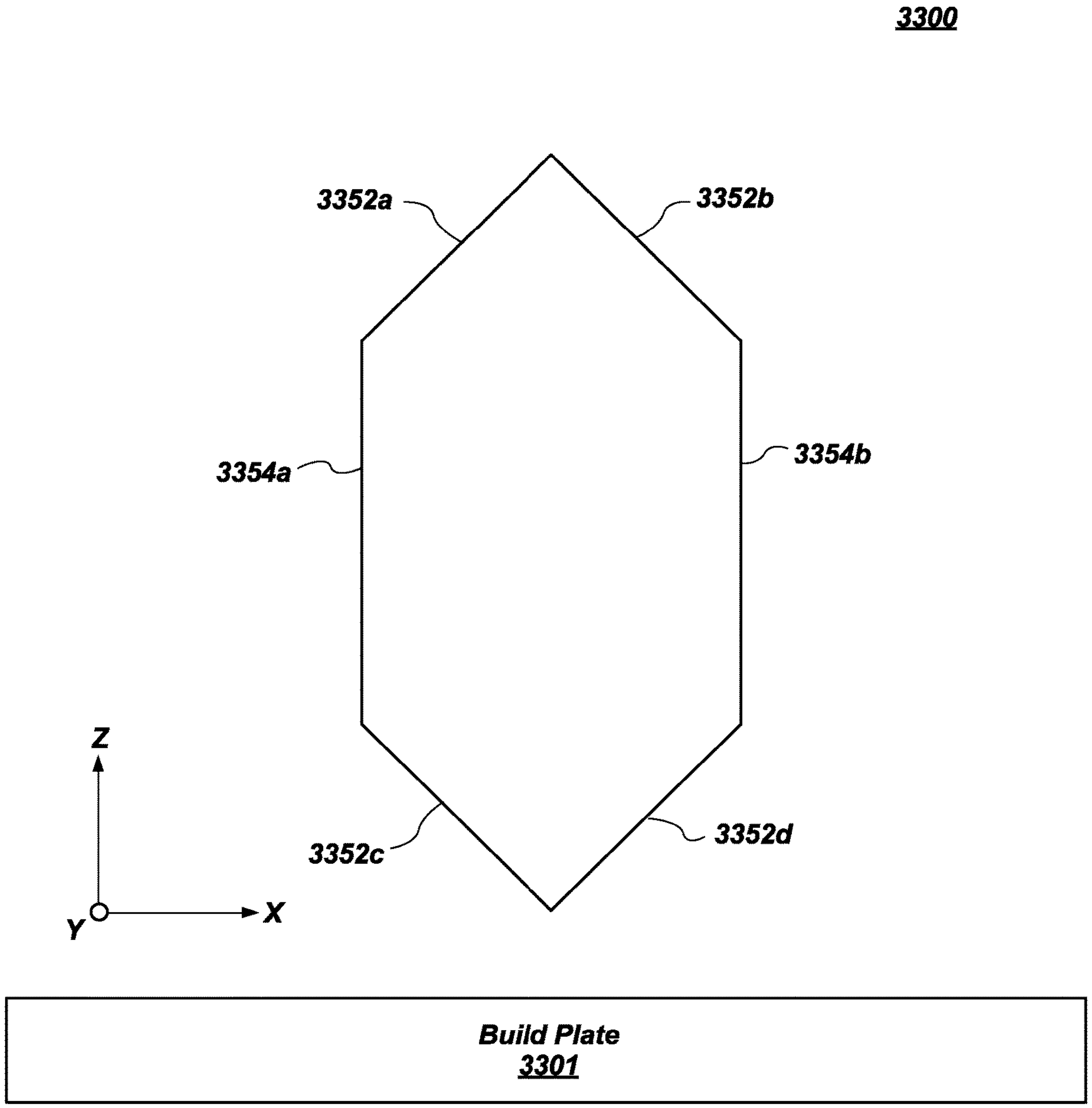
FIG. 33 illustrates a cross-sectional view of an irregular hexagonal waveguide geometry.
Figure 34:
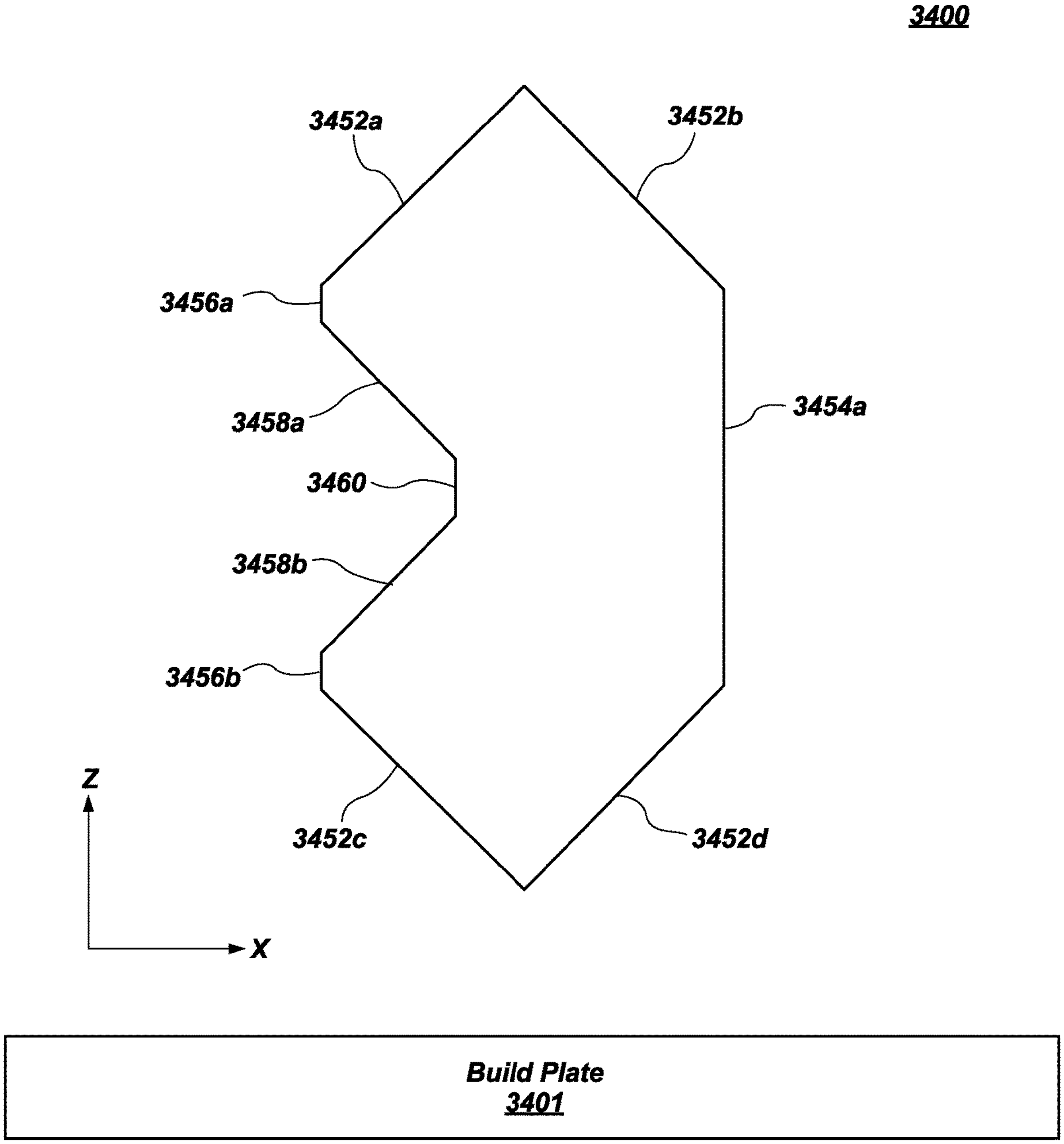
FIG. 34 illustrates a cross-sectional view of an irregular hexagonal waveguide geometry comprising one complex side.
Figure 35:
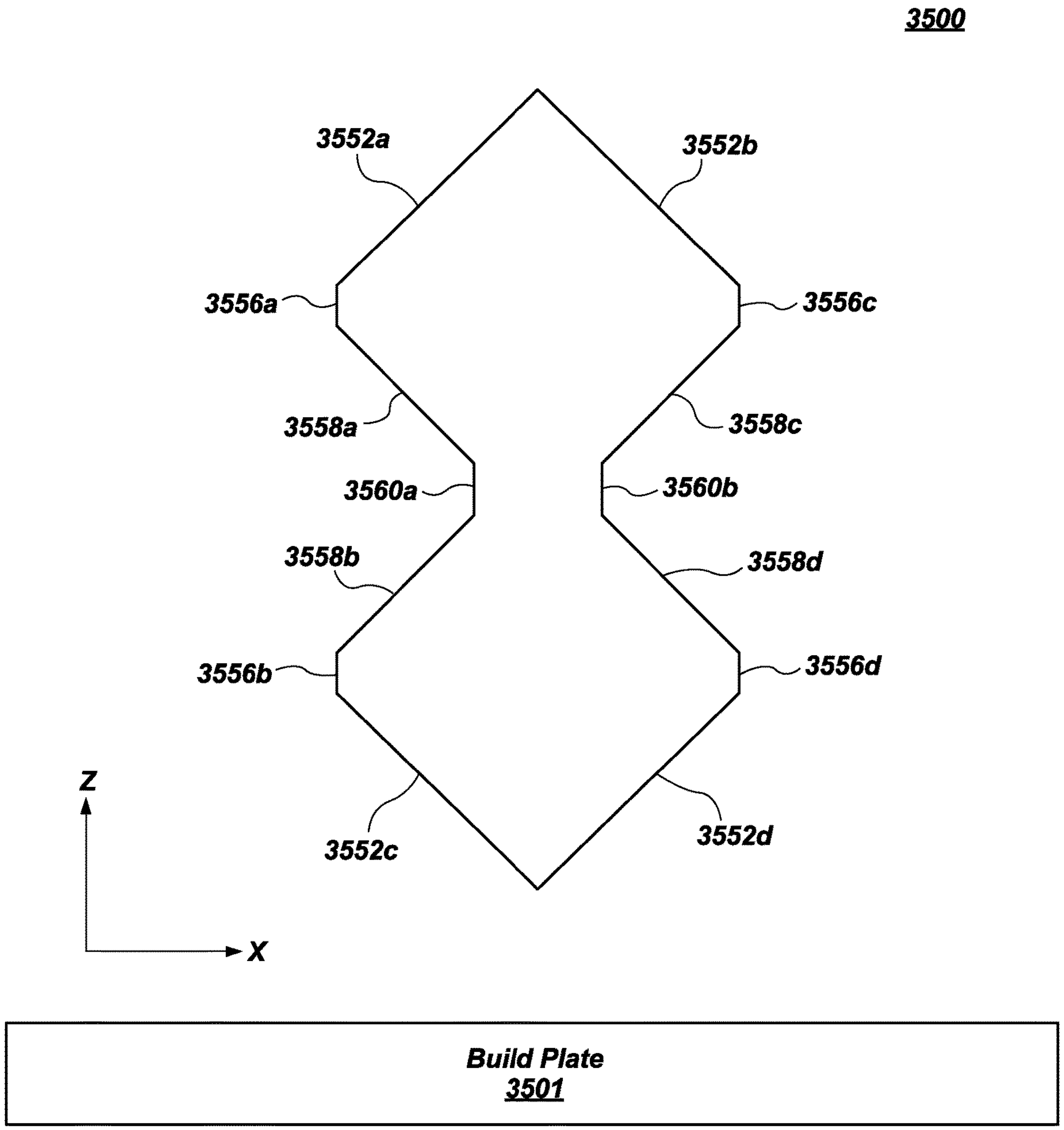
FIG. 35 illustrates a cross-sectional view of an irregular hexagonal waveguide geometry comprising two complex sides.
Figure 36:
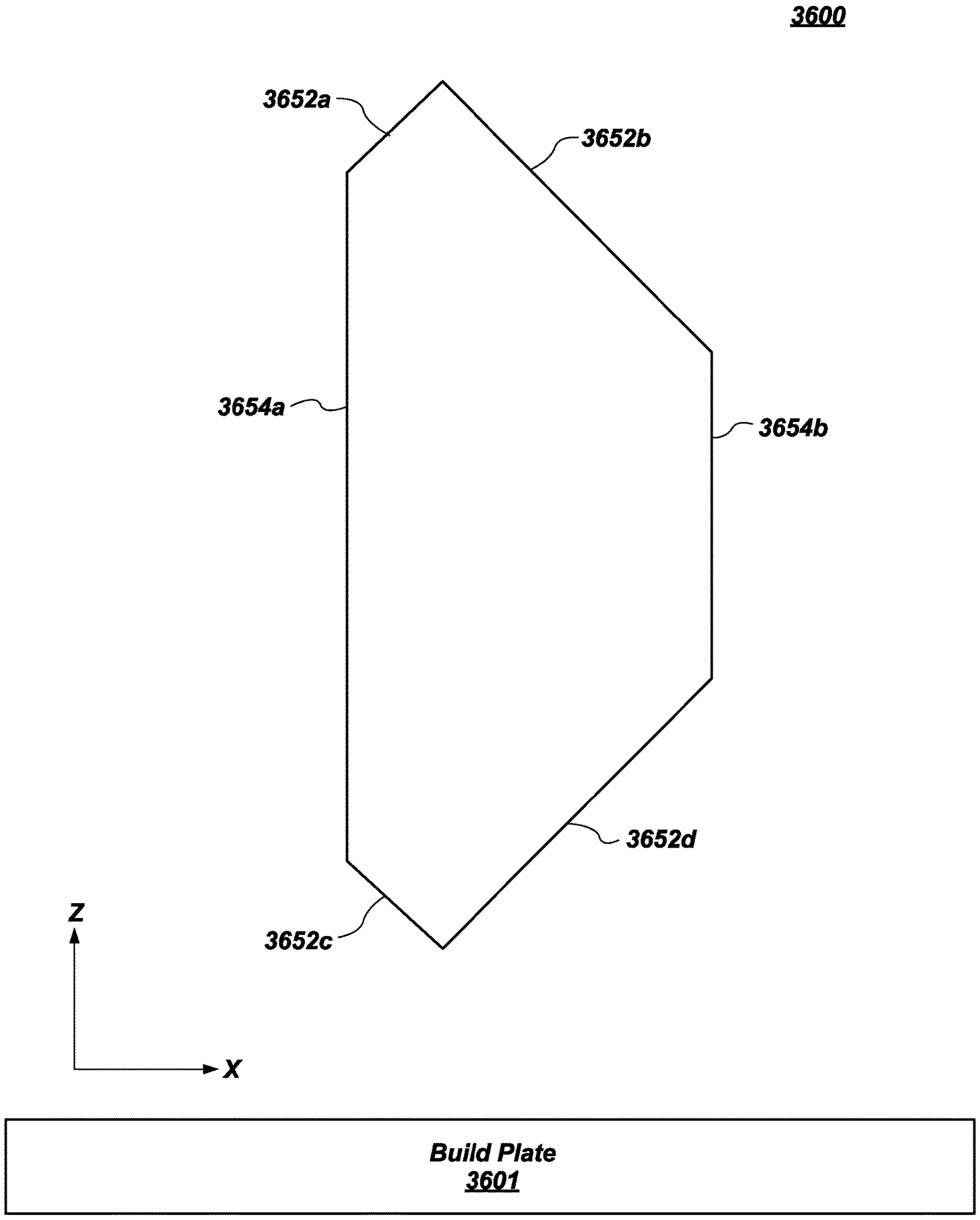
FIG. 36 illustrates a cross-sectional view of an irregular hexagonal waveguide geometry.

FIGS. 33-36 illustrate cross-sectional views of four different waveguide structures that each comprise an irregular hexagonal cross-sectional geometry. The waveguide geometries illustrated in FIGS. 33-36 represent the boundaries of negative space (air volume) wherein an electromagnetic signal may propagate. FIG. 33 illustrates an irregular hexagonal cross-sectional waveguide (air volume) geometry with no complex sides. FIG. 34 illustrates an irregular hexagonal cross-sectional waveguide geometry with one complex side. FIG. 35 illustrates an irregular hexagonal cross-sectional waveguide geometry with two complex sides. FIG. 36 illustrates an irregular hexagonal cross-sectional waveguide geometry with no complex sides. The waveguide geometries illustrated in FIGS. 33-36 are like the waveguide geometries discussed in connection with U.S. Pat. No. 11,211,680 B2 (Hollenbeck, et. al.), which is incorporated by reference herein in its entirety.

FIG. 33 illustrates a cross-sectional view of a waveguide 3300 comprising an irregular hexagonal cross-sectional geometry with no complex sides. The waveguide 33300 includes a first side 3352*a*, a second side 3352*b*, a third side 3352*c*, and a fourth side 3352 which may have equivalent lengths. The waveguide 3300 additionally includes a fifth side 3354*a* and a sixth side 3354*b* which may comprise different lengths relative to the first, second, third, and fourth sides 3352*a*-3352*d*. The waveguide 3300 comprises an "irregular" hexagonal cross-sectional geometry because the six sides do not all comprise identical lengths.

FIG. 34 illustrates a cross-sectional view of a waveguide 3400 comprising an irregular hexagonal geometry with one complex side. The complex side is formed by a ridge disposed within the waveguide 3400, wherein the ridge is a solid structure and the waveguide geometry illustrated in FIG. 34 represents negative space (air volume) wherein an electromagnetic signal may propagate.

The waveguide 3400 includes a first side 3452*a*, a second side 3452*b*, a third side 3452*c*, and a fourth side 3452*d* which may each comprise equivalent lengths relative to one another. The waveguide 3400 further includes a fifth side 3454*a* that is disposed opposite from the complex side. The complex side consists of two vertical sides 3456*a*, 3456*b* (in the vertical orientation relative to the build plate 3401) to facilitate printing orientation. The complex side comprises a chamfer implemented by two symmetrical sides 3458*a*, 3458*b* which are joined by a third vertical side 3460. The outline of the complex side is defined by the geometry of the solid ridge that protrudes into the negative space defined by the waveguide 3400.

FIG. 35 illustrates a cross-sectional view of a waveguide 3500 comprising an irregular hexagonal geometry with two complex sides. The complex sides are formed by ridges disposed within the waveguide 3500, wherein the ridges constitute solid structures and the waveguide geometry illustrated in FIG. 35 represents negative space (air volume) wherein an electromagnetic signal may propagate.

The waveguide 3500 includes a first side 3552*a*, a second side 3552*b*, a third side 3552*c*, and a fourth side 3552*d* which may each comprise equivalent lengths relative to one another. The waveguide 3500 includes two complex sides that are disposed opposite relative to one another. A first complex side consists of two vertical sides 3556*a*, 3556*b* (in the vertical orientation relative to the build plate 3501) to facilitate printing orientation. The first complex side comprises a chamfer implemented by two symmetrical sides 3558*a*, 3558*b* which are joined by a third vertical side 3560*a*. The outline of the complex side is defined by the geometry of the solid ridge that protrudes into the negative space defined by the waveguide 3500. The second complex side consists of two vertical sides 3556*c*, 3556*d* in the vertical orientation relative to the build plate 3501) to facilitate printing orientation. The second complex side comprises a chamfer implemented by two symmetrical sides 3558*c*, 3558*d* which are joined by a third vertical side 3560*b*. The outline of the complex side is defined by the geometry of the solid ridge that protrudes into the negative space defined by the waveguide 3500.

FIG. 36 illustrates a cross-sectional view of a waveguide 3600 comprising an irregular hexagonal cross-sectional geometry. The waveguide 3600 includes a first side 3652*a*, a second side 3652*b*, a third side 3652*c*, and fourth side 3652*d*. The waveguide 3600 includes a fifth side 3654*a* and a sixth side 3654*b*, wherein the fifth side 3654*a* and the sixth side 3654*b* comprise non-equivalent lengths relative to one another.

The cross-sectional waveguide geometries 3300, 3400, 3500, 3600 illustrated in FIGS. 33-36 may be implemented in any of the waveguides and combiners described herein. The waveguide combiner networks described herein may have any of the above-described cross-sections. Furthermore, the cross-sectional shapes provided are merely example and do not limit the disclosure. The waveguide combiner networks described herein may have any appropriate cross section used for waveguide purposes.

Figure 37A:
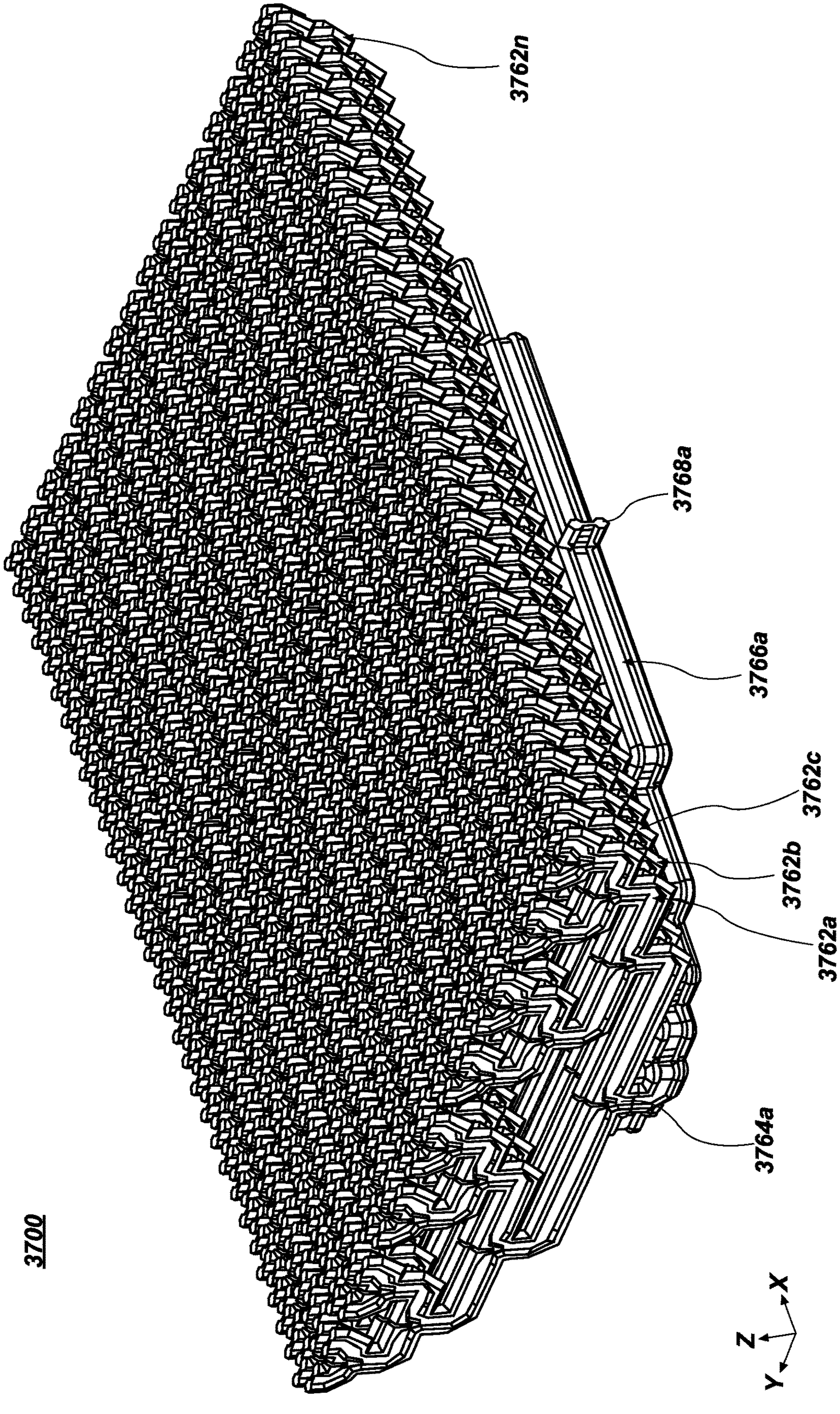
FIGS. 37A and 37B illustrate perspective views of an array configured to passively combine electromagnetic signals comprising orthogonal polarization from an array of radiating elements and output those electromagnetic signals into a first output for a first polarization and a second output for a second polarization.
Figure 37B:
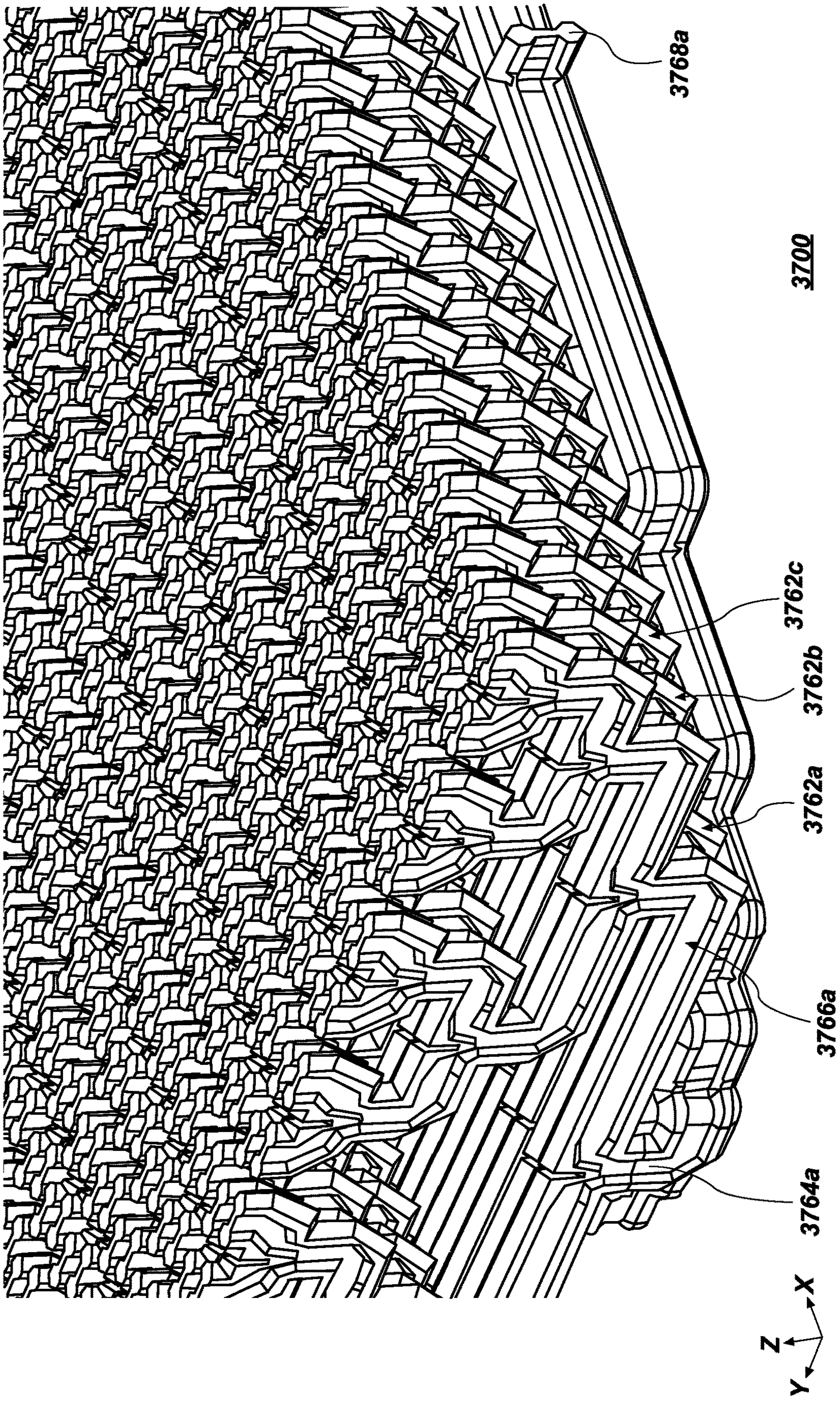

FIGS. 37A and 37B illustrate perspective views of an air volume of an array 3700 comprising a plurality of dual ridge waveguide combiner networks arranged side-by-side. FIG. 37B illustrates a zoomed-in view with respect to FIG. 37A. The plurality of dual ridge waveguide combiner networks arranged in the array 3700 may include the features of the dual ridge network 3100 first illustrated in FIG. 31.

The array 3700 is configured to passively combine electromagnetic signals with orthogonal polarizations from a plurality of radiating elements into a single output port for each polarization. The array 3700 includes a series of H-plane combiner networks 3762, including a first H-plane combiner network 3762*a*, a second H-plane combiner network 3762*b*, a third H-plane combiner network 3762*c*, and so forth as needed to an nth H-plane combiner network 3762*n*. There is no maximum quantity of H-plane combiner networks 3762 in the array 3700. The array 3700 further includes one or more E-plane combiner networks 3766, which are disposed on an underside of the array 3700 (visible in FIGS. 38A-38B) and only partially visible in FIGS. 37A-37B. The combination of the H-plane combiner networks 3762 and the E-plane combiner networks 3766 of the array 3700 are configured to passively combine two orthogonal polarizations of electromagnetic signals.

The H-plane combiner networks 3762 of the exemplary array 3700 each comprise four combiner stages. This is differentiated from the antenna components 3150*a*, 3150*b* of the dual ridge network 3100, which each include three combiner stages. As discussed in connection with the dual ridge network 3100, there is no maximum quantity of combiner stages, and the quantity of combiner stages may be optimized based on the desired operational specifications of the array 3700. The four combiner stages of the H-plane combiner networks 3762 are configured to receive 16 independent electromagnetic signals and fully combines those 16 electromagnetic signals into a single output port 3764. In FIG. 37A, the first single output port 3764*a* of the first H-plane combiner network 3762*a* is visible.

The single output ports 3764 of the H-plane combiner networks 3762 feed into one of two E-plane combiner networks, including one of a first E-plane combiner network 3766*a* (partially visible in FIGS. 37A-37B) or a second E-plane combiner network 3766*b* (not visible in FIGS. 37A-37B). The E-plane combiner networks 3766 are orthogonal to the H-plane combiner networks 3762 are disposed underneath the H-plane combiner networks relative to a positive Z-axis build direction of the array 3700 relative to a build plate.

The waveguides of the H-plane combiner networks 3762 and the E-plane combiner networks 3766 comprise an irregular hexagonal cross-sectional geometry. The irregular hexagonal cross-sectional geometry includes two complex sides as shown in the figures, which may be a result of one or more ridges extending into the air volume defined by the waveguide.

Figure 38A:
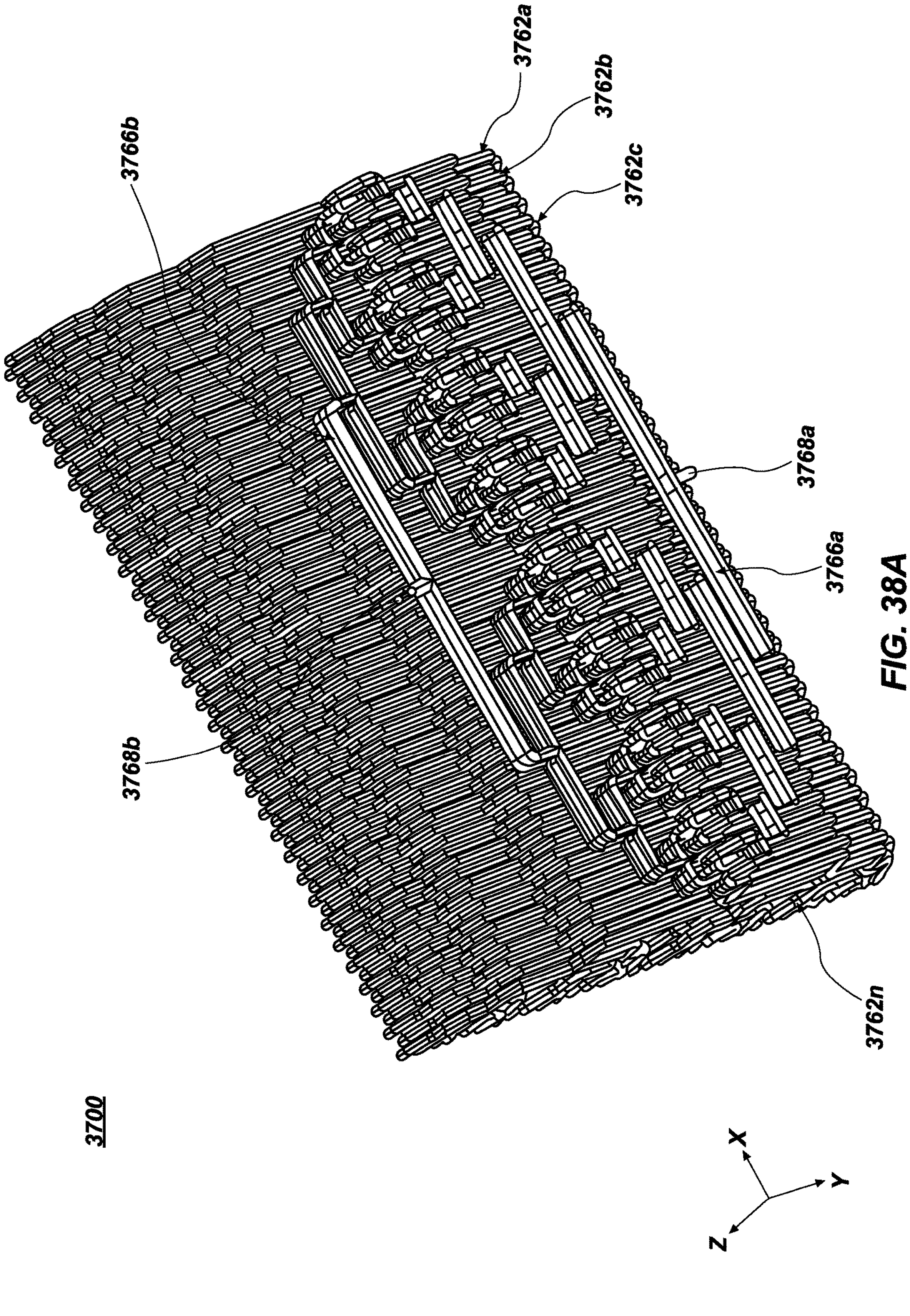
FIG. 38A illustrates a perspective view of an underside of the array illustrated in FIGS. 37A-37B.
Figure 38B:
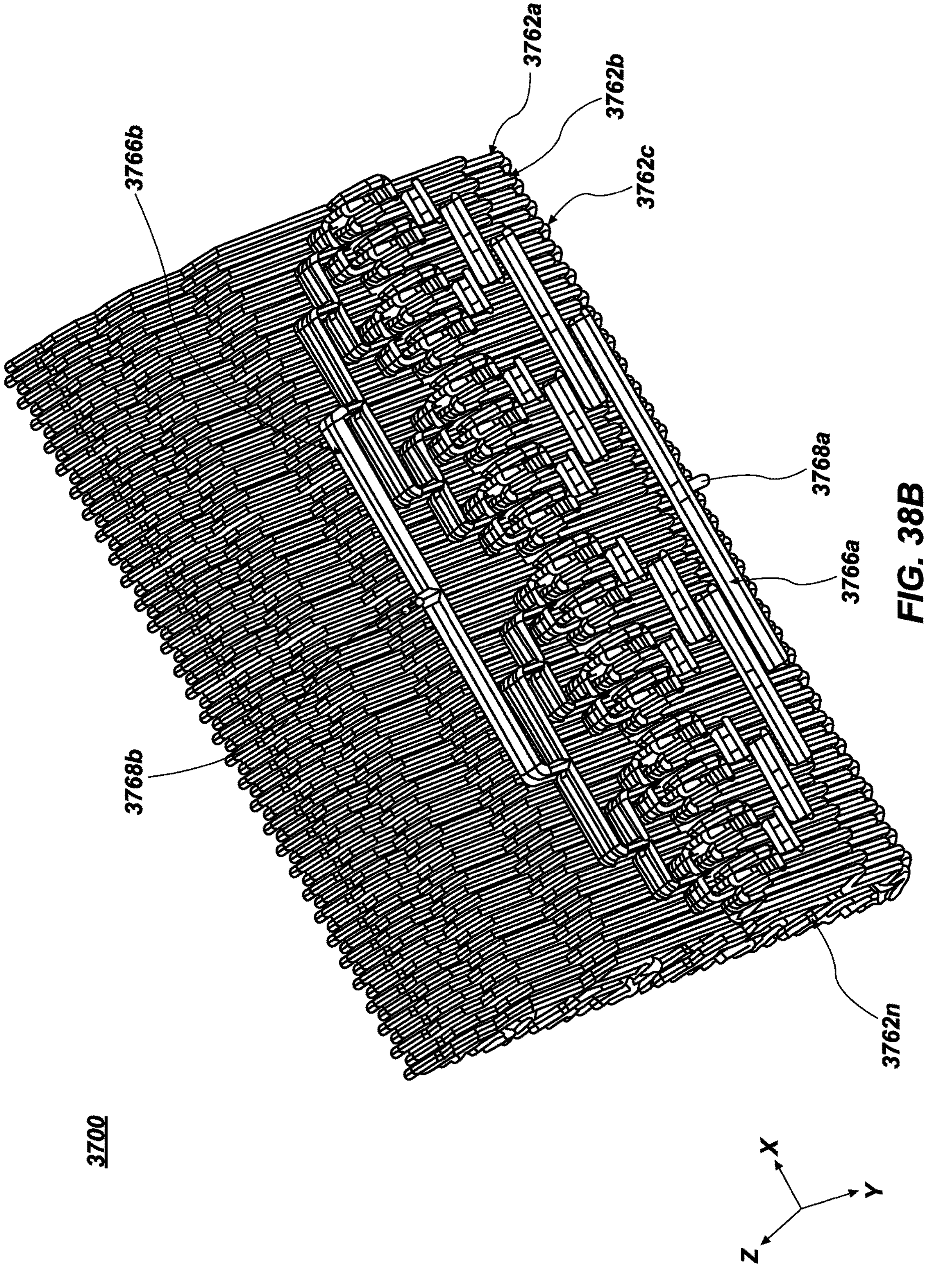
FIG. 38B illustrates a perspective view of the underside of the array illustrated in FIGS. 37A-37B, wherein output ports for combined orthogonal polarizations are encircled.

FIGS. 38A and 38B illustrate perspective underside views of the array 3700 first illustrated in FIGS. 37A-37B. FIG. 38B illustrates the same view as FIG. 38A, but with the ultimate output ports of the array 3700 encircled for easier viewing. The underside views illustrated in FIGS. 38A-38B provide a view of the E-plane combiner networks 3766*a*, 3766*b*.

The E-plane combiner networks receive electromagnetic signals from the single output ports 3764 of the H-plane combiner networks 3762. The exemplary E-plane combiner networks 3766*a*, 3766*b* of the array 3700 each include five combiner stages and are thus configured to receive 32 electromagnetic signals from 32 different single output ports 3764 of the H-plane combiner networks 3762. The E-plane combiner networks 3766*a*, 3766*b* each combine those 32 electromagnetic signals into a single output port 3768*a*, 3768*b*. The first E-plane combiner network 3766*a* combines electromagnetic signals from a first grouping of 32 single output ports 3764 of the H-plane combiner networks 3762, and the second E-plane combiner network 3766*b* combines electromagnetic signals received from a second grouping of 32 single output ports 3764 of the H-plane combiner networks 3762. Thus, the exemplary array 3700 includes a total of 64 H-plane combiner networks 3762 and two E-plane combiner networks 3766.

The first single output port 3768*a* of the first E-plane combiner network 3766*a* corresponds to the radiating elements which support an electromagnetic signal having a first polarization. The second single output port 3768*b* of the second E-plane combiner network 3766*b* corresponds to the radiating elements which support an electromagnetic signal having a second polarization, wherein the second polarization is orthogonal to the first polarization. The H-plane combiner networks 3762 are disposed side-by-side to form pairs, wherein each pair is like the dual ridge network 3100 first illustrated in FIG. 31. In this case, a first H-plane combiner network 3762*a* is like a first antenna component 3150*a*, and a second H-plane combiner network 3762*b* is like a second antenna component 3150*b*. The H-plane combiner networks 3762 are thus stacked side-by-side with orthogonal polarization pairs, such that the H-plane combiner networks 3762 alternate in the polarization orthogonality of their supported radiating elements.

Figure 39A:
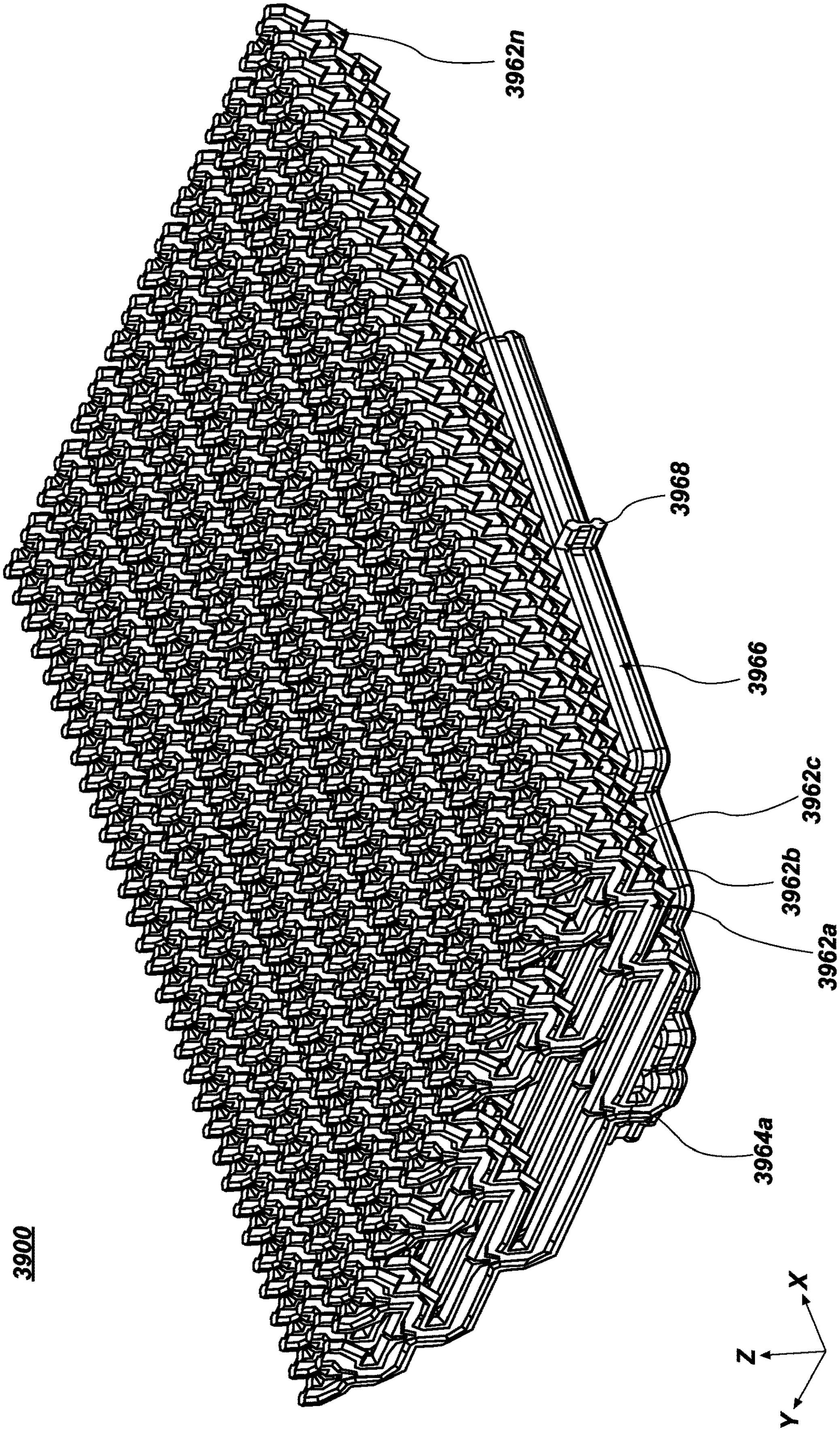
FIG. 39A illustrates a perspective aerial view of an array configured to passively combine electromagnetic signals from a plurality of radiating elements and output those electromagnetic signals into a single output port.
Figure 39B:
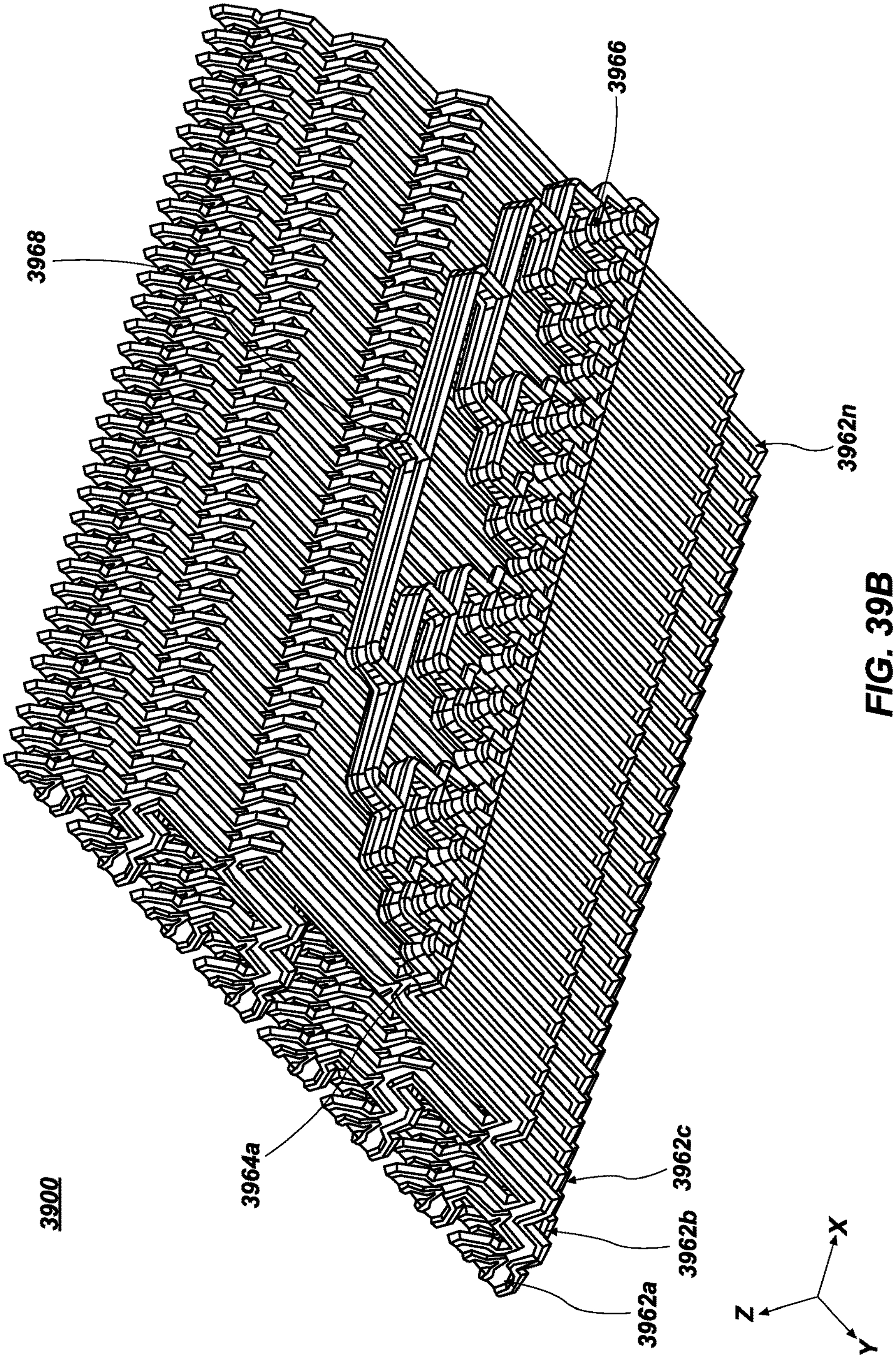
FIG. 39B illustrates a perspective underside view of the array illustrated in FIG. 39A.

FIGS. 39A and 39B illustrate perspective views of an array 3900 comprising a plurality of H-plane combiner networks and a single E-plane combiner network. The array 3900 is a single polarized array and results in a single output port. This is in contrast with the array 3700 illustrated in FIGS. 37A-37B and 38A-38B, which is a dual polarized array with two E-plane combiner networks and a single output port for each of the two E-plane combiner networks. Thus, the array 3700 supports two pluralities of radiating elements which radiate two electromagnetic signals with orthogonal polarizations, and the array 3900 supports a single plurality of radiating elements which radiate a single electromagnetic signal with a single polarization.

Like the array 3700 first illustrated in FIG. 37A, the array 3900 includes a plurality of H-plane combiner networks 3962. The exemplary array 3900 includes a first H-plane combiner network 3962*a*, a second H-plane combiner network 3962*b*, a third H-plane combiner network 3962*c*, and up through an nth H-plane combiner network 3962*n*. Each of the H-plane combiner networks 3962 fully combines a plurality of electromagnetic signals into a single output port 3964, such as the first single output port 3964*a* associated with the first H-plane combiner network 3962*a*. There is no maximum quantity of H-plane combiner networks 3962, and the quantity of H-plane combiner networks may be optimized based on the desired operational specifications of the array 3900. Unlike the array 3700 first illustrated in FIG. 37A, the array 3900 includes only one E-plane combiner network 3966 that outputs to a single output port 3968. The single output port 3968 is the only ultimate output port for the entire array 3900. Thus, the array 3900 is configured to fully combine a single polarization antenna array to a single output port 3968.

Figure 40:
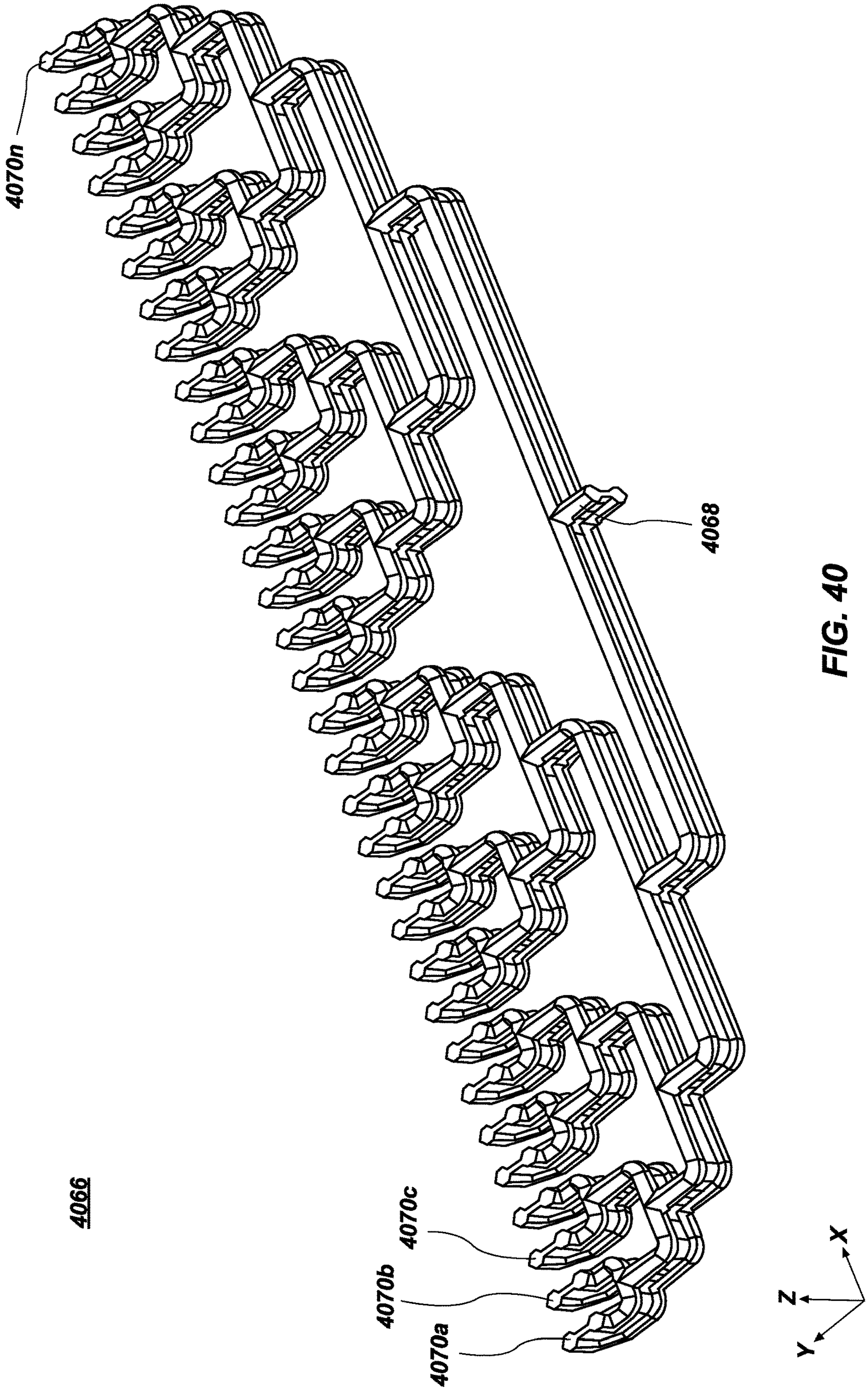
FIG. 40 illustrates a perspective view of an E-plane combiner network configured to combine thirty-two irregular hexagonal dual ridge waveguides into a single output port.

FIG. 40 illustrates a perspective view of an air volume of an E-plane combiner network 4066, which may be any of the first E-plane combiner network 3766*a* or the second E-plane combiner network 3766*b* of the array 3700 first illustrated in FIG. 37A, or the only E-plane combiner network 3966 of the array 3900 first illustrated in FIG. 39. The E-plane combiner network 4066 is configured to be orthogonal to one or more H-plane combiner networks of an antenna array.

The E-plane combiner network 4066 comprises a plurality of input ports 4070, including a first input port 4070*a*, a second input port 4070*b*, a third input port 4070*c*, and up through an nth input port 4070*n*. The quantity of input ports of the E-plane combiner network 4066 is dependent on the quantity of H-plane combiner networks in the antenna array. The exemplary E-plane combiner network 4066 comprises a 32 input ports 4070. Each of the input ports 4070 is configured to receive an electromagnetic signal from a single output port of an H-plane combiner network. The input ports 4070 comprise a cross-sectional geometry that matches the cross-sectional geometry of the corresponding H-plane combiner network. In the exemplary E-plane combiner network 4066 illustrated in FIG. 40, the input ports 4070 each comprise an irregular hexagonal cross-sectional geometry with two complex sides. It should be appreciated that the waveguides of the E-plane combiner network 4066 (or any of the H-plane combiner networks or E-plane combiner networks described herein) may have any of the cross-sectional geometries illustrated in FIGS. 33-36, or other geometries not specifically described herein.

The exemplary E-plane combiner network 4066 includes five combiner stages that fully combine into the single output port 4068. There is no maximum quantity of combiner stages, and the quantity of combiner stages will be determined based on the quantity of input ports 4070 (and therefore, based on the quantity of H-plane combiner networks in the antenna array).

EXAMPLES

Example 1 is an apparatus. The apparatus includes a first antenna component comprising a first waveguide combiner and a first plurality of radiating elements. The apparatus includes a second antenna component comprising a second waveguide combiner and a second plurality of radiating elements. The second plurality of radiating elements support a polarization that is orthogonal to a polarization of the first plurality of radiating elements. The first antenna component is located next to the second antenna component within an antenna array. The first antenna component and the second antenna component are disposed within a lattice spacing of the antenna array.

Example 2 is an apparatus as in Example 1, wherein the first antenna component further comprises a first transition configured to transition an electromagnetic signal from the first radiating element to the first waveguide combiner, and wherein the second antenna component further comprises a second transition configured to transition an electromagnetic signal from the second radiating element to the second waveguide combiner.

Example 3 is an apparatus as in any of Examples 1-2, wherein one or more of the first transition or the second transition comprises a coaxial waveguide.

Example 4 is an apparatus as in any of Examples 1-3, wherein one or more of the first transition or the second transition comprises a twin wire coaxial waveguide. The apparatus is such that one or more of the wires of the twin wire coaxial waveguide may comprise a helical twist formation.

Example 5 is an apparatus as in any of Examples 1-4, wherein the first antenna component further comprises a first fully combined combiner network that receives a plurality of electromagnetic signals and fully combines the plurality of electromagnetic signals into a first single output port; and the second antenna component further comprises a second fully combined combiner network that receives a plurality of electromagnetic signals and fully combines the plurality of electromagnetic signals into a second single output port.

Example 6 is an apparatus as in any of Examples 1-5, wherein each of the first fully combined combiner network and the second fully combined combiner network comprises two or more combiner stages, and wherein a first combiner stage receives electromagnetic signals from a plurality of transitions, and wherein a second combiner stage receives electromagnetic signals from output ports of the first combiner stage.

Example 7 is an apparatus as in any of Examples 1-6, wherein the first antenna component comprises a first frontal plane, and wherein the second antenna component comprises a second frontal plane, and wherein the first frontal plane is parallel to the second frontal plane.

Example 8 is an apparatus as in any of Examples 1-7, wherein the first antenna component is offset relative to the second antenna component along a lateral axis of the apparatus.

Example 9 is an apparatus as in any of Examples 1-8, wherein the apparatus is fabricated using additive manufacturing techniques in a positive Z-axis direction relative to a build plate.

Example 10 is an apparatus as in any of Examples 1-9, wherein all components of the apparatus are fabricated using the additive manufacturing techniques as a single metal element such that the fabrication process does not require a separate joining process for joining separate components.

Example 11 is an apparatus as in any of Examples 1-10, wherein the lattice spacing of the antenna array is less than or equal to one wavelength at a frequency of operation for the antenna array.

Example 12 is an apparatus as in any of Examples 1-11, wherein the apparatus is dual polarized such that the first antenna component outputs an electromagnetic signal at a first polarization, and the second antenna component outputs an electromagnetic signal at a second polarization that is orthogonal to the first polarization.

Example 13 is an apparatus as in any of Examples 1-12, wherein the antenna array is a dual polarized antenna array that comprises a plurality of lattice structures duplicated throughout the antenna array, and wherein the apparatus is one of the plurality of lattice structures of the antenna array.

Example 14 is an apparatus as in any of Examples 1-13, wherein the first plurality of radiating elements support a first polarization, and wherein the second plurality of radiating elements support a second polarization that is orthogonal to the first polarization, and wherein: a first radiating element of the first plurality of radiating elements located adjacent to a second radiating element of the second plurality of radiating elements; and the first radiating element and the second radiating element fir within the lattice spacing of the antenna array.

Example 15 is an apparatus as in any of Examples 1-14, wherein the lattice spacing is less than or equal to one wavelength of an operational frequency of the antenna array.

Example 16 is an apparatus as in any of Examples 1-15, wherein the first antenna component and the second antenna component each comprise a frontal plane, and wherein the frontal planes of the first antenna component and the second antenna component are oriented parallel to one another, and wherein the apparatus is configured to perform an orthogonal electronic scan in a direction that is orthogonal to the frontal planes of the first antenna component and the second antenna component.

Example 17 is an apparatus as in any of Examples 1-16, wherein one or more of the first waveguide combiner or the second waveguide combiner comprises an irregular hexagonal cross-sectional geometry.

Example 18 is an apparatus as in any of Examples 1-17, wherein one or more of the first waveguide combiner or the second waveguide combiner comprises an irregular hexagonal cross-sectional geometry with at least one complex side, and wherein the at least one complex side is formed by a ridge disposed within a negative space defined by the first waveguide combiner or the second waveguide combiner.

Example 19 is an apparatus as in any of Examples 1-18, wherein each of the first antenna component and the second antenna component comprises a planar cascade of a plurality of combiners that collectively fit within the lattice spacing of the antenna array in one axis.

Example 20 is an apparatus as in any of Examples 1-19, wherein the planar cascade of the plurality of combiners comprises H-plane combiners.

Example 21 is an apparatus as in any of Examples 1-20, wherein the apparatus is fabricated using additive manufacturing techniques in a positive Z-axis direction relative to a build plate, and wherein the apparatus is oriented relative to the build plate such that an overhang angle on any downward facing surface of the apparatus is greater than or equal to 25°.

Example 22 is an apparatus as in any of examples 1-21, wherein an antenna component comprises a waveguide combiner and a radiating element; and wherein the antenna component is disposed within a lattice spacing of an antenna array.

Example 23 is an apparatus. The apparatus includes an antenna component comprises a waveguide combiner and a radiating element; and wherein the antenna component is disposed within a lattice spacing of an antenna array.

Example 24 is an apparatus. The apparatus includes a first antenna component comprising a first multiplexer. The apparatus includes a second antenna component comprising a second multiplexer. The first antenna component is located next to the second antenna component within an antenna array. The first antenna component and the second antenna component are disposed within a lattice spacing of the antenna array in one axis.

Example 25 is an apparatus as in Example 24, wherein one or more of the first multiplexer or the second multiplexer is a diplexer comprising a first diplexer branch and a second diplexer branch.

Example 26 is an apparatus as in any of examples 24-25, wherein one or more of the first multiplexer or the second multiplexer receives an electromagnetic signal and splits the electromagnetic signal into two frequency bands such that the first diplexer branch receives a first electromagnetic signal over a first frequency bandwidth, and the second diplexer branch receives a second electromagnetic signal over a second frequency bandwidth that is non-overlapping with the first frequency bandwidth.

Example 27 is an apparatus as in any of examples 24-26, wherein the first diplexer branch comprises a first length along its longitudinal axis, and wherein the second diplexer branch comprises a second length along its longitudinal axis, and wherein the first length is different from the second length.

Example 28 is an apparatus as in any of examples 24-27, wherein the first diplexer branch comprises a first length along its longitudinal axis, and wherein the second diplexer branch comprises a second length along its longitudinal axis, and wherein the first length is equal to the second length.

Example 29 is an apparatus as in any of examples 24-28, wherein the first multiplexer comprises two multiplexer branches comprises a first multiplexer high band branch and a first multiplexer low band branch; and wherein the second multiplexer comprises two multiplexer branches comprises a second multiplexer high band branch and a second multiplexer low band branch.

Example 30 is an apparatus as in any of examples 24-29, wherein the first antenna component is located next to the second antenna component with alternating orientation such that the first multiplexer high band branch is disposed next to the second multiplexer low band branch within the antenna array; and the first multiplexer low band branch is disposed next to the second multiplexer high band branch within the antenna array.

Example 31 is an apparatus as in any of examples 24-30, wherein the first antenna component is oriented next to the second antenna component such that the first multiplexer high band branch is disposed next to the second multiplexer high band branch within the antenna array; and the first multiplexer low band branch is disposed next to the second multiplexer low band branch within the antenna array.

Example 32 is an apparatus as in any of examples 24-31, wherein each of the first antenna component and the second antenna component further comprises a combiner network comprising a planar cascade of combiners, wherein the planar cascade comprises a plurality of combiner stages.

Example 33 is an apparatus as in any of examples 24-32, wherein the first antenna component comprises a first planar cascade of combiners that fully combine a plurality of electromagnetic signals into a first single output port; and the second antenna component comprises a second planar cascade of combiners that fully combine a plurality of electromagnetic signals into a second single output port.

Example 34 is an apparatus as in any of examples 24-33, wherein the first multiplexer receives an electromagnetic signal from the first single output port associated with the first antenna component, and wherein the second multiplexer receives an electromagnetic signal from the second single output port associated with the second antenna component.

Example 35 is an apparatus as in any of examples 24-34, wherein one or more of the first planar cascade of combiners or the second planar cascade of combiners comprises a cascade of H-plane combiners.

Example 36 is an apparatus as in any of examples 24-35, wherein one or more of the first antenna component or the second antenna component comprises a waveguide that propagates an electromagnetic signal, and wherein the waveguide comprises an irregular hexagonal cross-sectional geometry.

Example 37 is an apparatus as in any of examples 24-36, wherein the irregular hexagonal cross-sectional geometry comprises one or more complex sides, and wherein the one or more complex sides are defined by a ridge disposed within a negative space of the waveguide.

Example 38 is an apparatus as in any of examples 24-37, wherein the apparatus is fabricated using additive manufacturing techniques in a positive Z-axis direction relative to a build plate.

Example 39 is an apparatus as in any of examples 24-38, wherein all components of the apparatus are fabricated using the additive manufacturing techniques as a single metal element such that the fabrication process does not require a separate joining process for joining separate components.

Example 40 is an apparatus as in any of examples 24-39, wherein the apparatus is fabricated such that an overhang angle on any downward facing surface of the apparatus is greater than or equal to 25°.

Example 41 is an apparatus as in any of examples 24-40, wherein the first antenna component is a replica of the second antenna component such that each of the first antenna component and the second antenna component comprise identical components and dimensions.

Example 42 is an apparatus as in any of examples 24-41, wherein the first antenna component and the second antenna are located next to one another and collectively fit within the lattice spacing of the antenna array in one axis, and wherein the lattice spacing is less than or equal to one wavelength of an operational frequency of the antenna array.

Example 43 is an apparatus as in any of examples 24-42, wherein at least one of the first antenna component or the second antenna component comprises a combiner network comprising a dual ridge waveguide.

Example 44 is an apparatus as in any of examples 24-43, wherein at least one of the first antenna component or the second antenna component comprises a combiner network comprising a single ridge waveguide.

Example 45 is an apparatus as in any of examples 24-44, wherein the antenna array comprises a plurality of lattice structures; wherein the apparatus is one of the plurality of lattice structures of the antenna array; wherein each of the plurality of lattice structures is disposed within dimensions of the lattice spacing along on axis; and wherein each of the plurality of lattice structures supports dual polarized radiating elements.

Example 46 is an apparatus as in any of examples 24-45, wherein the apparatus is dual polarized such that the first antenna component radiates an electromagnetic signal of a first polarization, and the second antenna component radiates an electromagnetic signal of a second polarization, and wherein the first polarization is different from the second polarization.

Example 47 is an apparatus as in any of examples 24-46, wherein each of the first multiplexer and the second multiplexer comprises a first multiplexer branch and a second multiplexer branch, and wherein the first multiplexer branch is used for receiving an electromagnetic signal, and wherein the second multiplexer branch is used for transmitting an electromagnetic signal; and wherein the first multiplexer branch and the second multiplexer branch operate independently.

Example 48 is an apparatus as in any of examples 24-47, wherein the apparatus is configured to simultaneously receive an electromagnetic signal and transmit an electromagnetic signal.

Example 49 is an apparatus as in any of examples 24-48, wherein one or more of the first multiplexer or the second multiplexer is a quadplexer comprising a first quadplexer branch, a second quadplexer brand, a third quadplexer brand, and a fourth quadplexer branch.

Example 50 is an apparatus as in any of examples 24-49, wherein one or more of the first multiplexer or the second multiplexer is a hexaplexer comprising a first hexaplexer branch, a second hexaplexer branch, a third hexaplexer branch, a fourth hexaplexer branch, a fifth hexaplexer branch, and a sixth hexaplexer branch.

Example 51 is an apparatus as in any of Examples 1-50, further comprising a waveguide transition that comprises a waveguide port and dual coaxial ports.

Example 52 is an apparatus as in any of Examples 1-51, wherein the waveguide transition further comprises an impedance transition area.

Example 53 is an apparatus as in any of Examples 1-52, wherein the impedance transition area of the waveguide transition further performs a power split or power combination.

Example 54 is an apparatus as in any of Examples 1-53, wherein the waveguide transition further comprises the waveguide transition further includes a metal coaxial conductor.

Example 55 is an apparatus as in any of Examples 1-54, wherein the waveguide transition further comprises twin wire coaxial conductors.

Example 56 is an apparatus as in any of Examples 1-55, wherein the waveguide transition further comprises a single wire coaxial metal conductor with one of a rectangular or a circular geometry.

Example 57 is an apparatus as in any of Examples 1-56, wherein the waveguide transition further comprises spacing between the coaxial ports of the wavelength at less than or equal to one wavelength of the working frequency of an antenna array.

Example 58 is an apparatus as in any of Examples 1-57, wherein the waveguide transition further comprises an electronic scan having a spacing of less than half of a wavelength of the working frequency of the antenna array.

Example 59 is an apparatus as in any of Examples 1-58, wherein the waveguide transition further comprises a single ridge waveguide.

Example 60 is an apparatus as in any of Examples 1-59, wherein the waveguide transition further comprises a dual-ridge waveguide.

Example 61 is an apparatus as in any of Examples 1-60, wherein the waveguide transition comprises a metal conductor that is offset by 90 degrees.

Example 62 is an apparatus as in any of Examples 1-61, wherein the waveguide transition further comprises a metal conductor that is helical.

Example 63 is an apparatus as in any of Examples 1-62, wherein the impedance transition area comprises one or more impedance matching steps.

Example 64 is an apparatus as in any of Examples 1-63, wherein the waveguide transition further comprises an impedance transition area that includes one or more impedance tapers.

Example 65 is an apparatus as in any of Examples 1-64, wherein the waveguide transition further comprises a waveguide transition that is formed by metal additive manufacturing. (e.g., three-dimensional metal printing).

Example 66 is an apparatus as in any of Examples 1-65, further comprising an array of radiating elements that are fed by one or more balanced twin-wire coaxial waveguides.

Example 67 is an apparatus as in any of Examples 1-66, wherein the waveguide transition further comprises a balanced twin-wire coaxial waveguide that feeds an array of radiating elements of the antenna array.

Example 68 is an apparatus as in any of Examples 1-67, wherein the balanced twin-wire coaxial waveguide feeds dual polarized antenna elements.

Example 69 is an apparatus as in any of Examples 1-68, wherein the balanced twin-wire coaxial waveguide comprises a capacitive gap at a location where radiating elements meet.

Example 70 is an apparatus as in any of Examples 1-69, further comprising an antenna element that comprises a series of H-plane combiners connected to a diplexer in a single planar row that is less than one half wavelength in thickness with respect to the operating frequency of the antenna element.

Example 71 is an apparatus as in any of Examples 1-70, wherein each pair of rows of antenna elements fits in a space that is less than one half wavelength in thickness with respect to the operating frequency of the antenna element.

Example 72 is an apparatus as in any of Examples 1-71, wherein one or more of the first antenna element or the second antenna element comprises a dual ridged waveguide.

Example 73 is an apparatus as in any of Examples 1-72, wherein one or more of the first antenna element or the second antenna element includes a series of H-plane combiners connected to a quadplexer in a single planar row that is less than one half wavelength in thickness with respect to the operating frequency of the antenna element.

Example 74 is an apparatus as in any of Examples 1-73, wherein one or more of the first antenna element or the second antenna element includes a series of H-plane combiners connected to a hexaplexer in a single planar row that is less than one half wavelength in thickness with respect to the operating frequency of the antenna element.

Example 75 is an apparatus as in any of Examples 1-74, wherein each of the plurality of antenna elements are offset from adjacent antenna elements in the array.

Example 76 is an apparatus as in any of Examples 1-75, wherein the diplexers of the plurality of antenna elements each include a high frequency branch and a low frequency branch, wherein sides of the array on which the high frequency branches and low frequency branches are disposed alternate between adjacent antenna elements of the plurality of antenna elements.

Example 77 is an apparatus as in any of Examples 1-76, wherein the series of H-plane combiners comprise a plurality of stages of H-plane combiners.

Example 78 is an apparatus as in any of Examples 1-77, wherein the plurality of antenna elements of the array alternate polarization characteristics such that a first antenna element has a first polarization and a second antenna element adjacent to the first antenna element has a second polarization.

Example 79 is an apparatus as in any of Examples 1-78, wherein adjacent antenna elements of the plurality of antenna elements having a different polarization from each other are spaced half a wavelength or less away from each other.

Example 80 is a dual polarized array. The dual polarized array includes a plurality of H-plane antenna components each comprising a waveguide combiner and a radiating element and a plurality of E-plane antenna components each comprising a plurality of input ports and a waveguide combiner. The plurality of input ports of the plurality of E-plane antenna components each receive an electromagnetic signal from one of the plurality of H-plane antenna components. Two of the plurality of H-plane antenna components are disposed within a lattice spacing of an antenna array.

Example 81 is a singularly polarized array. The singularly polarized array includes a plurality of H-plane antenna components each comprising a waveguide combiner and a radiating element and an E-plane antenna component comprising a plurality of input ports and a waveguide combiner. The plurality of input ports of the E-plane antenna component receive a plurality of electromagnetic signals from the plurality of H-plane antenna components. The E-plane antenna component fully combines the plurality of electromagnetic signals from the plurality of H-plane antenna components into a single output port for the singularly polarized array.

Example 82 is an array as in either of Examples 80-81, wherein the array is fabricated using metal additive manufacturing techniques.

Example 83 is an array as in any of Examples 80-82, wherein the array is fabricated as a single metal element such that the fabrication process does not include any additional joining step for joining separate components.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims, if any.

Other embodiments will be apparent to those skilled in the art from consideration of the specification and practice of the disclosure disclosed herein. It is intended that the specification and examples be considered as exemplary only, with a true scope and spirit of the invention being indicated by the following claims, if any.

What is claimed is:

1. An apparatus comprising:

a first antenna component comprising a first waveguide combiner and a first plurality of radiating elements; and a second antenna component comprising a second waveguide combiner and a second plurality of radiating elements;

wherein the second plurality of radiating elements support a second polarization that is orthogonal to a first polarization of the first plurality of radiating elements;

wherein the first antenna component is located next to the second antenna component within an antenna array;

wherein the first antenna component and the second antenna component are disposed within one lattice spacing of the antenna array; and wherein the apparatus is fabricated using additive manufacturing techniques in a positive Z-axis direction relative to a build plate.

2. The apparatus of claim 1, wherein the apparatus is oriented relative to the build plate such that an overhang angle on any downward facing surface of the apparatus is greater than or equal to 25°.

3. The apparatus of claim 1, wherein the first antenna component further comprises a first transition configured to transition a first electromagnetic signal from the first plurality of radiating elements to the first waveguide combiner; and wherein the second antenna component further comprises a second transition configured to transition a second electromagnetic signal from the second plurality of radiating elements to the second waveguide combiner.

4. The apparatus of claim 3, wherein one or more of the first transition or the second transition comprises a coaxial waveguide.

5. The apparatus of claim 3, wherein one or more of the first transition or the second transition comprises a twin wire coaxial waveguide.

6. The apparatus of claim 5, wherein at least one twin wire of the twin wire coaxial waveguide comprises a helical twist formation.

7. The apparatus of claim 1, wherein:

the first antenna component further comprises a first fully combined combiner network that receives a plurality of electromagnetic signals and fully combines the plurality of electromagnetic signals into a first single output port; and the second antenna component further comprises a second fully combined combiner network that receives a plurality of electromagnetic signals and fully combines the plurality of electromagnetic signals into a second single output port.

8. The apparatus of claim 7, wherein each of the first fully combined combiner network and the second fully combined combiner network comprises two or more combiner stages, and wherein a first combiner stage receives electromagnetic signals from a plurality of transitions, and wherein a second combiner stage receives electromagnetic signals from output ports of the first combiner stage.

9. The apparatus of claim 1, wherein the first antenna component comprises a first frontal plane, and wherein the second antenna component comprises a second frontal plane, and wherein the first frontal plane is parallel to the second frontal plane.

10. The apparatus of claim 9, wherein the first antenna component is offset relative to the second antenna component along a lateral axis of the apparatus.

11. The apparatus of claim 1, wherein all components of the apparatus are fabricated using the additive manufacturing techniques as a single metal element such that the fabrication process does not require a separate joining process for joining separate components.

12. The apparatus of claim 1, wherein the lattice spacing of the antenna array is less than or equal to one wavelength at a frequency of operation for the antenna array.

13. The apparatus of claim 1, wherein the apparatus is dual polarized such that the first antenna component radiates a first electromagnetic signal at a first polarization, and the second antenna component radiates a second electromagnetic signal at a second polarization; and wherein the second polarization is orthogonal to the first polarization.

14. The apparatus of claim 1, wherein the antenna array is a dual polarized antenna array that comprises a plurality of lattice structures duplicated throughout the antenna array, and wherein the apparatus is one of the plurality of lattice structures of the antenna array.

15. The apparatus of claim 1, wherein the first plurality of radiating elements support a first polarization, and wherein the second plurality of radiating elements support a second polarization that is orthogonal to the first polarization, and wherein:

a first radiating element of the first plurality of radiating elements is located adjacent to a second radiating element of the second plurality of radiating elements; and the first radiating element and the second radiating element fit within the lattice spacing of the antenna array.

16. The apparatus of claim 15, wherein the lattice spacing is less than or equal to one wavelength of an operational frequency of the antenna array.

17. The apparatus of claim 1, wherein the first antenna component and the second antenna component each comprise a frontal plane, and wherein the frontal planes of the first antenna component and the second antenna component are oriented parallel to one another, and wherein the apparatus is configured to perform an orthogonal electronic scan in a direction that is orthogonal to the frontal planes of the first antenna component and the second antenna component.

18. The apparatus of claim 1, wherein one or more of the first waveguide combiner or the second waveguide combiner comprises an irregular hexagonal cross-sectional geometry.

19. The apparatus of claim 1, wherein one or more of the first waveguide combiner or the second waveguide combiner comprises an irregular hexagonal cross-sectional geometry with at least one complex side, and wherein the at least one complex side is formed by a ridge disposed within a negative space defined by the first waveguide combiner or the second waveguide combiner.

20. The apparatus of claim 1, wherein each of the first antenna component and the second antenna component comprises a planar cascade of a plurality of combiners that collectively fit within the lattice spacing of the antenna array in one axis.

21. The apparatus of claim 20, wherein the planar cascade of the plurality of combiners comprises H-plane combiners.

* * * * *